United States Patent
Kotra et al.

(10) Patent No.: US 11,736,695 B2
(45) Date of Patent: Aug. 22, 2023

(54) PERFORMING CHROMA DEBLOCKING FOR BLOCKS WHICH USE JOINT CHROMA CODING

(71) Applicant: HUAWEI TECHNOLOGIES CO., LTD., Guangdong (CN)

(72) Inventors: Anand Meher Kotra, Munich (DE); Elena Alexandrovna Alshina, Munich (DE); Semih Esenlik, Munich (DE); Biao Wang, Munich (DE); Han Gao, Munich (DE); Roman Igorevich Chernyak, Moscow (RU)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/686,585

(22) Filed: Mar. 4, 2022

(65) Prior Publication Data

US 2022/0191496 A1 Jun. 16, 2022

Related U.S. Application Data

(63) Continuation of application No. 17/319,098, filed on May 13, 2021, now Pat. No. 11,317,091, which is a
(Continued)

(30) Foreign Application Priority Data

Aug. 23, 2019 (WO) .................. PCT/EP2019/072643
Sep. 16, 2019 (WO) ................. PCT/RU2019/000639
Oct. 7, 2019 (WO) .................. PCT/EP2019/077057

(51) Int. Cl.
*H04N 19/124* (2014.01)
*H04N 19/117* (2014.01)
(Continued)

(52) U.S. Cl.
CPC ......... *H04N 19/124* (2014.11); *H04N 19/117* (2014.11); *H04N 19/176* (2014.11); *H04N 19/186* (2014.11)

(58) Field of Classification Search
None
See application file for complete search history.

(56) References Cited

U.S. PATENT DOCUMENTS 9,648,332 B2 5/2017 Kim et al.
9,661,329 B2 5/2017 Zhang et al.
(Continued)

FOREIGN PATENT DOCUMENTS

CN 1969556 A 5/2007
CN 104584560 A 4/2015
(Continued)

OTHER PUBLICATIONS

Wade Wan et al., "Consistent chroma QP derivation in the deblocking and inverse quantization processes", Joint Collaborative Team on Video Coding (JCT-VC), Oct. 9, 2012, [JCTVC-K0145r1] (version 2), 7 pages.
(Continued)

*Primary Examiner* — Mohammad J Rahman

(57) ABSTRACT

A method for deblocking a chroma block edge between a first chroma block of a first image block and a second chroma block of a second image block. The method includes a decision process which includes: determining a first chroma quantization parameter for the first chroma block based on a first luma quantization parameter of a first luma block of the first image block and a chroma QP mapping table for the first chroma block; determining a second chroma quantization parameter for the second chroma block based on a second luma quantization parameter of a second luma block of the second image block and a chroma QP mapping table for the second chroma block; determining an
(Continued)

| qPi (Luma QP) | < 30 (0 ..30) | 30 | 31 | 32 | 33 | 34 | 35 | 36 | 37 | 38 | 39 | 40 | 41 | 42 | 43 | > 43 (44 ..63) |
|---|---|---|---|---|---|---|---|---|---|---|---|---|---|---|---|---|
| $QP_{Cb (CIdx == 1)}$ | = qPi | 29 | 30 | 31 | 32 | 33 | 33 | 34 | 34 | 35 | 35 | 36 | 36 | 37 | 37 | = qPi − 6 |

Chroma(Cb) mapping table 1301

| qPi (Luma QP) | < 30 (0 ..30) | 30 | 31 | 32 | 33 | 34 | 35 | 36 | 37 | 38 | 39 | 40 | 41 | 42 | 43 | > 43 (44 ..63) |
|---|---|---|---|---|---|---|---|---|---|---|---|---|---|---|---|---|
| $QP_{Cr (CIdx == 2)}$ | = qPi | 27 | 30 | 31 | 32 | 33 | 33 | 34 | 34 | 35 | 35 | 36 | 36 | 37 | 37 | = qPi − 7 |

Chroma(Cr) mapping table 1302

| qPi (Luma QP) | < 30 (0 ..30) | 30 | 31 | 32 | 33 | 34 | 35 | 36 | 37 | 38 | 39 | 40 | 41 | 42 | 43 | > 43 (44 ..63) |
|---|---|---|---|---|---|---|---|---|---|---|---|---|---|---|---|---|
| $QP_{CbCr (CIdx == 3)}$ | = qPi | 28 | 30 | 31 | 32 | 33 | 33 | 36 | 34 | 35 | 35 | 36 | 36 | 37 | 37 | = qPi − 8 |

Joint Cb-Cr mapping table 1303 averaged and rounded chroma quantization parameter based on the first chroma quantization parameter and the second chroma quantization parameter; and determining a threshold parameter based on the averaged and rounded chroma quantization parameter.

33 Claims, 23 Drawing Sheets

Related U.S. Application Data continuation of application No. PCT/CN2020/110914, filed on Aug. 24, 2020.

(51) Int. Cl.
*H04N 19/176* (2014.01)
*H04N 19/186* (2014.01)

(56) References Cited

U.S. PATENT DOCUMENTS

| | | | |
|---|---|---|---|
| 10,609,371 B2 | 3/2020 | Lim et al. | |
| 2012/0328029 A1 | 12/2012 | Sadafale | |
| 2013/0101024 A1* | 4/2013 | Van der Auwera | H04N 19/136 375/E7.125 |
| 2013/0259141 A1 | 10/2013 | Van der Auwera et al. | |
| 2013/0329785 A1 | 12/2013 | Lim et al. | |
| 2014/0003497 A1* | 1/2014 | Sullivan | H04N 19/186 375/240.03 |
| 2014/0369428 A1 | 12/2014 | Park et al. | |
| 2015/0350687 A1* | 12/2015 | Zhai | H04N 19/82 375/240.25 |
| 2015/0358631 A1* | 12/2015 | Zhang | H04N 19/176 375/240.16 |
| 2015/0373327 A1* | 12/2015 | Zhang | H04N 19/70 375/240.03 |
| 2016/0219283 A1 | 7/2016 | Chen et al. | |
| 2017/0272771 A1 | 9/2017 | Edpalm | |
| 2018/0048901 A1 | 2/2018 | Zhang et al. | |
| 2018/0103253 A1 | 4/2018 | Lu et al. | |
| 2018/0167615 A1* | 6/2018 | Kim | H04N 19/98 |
| 2018/0332286 A1 | 11/2018 | Pettersson et al. | |
| 2018/0376143 A1 | 12/2018 | Andersson et al. | |
| 2019/0116361 A1* | 4/2019 | Rusanovskyy | H04N 19/197 |
| 2020/0329257 A1 | 10/2020 | Zhao et al. | |
| 2021/0058643 A1 | 2/2021 | Zhao et al. | |
| 2021/0211656 A1* | 7/2021 | Wang | H04N 19/105 |
| 2021/0227221 A1 | 7/2021 | Lim et al. | |
| 2021/0227222 A1 | 7/2021 | Lee et al. | |
| 2021/0266552 A1 | 8/2021 | Kotra et al. | |

FOREIGN PATENT DOCUMENTS

| | | |
|---|---|---|
| CN | 109479152 A | 3/2019 |
| WO | 2019121164 A1 | 6/2019 |
| WO | 2021076475 A1 | 4/2021 |

OTHER PUBLICATIONS

Office Action issued in JP2021-544630, dated Sep. 6, 2022, 11 pages.

Benjamin Bross et al: "Versatile Video Coding (Draft 7)", 16. JVET Meeting; Oct. 1, 2019-Oct. 11, 2019; Geneva; (The Joint Video Exploration Team of ISO/IEC JTC1/SC29/WG11 and ITU-T SG. 16 ), No. JVET-P2001-vE, 489 pages.

Kotra (Huawei) A M et al: "Non-CE5: Chroma QP derivation fix for deblocking filter (Combination of JVET-P0105 and JVET-P0539)", 16. JVET Meeting; Oct. 1, 2019-Oct. 11, 2019; Geneva; (The Joint Video Exploration Team of ISO/IEC JTC1/SC29/WG11 and ITU-T SG. 16 ), No. JVET-P1001-V1, 7 pages.

Kotra (Huawei) A M et al: "Non-CE5: Modified Chroma QP derivationfor deblocking filter", 16. JVET Meeting; Oct. 1, 2019-Oct. 11, 2019; Geneva; (The Joint Video Exploration Team of 1S0/IEC JTC1/SC29/WG11 and ITU-T SG.16 ), No. JVET-P0105-v2, 5 pages.

Xu (Bytedance) J et al: "Non-CE5: A chroma deblocking clean-up", 16. JVET Meeting; Oct. 1, 2019-Oct. 11, 2019; Geneva; (The Joint Video Exploration Team of 1S0/IEC JTC1/SC29/WG11 and ITU-T SG. 16 ), No. JVET-P0539, 3 pages.

Extended European Search Report issued in EP20858263.5, dated Nov. 17, 2021, 18 pages.

Benjamin Bross et al,"Versatile Video Coding {Draft 6)", Joint Video Experts Team {JVET) of ITU-T SG 16 WP 3 and SO/IEC JTC 1/SC 29/WG 11, 15th Meeting: Gothenburg, SE, Jul. 3-12, 2019, Document: JVET-02001-vE, total 455 pages.

ITU-T H.262,"SERIES H: Audiovisual and Multimedia Systems, Infrastructure of audiovisual services—Coding of moving video", Feb. 2012, total 238 pages.

ITU-T H.263,"SERIES H: Audiovisual and Multimedia Systems, Infrastructure of audiovisual services—Coding of moving video", Jan. 2005, total 226 pages.

ITU-T H.264,"SERIES H: Audiovisual and Multimedia Systems Infrastructure of audiovisual services—Coding of moving video", Jun. 2019, total 836 pages.

ITU-T H.265,"SERIES H: Audiovisual and Multimedia Systems, Infrastructure of audiovisual services—Coding of moving video", Jun. 2019, total 696 pages.

PCTEP2019072643, dated Aug. 23, 2019, 183 pages.

Office Action issued in U.S. Appl. No. 17/319,098, dated Aug. 18, 2021, 10 pages.

Notice of Allowance issued in U.S. Appl. No. 17/319,098, dated Dec. 7, 2021, 8 pages.

\* cited by examiner

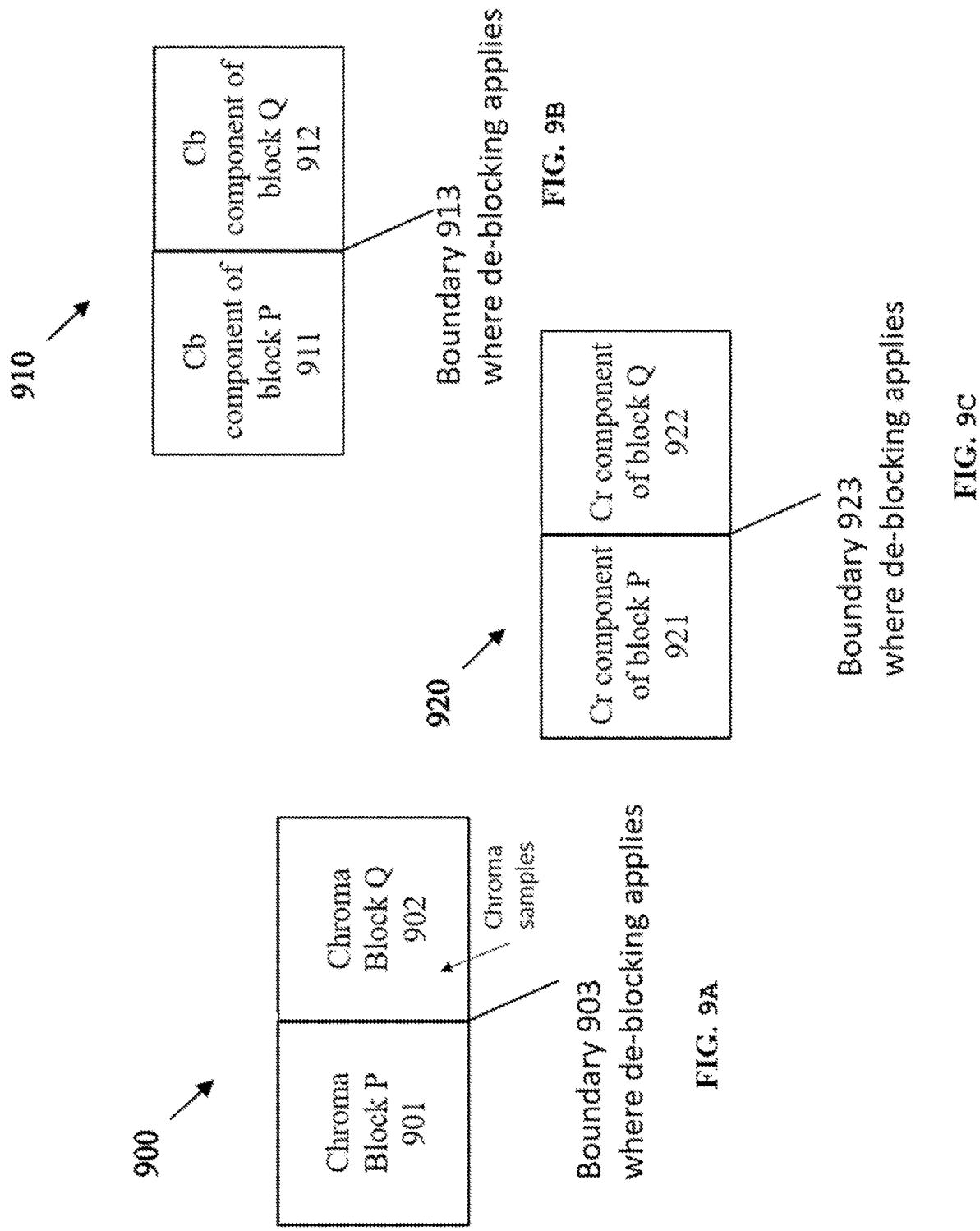

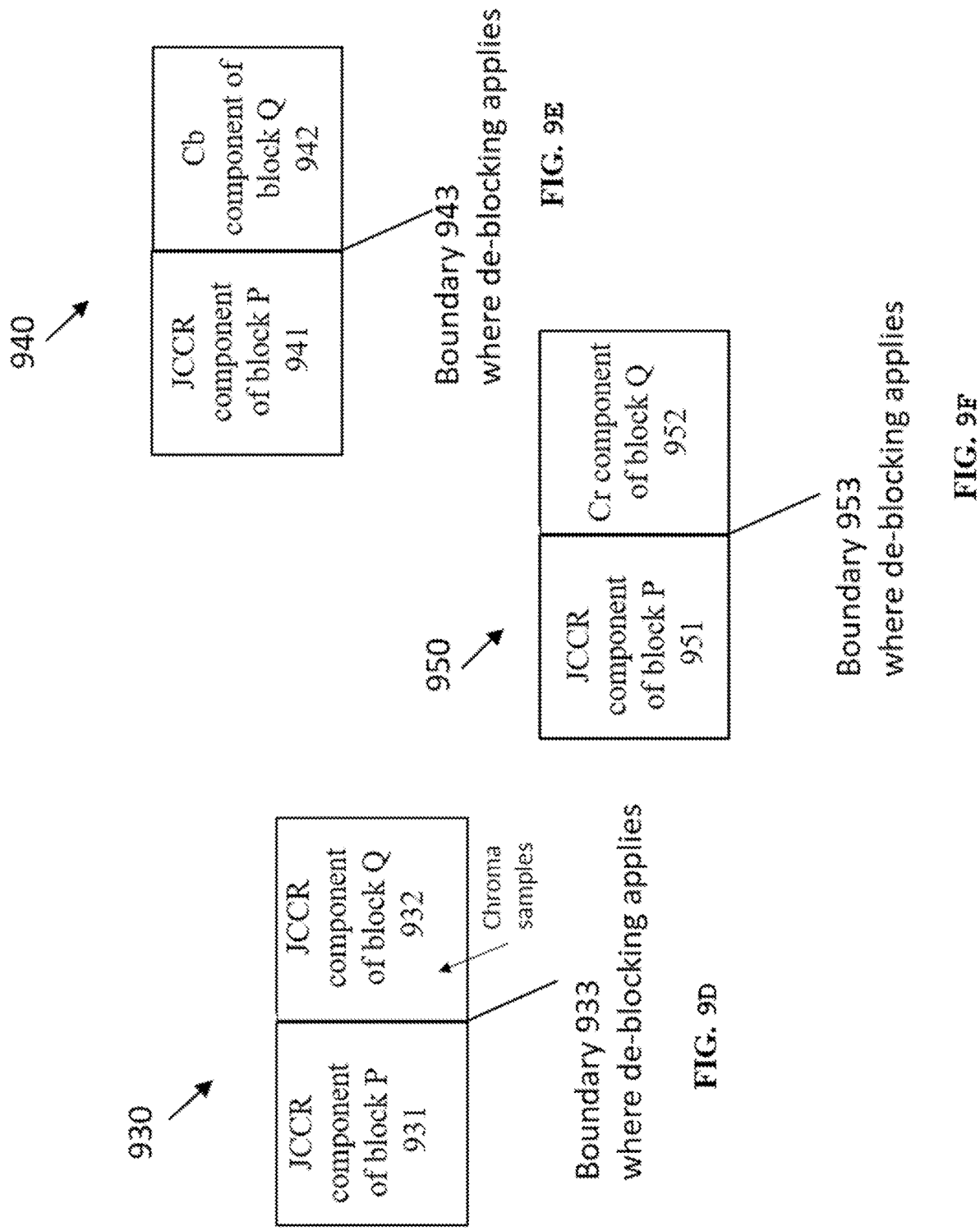

| qPi (Luma QP) | < 30 (0..30) | 30 | 31 | 32 | 33 | 34 | 35 | 36 | 37 | 38 | 39 | 40 | 41 | 42 | 43 | > 43 (44..63) |
|---|---|---|---|---|---|---|---|---|---|---|---|---|---|---|---|---|
| $QP_{cb}$ (CIdx == 1) | = qPi | 29 | 30 | 31 | 32 | 33 | 33 | 34 | 34 | 35 | 35 | 36 | 36 | 37 | 37 | = qPi − 6 |
| $QP_{cr}$ (CIdx == 2) | = qPi | 29 | 30 | 31 | 32 | 33 | 33 | 34 | 34 | 35 | 35 | 36 | 36 | 37 | 37 | = qPi − 6 |
| $QP_{JCCR}$ (CIdx == 3) | = qPi | 29 | 30 | 31 | 32 | 33 | 36 | 34 | 34 | 35 | 35 | 34 | 36 | 37 | 37 | = qPi − 7 | table 1200

ChromaQpTable[ i ][ k ]

FIG. 12A

| qPi (Luma QP) | < 30 (0..30) | 30 | 31 | 32 | 33 | 34 | 35 | 36 | 37 | 38 | 39 | 40 | 41 | 42 | 43 | > 43 (44..63) |
|---|---|---|---|---|---|---|---|---|---|---|---|---|---|---|---|---|
| index=0 | = qPi | 29 | 30 | 31 | 32 | 33 | 33 | 34 | 34 | 35 | 35 | 36 | 36 | 37 | 37 | = qPi − 6 |
| index=1 | = qPi | 29 | 30 | 31 | 32 | 33 | 33 | 34 | 34 | 35 | 35 | 36 | 36 | 37 | 37 | = qPi − 6 |
| index=2 | = qPi | 29 | 30 | 31 | 32 | 33 | 36 | 34 | 34 | 35 | 35 | 34 | 36 | 37 | 37 | = qPi − 7 |

ChromaQpTable[ i ][ k ]

table 1200'

FIG. 12B

| qPi (Luma QP) | < 30 (0..30) | 30 | 31 | 32 | 33 | 34 | 35 | 36 | 37 | 38 | 39 | 40 | 41 | 42 | 43 | > 43 (44..63) |
|---|---|---|---|---|---|---|---|---|---|---|---|---|---|---|---|---|
| $QP_{Cb\,(CIdx\,=\,1)}$ | = qPi | 29 | 30 | 31 | 32 | 33 | 33 | 34 | 34 | 35 | 35 | 36 | 36 | 37 | 37 | = qPi − 6 |

Chroma(Cb) mapping table 1301

| qPi (Luma QP) | < 30 (0..30) | 30 | 31 | 32 | 33 | 34 | 35 | 36 | 37 | 38 | 39 | 40 | 41 | 42 | 43 | > 43 (44..63) |
|---|---|---|---|---|---|---|---|---|---|---|---|---|---|---|---|---|
| $QP_{Cr\,(CIdx\,=\,2)}$ | = qPi | 27 | 30 | 31 | 32 | 33 | 33 | 34 | 34 | 35 | 35 | 36 | 36 | 37 | 37 | = qPi − 7 |

Chroma(Cr) mapping table 1302

| qPi (Luma QP) | < 30 (0..30) | 30 | 31 | 32 | 33 | 34 | 35 | 36 | 37 | 38 | 39 | 40 | 41 | 42 | 43 | > 43 (44..63) |
|---|---|---|---|---|---|---|---|---|---|---|---|---|---|---|---|---|
| $QP_{JCCR\,(CIdx\,=\,3)}$ | = qPi | 28 | 30 | 31 | 32 | 33 | 33 | 34 | 34 | 35 | 35 | 36 | 36 | 37 | 37 | = qPi − 8 |

Joint Cb-Cr mapping table 1303

1601, performing a decision process for the chroma block edge 1603, performing a filtering process for the chroma block edge based on a decision result of the decision process

FIG.16

PERFORMING CHROMA DEBLOCKING FOR BLOCKS WHICH USE JOINT CHROMA CODING

CROSS-REFERENCE TO RELATED APPLICATIONS

This application is a continuation of U.S. patent application Ser. No. 17/319,098, filed on May 13, 2021, which is a continuation of International Application No. PCT/CN2020/110914, filed on Aug. 24, 2020, The International Application claims priority to International Patent Application No. PCT/EP2019/072643, filed on Aug. 23, 2019 and International Application No. PCT/RU2019/000639, filed on Sep. 16, 2019 and International Application No. PCT/EP2019/077057, filed on Oct. 7, 2019. All of the aforementioned patent applications are hereby incorporated by reference in their entireties.

TECHNICAL FIELD

Embodiments of the present disclosure generally relate to the field of image processing, for example still picture and/or video picture coding. Especially, the invention deals with improvements of the deblocking filter.

BACKGROUND

Image coding (encoding and decoding) is used in a wide range of digital image applications, for example broadcast digital TV, video transmission over internet and mobile networks, real-time conversational applications such as video chat, video conferencing, DVD and Blu-ray discs, video content acquisition and editing systems, and camcorders of security applications.

Since the development of the block-based hybrid video coding approach in the H.261 standard in 1990, new video coding techniques and tools were developed and formed the basis for new video coding standards. One of the goals of most of the video coding standards was to achieve a bitrate reduction compared to its predecessor without sacrificing picture quality. Further video coding standards comprise MPEG-1 video, MPEG-2 video, ITU-T H.262/MPEG-2, ITU-T H.263, ITU-T H.264/MPEG-4, Part 10, Advanced Video Coding (AVC), ITU-T H.265, High Efficiency Video Coding (HEVC), ITU-T H.266/Versatile video coding (VVC) and extensions, e.g. scalability and/or three-dimensional (3D) extensions, of these standards.

Block-based image coding schemes have in common that along the block edges, edge artifacts can appear. These artifacts are due to the independent coding of the coding blocks. These edge artifacts are often readily visible to a user. A goal in block-based image coding is to reduce edge artifacts below a visibility threshold. This is done by performing loop filtering, such as by performing deblocking filtering. Such a deblocking filtering is on the one hand performed on decoding side in order to remove the visible edge artifacts, but also on encoding side, in order to prevent the edge artifacts from being encoded into the image at all. Deblocking filter process generally include decision process and filtering process for luma block edges, and decision process and filtering process for chroma block edges.

However, deblocking a chroma block edge between two adjacent chroma blocks can be challenging. For example, the information used to deblock the chroma block edge may be derived from the corresponding luma block and get lost during the derivation process, leading to inaccurate deblocking process. In another example, new type of chroma blocks, such as chroma blocks coded using joint Cb-Cr residual (JCCR) coding tools (or namely joint coding of chrominance residuals (JCCR) tools) can pose new challenges to deblocking filtering.

SUMMARY

In view of the above-mentioned challenges, the present invention aims to improve the conventional deblocking filtering. The present invention has the objective to provide a deblocking filter apparatus, an encoder, a decoder and corresponding methods that can perform deblocking filtering in accurate way, thus the deblocking should be more efficient.

Embodiments of the invention are defined by the features of the independent claims, and further advantageous implementations of the embodiments by the features of the dependent claims.

Particular embodiments are outlined in the attached independent claims, with other embodiments in the dependent claims.

According to a first aspect the invention relates to a deblocking method, for deblocking a chroma block edge between a first chroma block of a first image block and a second chroma block of a second image block, in an image encoding and/or an image decoding, wherein the deblocking method comprises:
performing a decision process for the chroma block edge, wherein the decision process comprises:
  determining a first chroma quantization parameter ($Qp_{Cp}$) for the first chroma block based on a first luma quantization parameter ($Qp_{YP}$) of a first luma block (801) of the first image block and a chroma quantization parameter (QP) mapping table for the first chroma block;
  determining a second chroma quantization parameter ($Qp_{Cq}$) for the second chroma block based on a second luma quantization parameter ($Qp_{YQ}$) of a second luma block of the second image block and a chroma QP mapping table for the second chroma block;
  determining a third chroma quantization parameter (e.g. an averaged and rounded chroma quantization parameter) ($Qp_C$) based on the first chroma quantization parameter ($Qp_{Cp}$) for the first chroma block and the second chroma quantization parameter ($Qp_{Cq}$) for the second chroma block; and
  determining a threshold parameter ($t_C$) based on the third chroma quantization parameter (e.g. an averaged and rounded chroma quantization parameter) ($Qp_C$);
performing a filtering process for the chroma block edge at least based on the threshold parameter.

It can be understood that the third chroma QP ($Qp_C$) may be directly or indirectly used for determining whether the chroma block edge is to be filtered and/or whether to apply strong or normal deblocking (such as, a long filtering or a weak filtering is to be performed). In an example, the threshold parameter ($t_C$) may depend on the third chroma quantization parameter (e.g. the averaged and rounded chroma quantization parameter) ($Qp_C$) and may be derived from a look-up table. The threshold parameter ($t_C$) may be used for determining whether the chroma block edge is to be filtered and/or whether to apply strong or normal deblocking (such as, a long filtering or a weak filtering is to be performed). It is noted that the threshold parameter ($t_C$) is the clipping parameter during the filtering process for the chroma block edge (particularly, the filtering process for one or more chroma samples which are perpendicular and adjacent to the chroma block edge).

It can be understood that for the filtering process for the chroma block edge, correspondingly in the second chroma block, for each line of input chroma samples which are perpendicular and adjacent to the chroma block edge, at most MA number of chroma samples are modified to generate the output filtered chroma samples; in the first chroma block, for each line of input chroma samples which are perpendicular and adjacent to the chroma block edge, at most MB number of chroma samples are modified to generate the output filtered chroma samples. It can be understood that the value of MA or MB depends on the block size (the width and height) of any of the first and second chroma blocks.

It is noted that the details on how the threshold parameter ($t_C$) is used for the filtering process for the chroma block edge can be in documents such as the VVC specification, which are not repeated here.

It is noted that the term "block", "coding block" or "image block" is used in the present disclosure which can be applied for transform units (TUs), prediction units (PUs), coding units (CUs) etc. In VVC in general transform units and coding units are mostly aligned except in few scenarios when TU tiling or sub block transform (SBT) is used. It can be understood that the terms "block/image block/coding block/transform block", and "block size/transform block size" may be exchanged with each other in the present disclosure. The terms "sample/pixel" may be exchanged with each other in the present disclosure.

The invention works for both vertical and horizontal chroma block edges.

This allows for deblocking a chroma block edge between a first chroma block of a first image block and a second chroma block of a second image block correctly. With the technology presented herein, the information contained in the luma QP for two adjacent blocks are preserved and used to determine the respective chroma QPs. This prevents the information loss suffered by the existing approach where the chroma QP is determined based on an averaged value of luma QPs of the two adjacent luma blocks. In addition, using respective ChromaQP mapping tables as presented herein allows the chroma QP to be determined more accurately for different chroma components. As a result, the deblocking process is more effective in removing blocking artifacts, thereby improving the visual quality of the coded video.

In a possible implementation form, at least one of the first chroma and the second chroma block is a Joint Cb-Cr residual (JCCR) coded block.

With the technology presented herein the final Chroma QP value for the Joint Cb-Cr coded blocks can be derived (or mapped) correctly based on its corresponding Luma QP value to achieve correct deblocking decisions and thereby achieving better visual quality of the coded video. Thus, the result of the deblocking filtering is significantly improved.

In a possible implementation form, the first chroma block is a Joint Cb-Cr residual (JCCR) coded block of the first image block, and the second chroma block is a Joint Cb-Cr residual (JCCR) coded block of the second image block; or the first chroma block is a Joint Cb-Cr residual (JCCR) coded block of the first image block, and the second chroma block is a first chroma component of the second image block; or the first chroma block is a Joint Cb-Cr residual (JCCR) coded block of the first image block, and the second chroma block is a second chroma component of the second image block; or the first chroma block is a first chroma component of the first image block, and the second chroma block is a Joint Cb-Cr residual (JCCR) coded block of the second image block; or the first chroma block is a second chroma component of the first image block, and the second chroma block is a Joint Cb-Cr residual (JCCR) coded block of the second image block; or the first chroma block is a first chroma component of the first image block, and the second chroma block is a first chroma component of the second image block; or the first chroma block is a second chroma component of the first image block, and the second chroma block is a second chroma component of the second image block.

With the technology presented herein, in the case that the first and second chroma blocks are different types, the order of the steps of the method according to embodiments of the present disclosure is reasonable without information loss. In addition, the final derived Chroma QP values for the chroma blocks including the Joint Cb-Cr coded blocks are more accurate and therefore can results in better deblocking decisions thereby resulting in better visual quality.

In a possible implementation form, the chroma quantization parameter (QP) mapping table for the first chroma block or the second chroma block comprises at least one of:

a first chroma QP mapping table for a joint Cb-Cr coded block.

a second chroma QP mapping table for a first chroma component (such as a Cb component), or a third chroma QP mapping table for a second chroma component (such as a Cr component).

In an example, each chroma QP mapping table has a same number of entries. It is noted that in the specification, claims, and accompanying drawings of the present invention, the terms "first", "second", "third" and so on (if existent) are intended to distinguish between similar objects but do not necessarily indicate a specific order or sequence.

With the technology presented herein, using respective ChromaQP mapping tables as presented herein allows the chroma QP to be determined more accurately for different chroma components. As a result, the deblocking process is more effective in removing blocking artifacts, thereby improving the visual quality of the coded video.

In a possible implementation form, wherein the first chroma QP mapping table, the second chroma QP mapping table and the third chroma QP mapping table are indicated or indexed by a first index value, a second index value and a third index value, respectively.

In an example, when the second index value is equal to 0, ChromaQpTable[0] is the second chroma QP mapping table for the first chroma component. When the third index value is equal to 1, ChromaQpTable[1] is the third chroma QP mapping table for the second chroma component. When the first index value is equal to 2, ChromaQpTable[2] is the first chroma QP mapping table for a Joint Cb-Cr residual (JCCR) coded block. In an example, the chroma QP mapping table ChromaQpTable[i] may be derived based on parameters or information obtained from a bitstream, i=0, 1 or 2. In another example, ChromaQpTable[i] may be pre-defined chroma QP mapping tables.

In a possible implementation form, wherein the first index value is 3, the second index value is 1 and the third index is 2; or wherein the first index value is 2, the second index value is 0 and the third index is 1.

In a possible implementation form, if the first chroma block is a Joint Cb-Cr residual (JCCR) coded block of the first image block, the first chroma quantization parameter ($Qp_{Cp}$) is derived based on a chroma QP value that corresponds to a clipped value of the first luma quantization parameter ($Qp_{YP}$) in the first chroma QP mapping table;

if the first chroma block is a first chroma component (such as a Cb component) of the first image block, the first chroma quantization parameter ($Qp_{Cp}$) is derived based on a chroma QP value that corresponds to a clipped value of the first luma quantization parameter ($Qp_{YP}$) in the second chroma QP mapping table; or if the first chroma block is a second chroma component (such as a Cr component) of the first image block, the first chroma quantization parameter ($Qp_{Cp}$) is derived based on a chroma QP value that corresponds to a clipped value of the first luma quantization parameter ($Qp_{YP}$) in the third chroma QP mapping table.

It is noted that the first luma quantization parameter ($Qp_{YP}$) of the first luma block is not directly used to derive the first chroma quantization parameter ($Qp_{Cp}$) for the first chroma block. An intermediate step such as clipping can be used on the first luma QP.

With the technology presented herein, using respective ChromaQP mapping tables as presented herein allows the chroma QP to be determined more accurately for different chroma components. As a result, the deblocking process is more effective in removing blocking artifacts, thereby improving the visual quality of the coded video.

In a possible implementation form, if the second chroma block is a Joint Cb-Cr residual (JCCR) coded block of the second image block, the second chroma quantization parameter ($Qp_{Cq}$) is derived based on a chroma QP value that corresponds to a clipped value of the second luma quantization parameter ($Qp_{YQ}$) in the first chroma QP mapping table;

if the second chroma block is a first chroma component (such as a Cb component) of the second image block, the second chroma quantization parameter ($Qp_{Cq}$) is derived based on a chroma QP value that corresponds to a clipped value of the second luma quantization parameter ($Qp_{YQ}$) in the second chroma QP mapping table; or if the second chroma block is a second chroma component (such as a Cr component) of the second image block, the second chroma quantization parameter ($Qp_{Cq}$) is derived based on a chroma QP value that corresponds to a clipped value of the second luma quantization parameter ($Qp_{YQ}$) in the third chroma QP mapping table.

It is noted that the second luma quantization parameter ($Qp_{YQ}$) of the second luma block is not directly used to derive the second chroma quantization parameter ($Qp_{Cq}$) for the second chroma block. An intermediate step such as clipping can be used on the second luma QP.

With the technology presented herein, using respective ChromaQP mapping tables as presented herein allows the chroma QP to be determined more accurately for different chroma components. As a result, the deblocking process is more effective in removing blocking artifacts, thereby improving the visual quality of the coded video.

In a possible implementation form, the determining a first chroma quantization parameter ($Qp_{Cp}$) for the first chroma block based on a first luma quantization parameter ($Qp_{YP}$) of a first luma block of the first image block and a chroma quantization parameter (QP) mapping table for the first chroma block, comprises:

obtaining a clipped QP value ($qPi_{Chroma}$) based on the first luma quantization parameter ($Qp_{YP}$) of the first luma block (801); such as, $qPi_{Chroma}=Clip3(QpBdOffset,63,Qp_{YP})$; determining a chroma QP value ($qPi_{Cb}$, $qPi_{Cr}$, $qPi_{CbCr}$) for the first chroma block based on the clipped QP value ($qPi_{Chroma}$) by using the chroma QP mapping table for the first chroma block; and determining the first chroma quantization parameter ($Qp_{Cp}$) for the first chroma block based on a clipped value of the chroma QP value ($qPi_{Cb}$, $qPi_{Cr}$, $qPi_{CbCr}$).

In an example, the first chroma quantization parameter ($Qp_{Cp}$) is obtained by adding a pre-defined value QpBdOffset to the clipped value of the chroma QP value ($qPi_{Cb}$, $qPi_{Cr}$, $qPi_{CbCr}$), the pre-defined value is obtained based on the bit-depth of the coded sequences. With the technology presented herein, it allows the value of the first chroma quantization parameter ($Qp_{Cp}$) being nonzero.

In a possible implementation form, the determining a second chroma quantization parameter ($Qp_{Cq}$) for the second chroma block based on a second luma quantization parameter ($Qp_{YQ}$) of a second luma block of the second image block and the chroma QP mapping table for the second chroma block, comprises:

obtaining a clipped QP value ($qPi_{Chroma}$) based on the second luma quantization parameter ($Qp_{YQ}$) of the second luma block; such as, $qPi_{Chroma}=Clip3(QpBdOffset,63,Qp_{YQ})$;

determining a chroma QP value ($qPi_{Cb}$, $qPi_{Cr}$, $qPi_{CbCr}$) for the second chroma block based on the clipped QP value ($qPi_{Chroma}$) by using the chroma QP mapping table for the second chroma block; and determining the second chroma quantization parameter ($Qp_{Cq}$) for the second chroma block based on a clipped value of the chroma QP value ($qPi_{Cb}$, $qPi_{Cr}$, $qPi_{CbCr}$).

In an example, the second chroma quantization parameter ($Qp_{Cq}$) is obtained by adding a pre-defined value QpBdOffset to the clipped value of the chroma QP value ($qPi_{Cb}$, $qPi_{Cr}$, $qPi_{CbCr}$), the pre-defined value is obtained based on the bit-depth of the coded sequences. With the technology presented herein, it allows the value of the second chroma quantization parameter ($Qp_{Cq}$) being nonzero.

In a possible implementation form, the determining the third chroma quantization parameter ($Qp_C$) based on the first chroma quantization parameter ($Qp_{Cp}$) for the first chroma block and the second chroma quantization parameter ($Qp_{Cq}$) for the second chroma block, comprises:

determining the third chroma quantization parameter (e.g. an averaged and rounded chroma quantization parameter $Qp_C$) ($Qp_C$) according to the following equation, $$Qp_C=(Qp_Q+Qp_P+1)\gg 1$$

wherein $Qp_P$ is based on the first chroma quantization parameter ($Qp_{Cp}$) for the first chroma block and $Qp_Q$ is based on the second chroma quantization parameter ($Qp_{Cq}$) for the second chroma block.

It can be understood that the motivation of averaging using right shift is to avoid using division, as in hardware division is an expensive operations. In practice, the averaging is usually implemented in this way (a+b+1)>>1. The addition of 1 before right shift is a rounding approximation, ensure the average result is rounded, for example, $(a+b+2^{bits-1})\gg bits$ equal to $(a+b+2^{bits-1})/2^{bits}$, such as, bits=1.

In a possible implementation form, $Qp_P$ is obtained by subtracting an offset value (QpBdOffset) from the first chroma quantization parameter ($Qp_{Cp}$) for the first chroma block; and $Qp_Q$ is obtained by subtracting the offset value (QpBdOffset) from the second chroma quantization parameter ($Qp_{Cq}$) for the second chroma block.

In a possible implementation form, the joint Cb-Cr coded block is coded using a JCCR mode and the JCCR mode is a second mode of a set of available JCCR modes. Such as, the variable TuCResMode is set equal to 2.

According to a second aspect the invention relates to a deblocking filter apparatus for use in an image encoder and/or an image decoder, for deblocking a chroma block edge between a first chroma block of a first image block and a second chroma block of a second image block, wherein the deblocking filter apparatus is configured to:

perform a decision process for the chroma block edge, wherein the decision process comprises:
  determining a first chroma quantization parameter ($Qp_{Cp}$) for the first chroma block based on a first luma quantization parameter ($Qp_{YP}$) of a first luma block of the first image block and a chroma quantization parameter (QP) mapping table for the first chroma block;
  determining a second chroma quantization parameter ($Qp_{Cq}$) for the second chroma block based on a second luma quantization parameter ($Qp_{YQ}$) of a second luma block (802) of the second image block and a chroma QP mapping table for the second chroma block;
  determining a third chroma quantization parameter ($Qp_C$) based on the first chroma quantization parameter ($Qp_{Cp}$) for the first chroma block and the second chroma quantization parameter ($Qp_{Cq}$) for the second chroma block; and
  determining a threshold parameter ($t_C$) based on the third chroma quantization parameter ($Qp_C$);
perform a filtering process for the chroma block edge at least based on the threshold parameter.

The apparatus according to the second aspect can be extended into implementation forms corresponding to the implementation forms of the method according to the first aspect. Hence, an implementation form of the apparatus comprises the feature(s) of the corresponding implementation form of the method according to the first aspect.

The advantages of the apparatus s according to the second aspect are the same as those for the corresponding implementation forms of the method according to the first aspect.

The method according to the first aspect of the invention can be performed by the apparatus according to the second aspect of the invention. Further features and implementation forms of the method according to the first aspect of the invention correspond to the features and implementation forms of the apparatus according to the second aspect of the invention.

According to a third aspect of the invention, a video encoding apparatus is provided, the video encoding apparatus for encoding a picture of a video stream, wherein the video encoding apparatus comprises the deblocking filter apparatus according to any preceding implementation of the any preceding aspect or the any preceding aspect as such.

This allows for a very efficient and accurate encoding of the image.

According to a fourth aspect of the invention, a video decoding apparatus is provided, the video decoding apparatus for decoding a picture of an encoded video stream, wherein the video decoding apparatus comprises the deblocking filter apparatus according to any preceding implementation of the any preceding aspect or the any preceding aspect as such.

This allows for an especially accurate and efficient decoding of the image.

According to a fifth aspect of the invention relates to an apparatus for decoding a video stream includes a processor and a memory. The memory is storing instructions that cause the processor to perform the deblocking method according to any preceding implementation of the any preceding aspect or the any preceding aspect as such.

According to a sixth aspect the invention relates to an apparatus for encoding a video stream includes a processor and a memory. The memory is storing instructions that cause the processor to perform the deblocking method according to any preceding implementation of the any preceding aspect or the any preceding aspect as such.

According to another aspect, a computer-readable storage medium having stored thereon instructions that when executed cause one or more processors configured to code video data is proposed. The instructions cause the one or more processors to perform the deblocking method according to any preceding implementation of the any preceding aspect or the any preceding aspect as such.

According to another aspect, a computer program product with a program code for performing the deblocking method according to any preceding implementation of the any preceding aspect or the any preceding aspect as such when the computer program runs on a computer, is provided.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the invention are described in more detail with reference to the attached figures and drawings, in which:

FIGS. 9A to 9H are schematic diagrams illustrating an example mechanism of deblocking a chroma block edge between a first chroma block of a first image block and a second chroma block of a second image block;

FIGS. 12A and 12B show two exemplary Chroma QP mapping tables;

FIG. 13 shows an exemplary separate Chroma Qp mapping table for each component;

FIG. 16 is a flowchart of a deblocking method according to some aspects of the present disclosure.

Figure 1A:
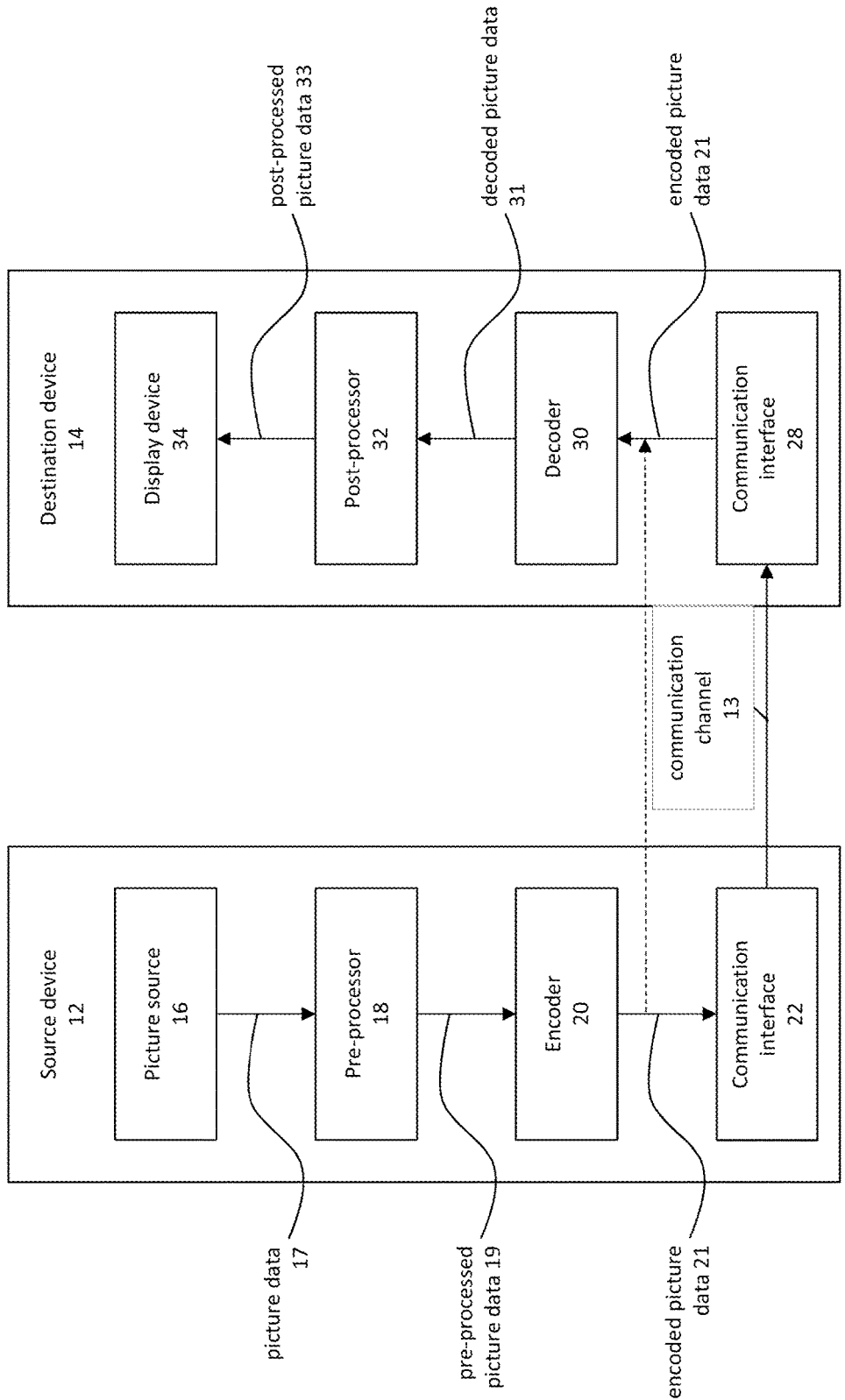
FIG. 1A is a block diagram showing an example of a video coding system configured to implement embodiments of the invention.

In the following identical reference signs refer to identical or at least functionally equivalent features if not explicitly specified otherwise.

DETAILED DESCRIPTION OF THE EMBODIMENTS

The following definitions are used for the reference:

coding block: An M×N block of samples for some values of M and N such that the division of a CTB into coding blocks is a partitioning.

coding tree block (CTB): An N×N block of samples for some value of N such that the division of a component into CTBs is a partitioning.

coding tree unit (CTU): A CTB of luma samples, two corresponding CTBs of chroma samples of a picture that has three sample arrays, or a CTB of samples of a monochrome picture or a picture that is coded using three separate colour planes and syntax structures used to code the samples.

coding unit (CU): A coding block of luma samples, two corresponding coding blocks of chroma samples of a picture that has three sample arrays, or a coding block of samples of a monochrome picture or a picture that is coded using three separate colour planes and syntax structures used to code the samples.

component: An array or single sample from one of the three arrays (luma and two chroma) that compose a picture in 4:2:0, 4:2:2, or 4:4:4 colour format or the array or a single sample of the array that compose a picture in monochrome format.

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application.

Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 21.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17. Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 21 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
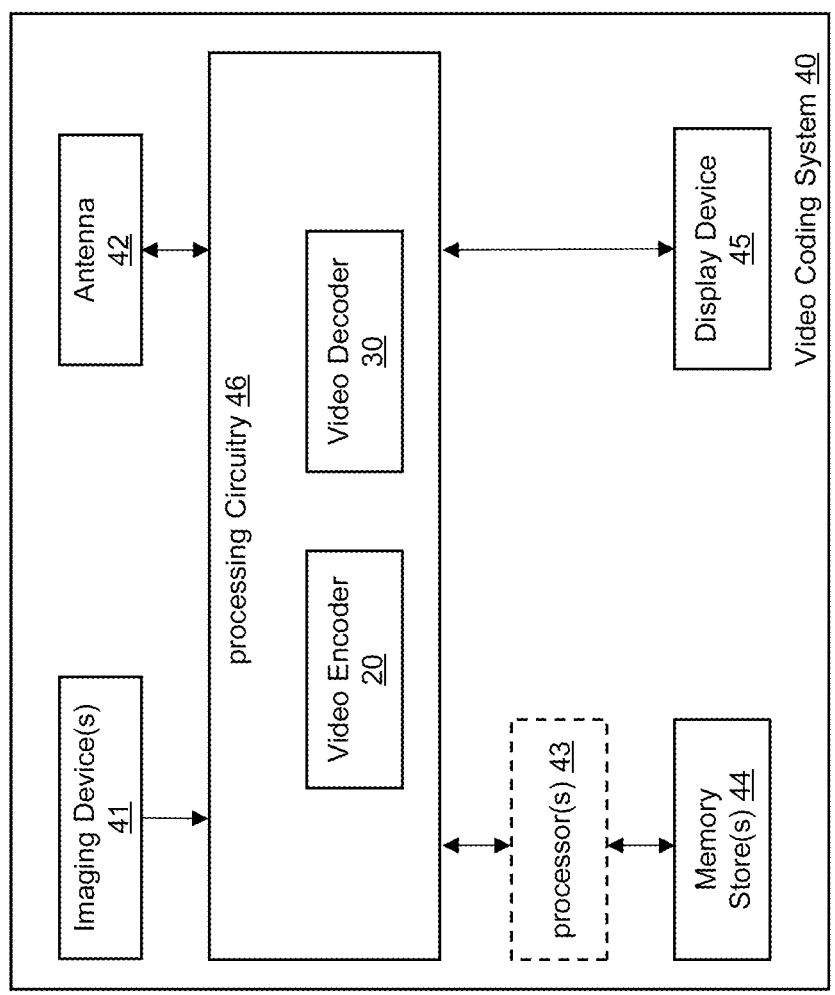
FIG. 1B is a block diagram showing another example of a video coding system configured to implement embodiments of the invention.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the invention are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the invention are not limited to HEVC or VVC.

Encoder and Encoding Method

Figure 2:
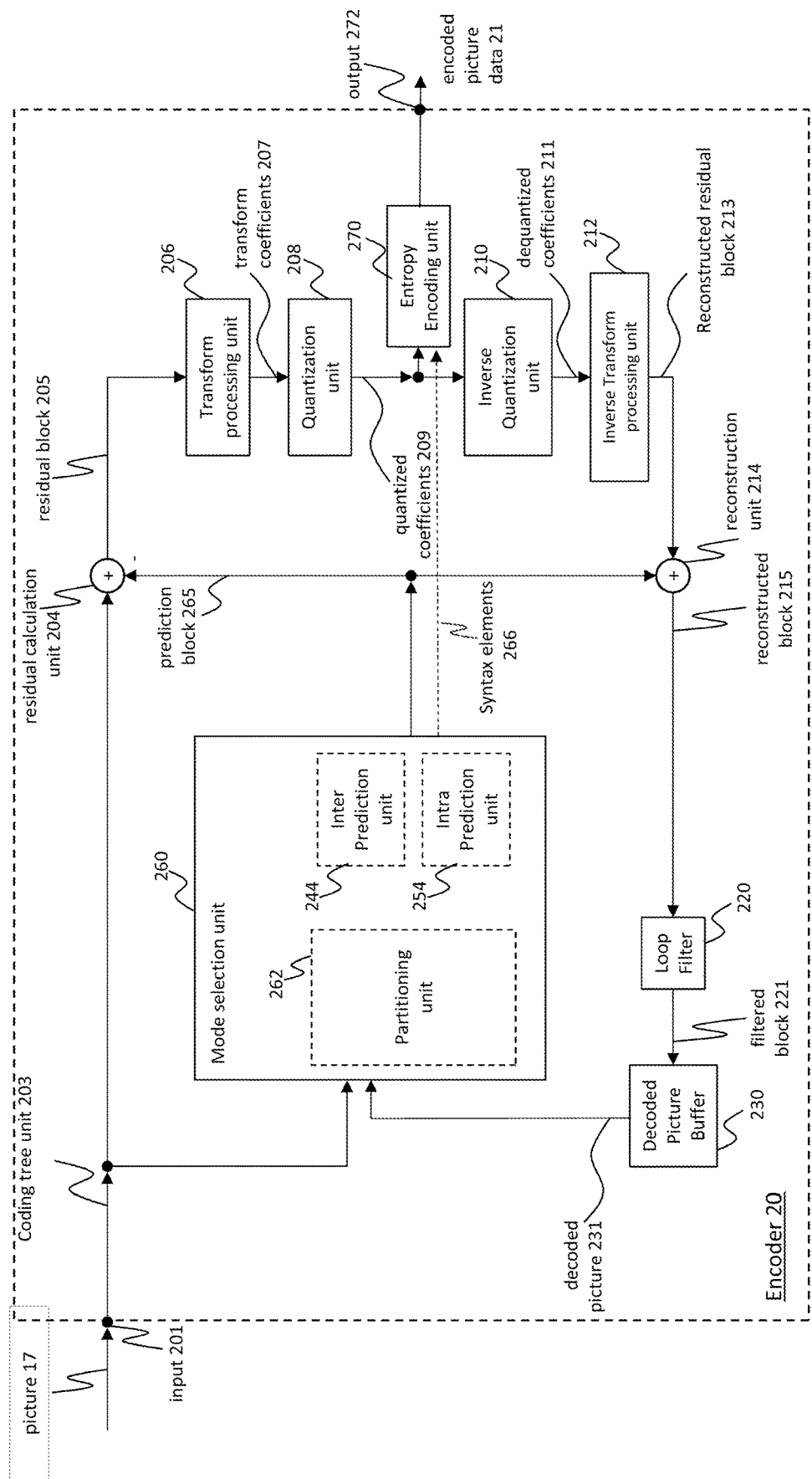
FIG. 2 is a block diagram showing an example of a video encoder configured to implement embodiments of the invention.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
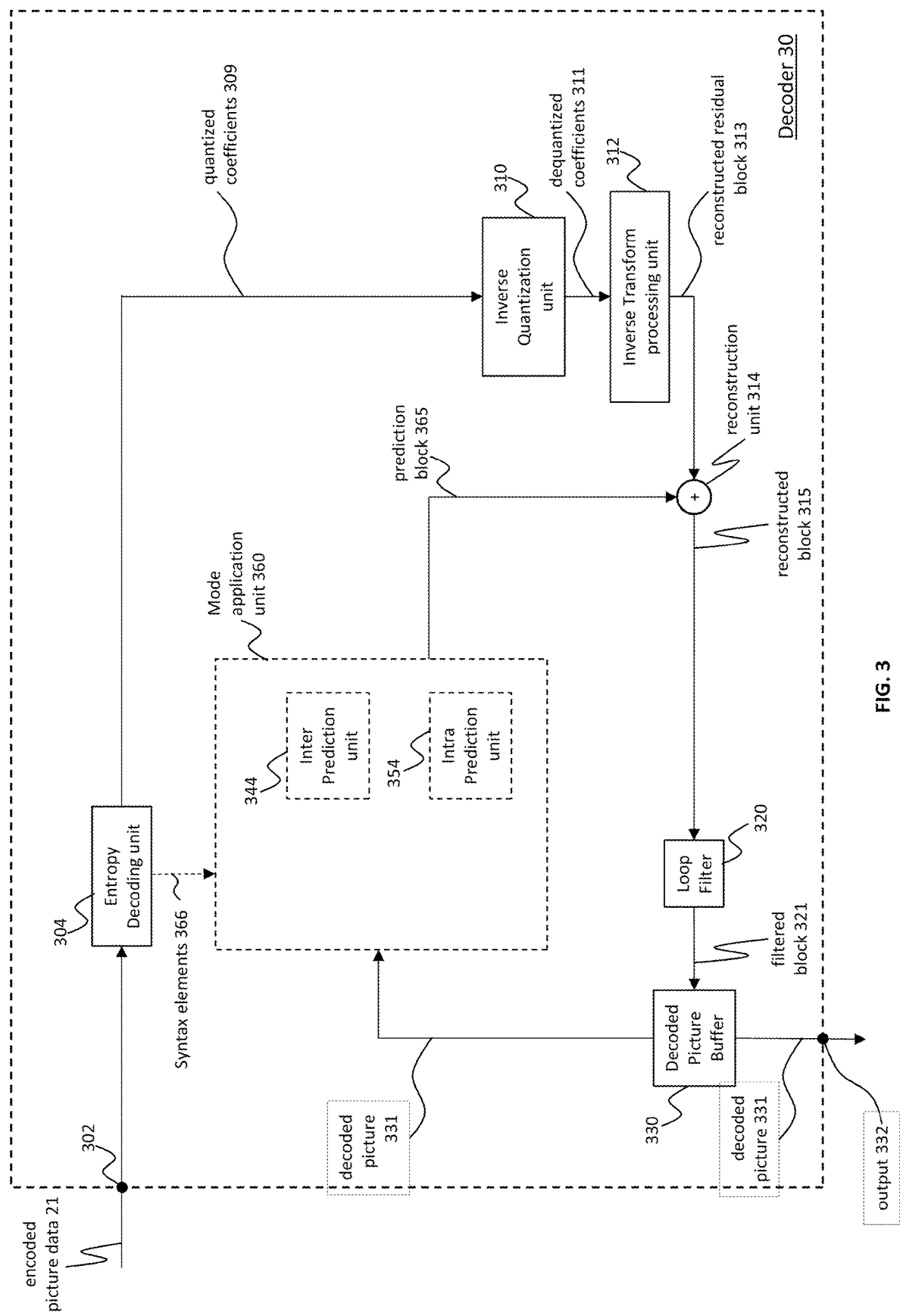
FIG. 3 is a block diagram showing an example structure of a video decoder configured to implement embodiments of the invention.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RGB format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203. Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs) or one or more groups of blocks (e.g. tiles (H.265/HEVC and VVC) or bricks (VVC)).

Embodiments of the video encoder 20 as shown in FIG. 2 may be further configured to partition and/or encode the picture by using slices/tile groups (also referred to as video tile groups) and/or tiles (also referred to as video tiles), wherein a picture may be partitioned into or encoded using one or more slices/tile groups (typically non-overlapping), and each slice/tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding inverse quantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered sample values. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. an adaptive loop filter (ALF), a noise suppression filter (NSF), or any combination thereof. In an example, the loop filter unit 220 may comprise a de-blocking filter, a SAO filter and an ALF filter. The order of the filtering process may be the deblocking filter, SAO and ALF. In another example, a process called the luma mapping with chroma scaling (LMCS) (namely, the adaptive in-loop reshaper) is added. This process is performed before deblocking. In another example, the deblocking filter process may be also applied to internal sub-block edges, e.g. affine sub-blocks edges, ATMVP sub-blocks edges, sub-block transform (SBT) edges and intra sub-partition (ISP) edges.

To effectively remove blocking artifacts occurring for large "blocks", Versatile Video Coding (VVC) uses a longer tap deblocking filter. Here the term "blocks" is used in a very generic fashion and it may refer to a "transform block (TB), prediction block (PB) or a coding unit (CU)". The longer tap filter for the Luma components modifies a maximum of 7 samples for each line of samples perpendicular and adjacent to the edge and it is applied for blocks whose size is >=32 samples in the direction of deblocking i.e. for vertical edges, the block width should be >=32 samples and for horizontal edges, the block height should be >=32 samples.

The longer tap filter for the chroma components is applied for Chroma blocks when both chroma blocks adjacent to a given edge have a size>=8 samples and it modifies a maximum of three samples on either side of the edge. Therefore for vertical edges the block width of both the chroma blocks adjacent to the edge should be >=8 samples and for the horizontal edges the block height of both the blocks adjacent to the edge should be >=8 samples.

Deblocking Filter Process

Deblocking specification text in VVC 6.0 is appended below:

8.8.3.1 General

Inputs to this process are the reconstructed picture prior to deblocking, i.e., the array recPicture$_L$ and, when ChromaArrayType is not equal to 0, the arrays recPicture$_{Cb}$ and recPicture$_{Cr}$.

Outputs of this process are the modified reconstructed picture after deblocking, i.e., the array recPicture$_L$ and, when ChromaArrayType is not equal to 0, the arrays recPicture$_{Cb}$ and recPicture$_{Cr}$.

The vertical edges in a picture are filtered first. Then the horizontal edges in a picture are filtered with samples modified by the vertical edge filtering process as input. The vertical and horizontal edges in the CTBs of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

NOTE—Although the filtering process is specified on a picture basis in this Specification, the filtering process can be implemented on a coding unit basis with an equivalent result, provided the decoder properly accounts for the processing dependency order so as to produce the same output values.

The deblocking filter process is applied to all coding subblock edges and transform block edges of a picture, except the following types of edges:

Edges that are at the boundary of the picture,
Edges that coincide with the boundaries of a subpicture for which loop_filter_across_subpic_enabled_flag[SubPicIdx] is equal to 0,
Edges that coincide with the virtual boundaries of the picture when pps_loop_filter_across_virtual_boundaries_disabled_flag is equal to 1,
Edges that coincide with brick boundaries when loop_filter_across_bricks_enabled_flag is equal to 0,
Edges that coincide with slice boundaries when loop_filter_across_slices_enabled_flag is equal to 0,
Edges that coincide with upper or left boundaries of slices with slice_deblocking_filter_disabled_flag equal to 1,
Edges within slices with slice_deblocking_filter_disabled_flag equal to 1,
Edges that do not correspond to 4×4 sample grid boundaries of the luma component,
Edges that do not correspond to 8×8 sample grid boundaries of the chroma component, Edges within the luma component for which both sides of the edge have intra_bdpcm_flag equal to 1, Edges of chroma subblocks that are not edges of the associated transform unit.

The edge type, vertical or horizontal, is represented by the variable edgeType as specified in Table 8-17.

TABLE 8-17

Name of association to edgeType

| edgeType | Name of edgeType |
|---|---|
| 0 (vertical edge) | EDGE_VER |
| 1 (horizontal edge) | EDGE_HOR |

When slice_deblocking_filter_disabled_flag of the current slice is equal to 0, the following applies:

The variable treeType is set equal to DUAL_TREE_LUMA.

The vertical edges are filtered by invoking the deblocking filter process for one direction as specified in clause 8.8.3.2 with the variable treeType, the reconstructed picture prior to deblocking, i.e., the array recPicture$_L$ and the variable edgeType set equal to EDGE_VER as inputs, and the modified reconstructed picture after deblocking, i.e., the array recPicture$_L$ as outputs.

The horizontal edge are filtered by invoking the deblocking filter process for one direction as specified in clause 8.8.3.2 with the variable treeType, the modified reconstructed picture after deblocking, i.e., the array recPicture$_L$ and the variable edgeType set equal to EDGE_HOR as inputs, and the modified reconstructed picture after deblocking, i.e., the array recPicture$_L$ as outputs.

When ChromaArrayType is not equal to 0, the following applies:

The variable treeType is set equal to DUAL_TREE_CHROMA

The vertical edges are filtered by invoking the deblocking filter process for one direction as specified in clause 8.8.3.2 with the variable treeType, the reconstructed picture prior to deblocking, i.e., the arrays recPicture$_{Cb}$ and recPicture$_{Cr}$, and the variable edgeType set equal to EDGE_VER as inputs, and the modified reconstructed picture after deblocking, i.e., the arrays recPicture$_{Cb}$ and recPicture$_{Cr}$ as outputs.

The horizontal edge are filtered by invoking the deblocking filter process for one direction as specified in clause 8.8.3.2 with the variable treeType, the modified reconstructed picture after deblocking, i.e., the arrays recPicture$_{Cb}$ and recPicture$_{Cr}$, and the variable edgeType set equal to EDGE_HOR as inputs, and the modified reconstructed picture after deblocking, i.e., the arrays recPicture$_{Cb}$ and recPicture$_{Cr}$ as outputs.

8.8.3.2 Deblocking Filter Process for One Direction

Inputs to this process are:

the variable treeType specifying whether the luma (DUAL_TREE_LUMA) or chroma components (DUAL_TREE_CHROMA) are currently processed, when treeType is equal to DUAL_TREE_LUMA, the reconstructed picture prior to deblocking, i.e., the array recPicture$_L$, when ChromaArrayType is not equal to 0 and treeType is equal to DUAL_TREE_CHROMA, the arrays recPicture$_{Cb}$ and recPicture$_{Cr}$, a variable edgeType specifying whether a vertical (EDGE_VER) or a horizontal (EDGE_HOR) edge is filtered.

Outputs of this process are the modified reconstructed picture after deblocking, i.e:

when treeType is equal to DUAL_TREE_LUMA, the array recPicture$_L$, when ChromaArrayType is not equal to 0 and treeType is equal to DUAL_TREE_CHROMA, the arrays recPicture$_{Cb}$ and recPicture$_{Cr}$.

The variables firstCompIdx and lastCompIdx are derived as follows:

firstCompIdx=
(treeType==DUAL_TREE_CHROMA)?1:0   (8-1022)

lastCompIdx=(treeType==DUAL_TREE_LUMA||
ChromaArrayType==0)? 0:2   (8-1023)

For each coding unit and each coding block per colour component of a coding unit indicated by the colour component index cIdx ranging from firstCompIdx to lastCompIdx, inclusive, with coding block width nCbW, coding block height nCbH and location of top-left sample of the coding block (xCb, yCb), when cIdx is equal to 0, or when cIdx is not equal to 0 and edgeType is equal to EDGE_VER and xCb % 8 is equal 0, or when cIdx is not equal to 0 and edgeType is equal to EDGE_HOR and yCb % 8 is equal to 0, the edges are filtered by the following ordered steps:

1. The variable filterEdgeFlag is derived as follows:
    If edgeType is equal to EDGE_VER and one or more of the following conditions are true, filterEdgeFlag is set equal to 0:
        The left boundary of the current coding block is the left boundary of the picture.
        The left boundary of the current coding block is the left or right boundary of the subpicture and loop_filter_across_subpic_enabled_flag[SubPicIdx] is equal to 0.
        The left boundary of the current coding block is the left boundary of the brick and loop_filter_across_bricks_enabled_flag is equal to 0.
        The left boundary of the current coding block is the left boundary of the slice and loop_filter_across_slices_enabled_flag is equal to 0.
        The left boundary of the current coding block is one of the vertical virtual boundaries of the picture and pps_loop_filter_across_virtual_boundaries_disabled_flag is equal to 1.
    Otherwise, if edgeType is equal to EDGE_HOR and one or more of the following conditions are true, the variable filterEdgeFlag is set equal to 0:
        The top boundary of the current luma coding block is the top boundary of the picture.
        The top boundary of the current coding block is the top or bottom boundary of the subpicture and loop_filter_across_subpic_enabled_flag[SubPicIdx] is equal to 0.
        The top boundary of the current coding block is the top boundary of the brick and loop_filter_across_bricks_enabled_flag is equal to 0.
        The top boundary of the current coding block is the top boundary of the slice and loop_filter_across_slices_enabled_flag is equal to 0.
        The top boundary of the current coding block is one of the horizontal virtual boundaries of the picture and pps_loop_filter_across_virtual_boundaries_disabled_flag is equal to 1.
    Otherwise, filterEdgeFlag is set equal to 1.
2. All elements of the two-dimensional (nCbW)×(nCbH) array edgeFlags, maxFilterLengthQs and maxFilterLengthPs are initialized to be equal to zero.

3. The derivation process of transform block boundary specified in clause 8.8.3.3 is invoked with the location (xCb, yCb), the coding block width nCbW, the coding block height nCbH, the variable cIdx, the variable filterEdgeFlag, the array edgeFlags, the maximum filter length arrays maxFilterLengthPs and maxFilterLengthQs, and the variable edgeType as inputs, and the modified array edgeFlags, the modified maximum filter length arrays maxFilterLengthPs and maxFilterLengthQs as outputs.
4. When cIdx is equal to 0, the derivation process of coding subblock boundary specified in clause 8.8.3.4 is invoked with the location (xCb, yCb), the coding block width nCbW, the coding block height nCbH, the array edgeFlags, the maximum filter length arrays maxFilterLengthPs and maxFilterLengthQs, and the variable edgeType as inputs, and the modified array edgeFlags, the modified maximum filter length arrays maxFilterLengthPs and maxFilterLengthQs as outputs.
5. The picture sample array recPicture is derived as follows:
   If cIdx is equal to 0, recPicture is set equal to the reconstructed luma picture sample array prior to deblocking recPicture$_L$.
   Otherwise, if cIdx is equal to 1, recPicture is set equal to the reconstructed chroma picture sample array prior to deblocking recPicture$_{Cb}$.
   Otherwise (cIdx is equal to 2), recPicture is set equal to the reconstructed chroma picture sample array prior to deblocking recPicture$_{Cr}$.
6. The derivation process of the boundary filtering strength specified in clause 8.8.3.5 is invoked with the picture sample array recPicture, the luma location (xCb, yCb), the coding block width nCbW, the coding block height nCbH, the variable edgeType, the variable cIdx, and the array edgeFlags as inputs, and an (nCbW)×(nCbH) array bS as output.
7. The edge filtering process for one direction is invoked for a coding block as specified in clause 8.8.3.6 with the variable edgeType, the variable cIdx, the reconstructed picture prior to deblocking recPicture, the location (xCb, yCb), the coding block width nCbW, the coding block height nCbH, and the arrays bS, maxFilterLengthPs, and maxFilterLengthQs, as inputs, and the modified reconstructed picture recPicture as output.

8.8.3.3 Derivation Process of Transform Block Boundary
Inputs to this process are:
a location (xCb, yCb) specifying the top-left sample of the current coding block relative to the top-left sample of the current picture,
a variable nCbW specifying the width of the current coding block,
a variable nCbH specifying the height of the current coding block,
a variable cIdx specifying the colour component of the current coding block,
a variable filterEdgeFlag,
a two-dimensional (nCbW)×(nCbH) array edgeFlags,
two-dimensional (nCbW)×(nCbH) arrays maxFilterLengthQs and maxFilterLengthPs,
a variable edgeType specifying whether a vertical (EDGE_VER) or a horizontal (EDGE_HOR) edge is filtered.
Outputs of this process are:
the modified two-dimensional (nCbW)×(nCbH) array edgeFlags,
the modified two-dimensional (nCbW)×(nCbH) arrays maxFilterLengthQs, maxFilterLengthPs.

Depending on edgeType, the arrays edgeFlags, maxFilterLengthPs and maxFilterLengthQs are derived as follows:
The variable gridSize is set as follows:

$$gridSize = cIdx == 0\,?\,4:8 \qquad (8\text{-}1024)$$

If edgeType is equal to EDGE_VER, the following applies:
   The variable numEdges is set equal to Max(1, nCbW/gridSize).
   For xEdge=0 . . . numEdges−1 and y=0 . . . nCbH−1, the following applies:
      The horizontal position x inside the current coding block is set equal to xEdge*gridSize.
      The value of edgeFlags[x][y] is derived as follows:
         If pps_loop_filter_across_virtual_boundaries_disabled_flag equal to 1 and (xCb+x) is equal to PpsVirtualBoundariesPosX[n] for any n=0 . . . pps_num_ver_virtual_boundaries−1, edgeFlags[x][y] is set equal to 0.
         Otherwise, if x is equal to 0, edgeFlags[x][y] is set equal to filterEdgeFlag.
         Otherwise, if the location (xCb+x, yCb+y) is at a transform block edge, edgeFlags[x][y] is set equal to 1.
      When edgeFlags[x][y] is equal to 1, the following applies:
         If cIdx is equal to 0, the following applies:
            The value of maxFilterLengthQs[x][y] is derived as follows:
               If the width in luma samples of the transform block at luma location (xCb+x, yCb+y) is equal to or less than 4 or the width in luma samples of the transform block at luma location (xCb+x−1, yCb+y) is equal to or less than 4, maxFilterLengthQs[x][y] is set equal to 1.
               Otherwise, if the width in luma samples of the transform block at luma location (xCb+x, yCb+y) is equal to or greater than 32, maxFilterLengthQs[x][y] is set equal to 7.
               Otherwise, maxFilterLengthQs[x][y] is set equal to 3.
            The value of maxFilterLengthPs[x][y] is derived as follows:
               If the width in luma samples of the transform block at luma location (xCb+x, yCb+y) is equal to or less than 4 or the width in luma samples of the transform block at luma location (xCb+x−1, yCb+y) is equal to or less than 4, maxFilterLengthPs[x][y] is set equal to 1.
               Otherwise, if the width in luma samples of the transform block at luma location (xCb+x−1, yCb+y) is equal to or greater than 32, maxFilterLengthPs[x][y] is set equal to 7.
               Otherwise, maxFilterLengthPs[x][y] is set equal to 3.
         Otherwise (cIdx is not equal to 0), the values of maxFilterLengthPs[x][y] and maxFilterLengthQs[x][y] are derived as follows:
            If the width in chroma samples of the transform block at chroma location (xCb+x, yCb+y) and the width at chroma location (xCb+x−1, yCb+y) are both equal to or greater than 8, maxFilterLengthPs[x][y] and maxFilterLengthQs[x][y] are set equal to 3.
            Otherwise, maxFilterLengthPs[x][y] and maxFilterLengthQs[x][y] are set equal to 1.

Otherwise (edgeType is equal to EDGE_HOR), the following applies:
The variable numEdges is set equal to Max(1, nCbH/gridSize).
For yEdge=0 . . . numEdges−1 and x=0 . . . nCbW−1, the following applies:
The vertical position y inside the current coding block is set equal to yEdge*gridSize.
The value of edgeFlags[x][y] is derived as follows:
If pps_loop_filter_across_virtual_boundaries_disabled_flag equal to 1 and (yCb+y) is equal to PpsVirtualBoundariesPosY[n] for any n=0 . . . pps_num_hor_virtual_boundaries−1, edgeFlags[x][y] is set equal to 0.
Otherwise, if y is equal to 0, edgeFlags[x][y] is set equal to filterEdgeFlag.
Otherwise, if the location (xCb+x, yCb+y) is at a transform block edge, edgeFlags[x][y] is set equal to 1.
When edgeFlags[x][y] is equal to 1, the following applies:
If cIdx is equal to 0, the following applies:
The value of maxFilterLengthQs[x][y] is derived as follows:
If the height in luma samples of the transform block at luma location (xCb+x, yCb+y) is equal to or less than 4 or the height in luma samples of the transform block at luma location (xCb+x, yCb+y−1) is equal to or less than 4, maxFilterLengthQs[x][y] is set equal to 1.
Otherwise, if the height in luma samples of the transform block at luma location (xCb+x, yCb+y) is equal to or greater than 32, maxFilterLengthQs[x][y] is set equal to 7.
Otherwise, maxFilterLengthQs[x][y] is set equal to 3.
The value of maxFilterLengthPs[x][y] is derived as follows:
If the height in luma samples of the transform block at luma location (xCb+x, yCb+y) is equal to or less than 4 or the height in luma samples of the transform block at luma location (xCb+x, yCb+y−1) is equal to or less than 4, maxFilterLengthPs[x][y] is set equal to 1.
Otherwise, if the height in luma samples of the transform block at luma location (xCb+x, yCb+y−1) is equal to or greater than 32, maxFilterLengthPs[x][y] is set equal to 7.
Otherwise, maxFilterLengthPs[x][y] is set equal to 3.
Otherwise (cIdx is not equal to 0), the values of maxFilterLengthPs[x][y] and maxFilterLengthQs[x][y] are derived as follows:
If all of the following conditions are true, maxFilterLengthPs[x][y] and maxFilterLengthQs[x][y] are set equal to 3:
The height in chroma samples of the transform block at chroma location (xCb+x, yCb+y) and the height at chroma location (xCb+x, yCb+y−1) are both equal to or greater than 8.
(yCb+y) % CtbHeightC is greater than 0, i.e. the horizontal edge do not overlap with the upper chroma CTB boundary.
Otherwise, maxFilterLengthPs[x][y] and maxFilterLengthQs[x][y] are set equal to 1.

8.8.3.4 Derivation Process of Coding Subblock Boundary
Inputs to this process are:
a location (xCb, yCb) specifying the top-left sample of the current coding block relative to the top-left sample of the current picture,
a variable nCbW specifying the width of the current coding block,
a variable nCbH specifying the height of the current coding block,
a two-dimensional (nCbW)×(nCbH) array edgeFlags,
two-dimensional (nCbW)×(nCbH) arrays maxFilterLengthQs and maxFilterLengthPs,
a variable edgeType specifying whether a vertical (EDGE_VER) or a horizontal (EDGE_HOR) edge is filtered.
Outputs of this process are:
the modified two-dimensional (nCbW)×(nCbH) array edgeFlags,
the modified two-dimensional (nCbW)×(nCbH) arrays maxFilterLengthQs and maxFilterLengthPs.
The number of coding subblock in horizontal direction numSbX and in vertical direction numSbY are derived as follows:
If inter_affine_flag[xCb][yCb] is equal to 1 or merge_subblock_flag[xCb][yCb] is equal to 1, numSbX and numSbY are set equal to NumSbX[xCb][yCb] and NumSbY[xCb][yCb], respectively.
Otherwise, numSbX and numSbY are both set equal to 1.
Depending on the value of edgeType the following applies:
If edgeType is equal to EDGE_VER, the following applies:
The variable sbW is set equal to Max(8, nCbW/numSbX).
The array edgeTbFlags is set equal to edgeFlags.
For xEdge=0 . . . min((nCbW/8)−1, numSbX−1), y=0 . . . nCbH−1:
The horizontal position x inside the current coding block is set equal to xEdge*sbW.
The value of edgeFlags[x][y] is derived as follows:
If pps_loop_filter_across_virtual_boundaries_disabled_flag is equal to 1 and x is equal to PpsVirtualBoundariesPosX[n] for any n=0 . . . pps_num_ver_virtual_boundaries−1, the following applies:

$$\text{edgeFlags}[x][y]=0 \qquad (8\text{-}1025)$$

Otherwise, the following applies:

$$\text{edgeFlags}[x][y]=1 \qquad (8\text{-}1026)$$

When edgeFlags[x][y] is equal to 1, the values of maxFilterLengthPs[x][y] and maxFilterLengthQs[x][y] are modified as follows:
If x is equal to 0, the following applies:
When numSbX is greater than 1, the following applies:

$$\text{maxFilterLength}Qs[x][y]=\text{Min}(5,\text{maxFilterLength}Qs[x][y]) \qquad (8\text{-}1027)$$

When inter_affine_flag[xCb−1][yCb] is equal to 1 or merge_subblock_flag[xCb−1][yCb] is equal to 1, the following applies:

$$\text{maxFilterLength}Ps[x][y]=\text{Min}(5,\text{maxFilterLength}Ps[x][y]) \qquad (8\text{-}1028)$$

Otherwise, if edgeTbFlags[x][y] is equal to 1, the following applies:

$$\text{maxFilterLength}Ps[x][y]=\text{Min}(5,\text{maxFilterLength}Ps[x][y]) \qquad (8\text{-}1029)$$

$$\text{maxFilterLength}Qs[x][y]=\text{Min}(5,\text{maxFilterLength}Qs[x][y]) \qquad (8\text{-}1030)$$

Otherwise, if one or more of the following conditions are true:
(x+4) is greater than or equal to nCbW,
edgeTbFlags[x−4][y] is equal to 1,
edgeTbFlags[x+4][y] is equal to 1,
the following applies:

maxFilterLengthPs[x][y]=1 (8-1031)

maxFilterLengthQs[x][y]=1 (8-1032)

Otherwise, if one or more of the following conditions are true:
xEdge is equal to 1,
xEdge is equal to (nCbW/8)−1,
edgeTbFlags[x−sbW][y] is equal to 1,
edgeTbFlags[x+sbW][y] is equal to 1,
the following applies:

maxFilterLengthPs[x][y]=2 (8-1033)

maxFilterLengthQs[x][y]=2 (8-1034)

Otherwise, the following applies:

maxFilterLengthPs[x][y]=3 (8-1035)

maxFilterLengthQs[x][y]=3 (8-1036)

Otherwise, if edgeType is equal to EDGE_HOR, the following applies:
The variable sbH is set equal to Max(8, nCbH/numSbY).
The array edgeTbFlags is set equal to edgeFlags.
For yEdge=0 . . . min((nCbH/8)−1, numSbY−1), x=0 . . . nCbW−1:
The vertical position y inside the current coding block is set equal to yEdge*sbH.
The value of edgeFlags[x][y] is derived as follows:
If pps_loop_filter_across_virtual_boundaries_disabled_flag is equal to 1 and y is equal to PpsVirtualBoundariesPosY[n] for any n=0 . . . pps_num_hor_virtual_boundaries−1, the following applies:

edgeFlags[x][y]=0 (8-1037)

Otherwise, the following applies:

edgeFlags[x][y]=1 (8-1038)

When edgeFlags[x][y] is equal to 1, the values of maxFilterLengthPs[x][y] and maxFilterLengthQs[x][y] are modified as follows:
If y is equal to 0 and edgeFlags[x][y] is equal to 1, the following applies:
When numSbY is greater than 1, the following applies:

maxFilterLengthQs[x][y]=Min(5,maxFilterLengthQs[x][y]) (8-1039)

When inter_affine_flag[xCb][yCb−1] is equal to 1 or merge_subblock_flag[xCb][yCb−1] is equal to 1, the following applies:

maxFilterLengthPs[x][y]=Min(5,maxFilterLengthPs[x][y]) (8-1040)

Otherwise, if edgeTbFlags[x][y] is equal to 1, the following applies:

maxFilterLengthPs[x][y]=Min(5,maxFilterLengthPs[x][y]) (8-1041)

maxFilterLengthQs[x][y]=Min(5,maxFilterLengthQs[x][y]) (8-1042)

Otherwise, if one or more of the following conditions are true:
(y+4) is greater than or equal to nCbH,
edgeTbFlags[x][y−4] is equal to 1,
edgeTbFlags[x][y+4] is equal to 1,
the following applies:

maxFilterLengthPs[x][y]=1 (8-1045)

maxFilterLengthQs[x][y]=1 (8-1046)

Otherwise, if one or more of the following conditions are true:
yEdge is equal to 1,
yEdge is equal to (nCbH/8)−1,
edgeTbFlags[x][y−sbH] is equal to 1,
edgeTbFlags[x][y+sbH] is equal to 1,
the following applies:

maxFilterLengthPs[x][y]=2 (8-1043)

maxFilterLengthQs[x][y]=2 (8-1044)

Otherwise, the following applies:

maxFilterLengthPs[x][y]=3 (8-1047)

maxFilterLengthQs[x][y]=3 (8-1048)

8.8.3.5 Derivation Process of Boundary Filtering Strength
Inputs to this process are:
a picture sample array recPicture,
a location (xCb, yCb) specifying the top-left sample of the current coding block relative to the top-left sample of the current picture,
a variable nCbW specifying the width of the current coding block,
a variable nCbH specifying the height of the current coding block,
a variable edgeType specifying whether a vertical (EDGE_VER) or a horizontal (EDGE_HOR) edge is filtered,
a variable cIdx specifying the colour component of the current coding block,
a two-dimensional (nCbW)×(nCbH) array edgeFlags.
Output of this process is a two-dimensional (nCbW)×(nCbH) array bS specifying the boundary filtering strength.
The variables $xD_i$, $yD_j$, xN and yN are derived as follows:
The variable gridSize is set as follows:

gridSize=cIdx==0?4:8 (8-1049)

If edgeType is equal to EDGE_VER, $xD_i$=(i*gridSize) (8-1050)

$yD_j$=cIdx==0?(j<<2):(j<<1) (8-1051)

xN is set equal to Max(0,(nCbW/gridSize)−1) (8-1052)

yN=cIdx==0?(nCbH/4)−1:(nCbH/2)−1 (8-1053)

Otherwise (edgeType is equal to EDGE_HOR), $xD_i$=cIdx==0?(i<<2):(i<<1) (8-1054)

$yD_j$=(j*gridSize) (8-1055)

xN=cIdx==0?(nCbW/4)−1:(nCbW/2)−1 (8-1056)

yN=Max(0,(nCbH/gridSize)−1) (8-1057)

For $xD_i$ with i=0 . . . xN and yD, with j=0 . . . yN, the following applies:
If edgeFlags[$xD_i$][$yD_j$] is equal to 0, the variable bS[$xD_i$][$yD_j$] is set equal to 0.

Otherwise, the following applies:
The sample values $p_0$ and $q_0$ are derived as follows:
If edgeType is equal to EDGE_VER, $p_0$ is set equal to recPicture[xCb+xD$_i$−1][yCb+yD$_j$] and $q_0$ is set equal to recPicture[xCb+xD$_i$][yCb+yD$_j$].
Otherwise (edgeType is equal to EDGE_HOR), $p_0$ is set equal to recPicture[xCb+xD$_i$][yCb+yD$_j$−1] and $q_0$ is set equal to recPicture[xCb+xD$_i$][yCb+yD$_j$].
The variable bS[xD$_i$][yD$_j$] is derived as follows:
If cIdx is equal to 0 and both samples $p_0$ and $q_0$ are in a coding block with intra_bdpcm_flag equal to 1, bS[xD$_i$][yD$_j$] is set equal to 0.
Otherwise, if the sample $p_0$ or $q_0$ is in the coding block of a coding unit coded with intra prediction mode, bS[xD$_i$][yD$_j$] is set equal to 2.
Otherwise, if the block edge is also a transform block edge and the sample $p_0$ or $q_0$ is in a coding block with ciip_flag equal to 1, bS[xD$_i$][yD$_j$] is set equal to 2.
Otherwise, if the block edge is also a transform block edge and the sample $p_0$ or $q_0$ is in a transform block which contains one or more non-zero transform coefficient levels, bS[xD$_i$][yD$_j$] is set equal to 1.
Otherwise, if the block edge is also a transform block edge, cIdx is greater than 0, and the sample $p_0$ or $q_0$ is in a transform unit with tu_joint_cbcr_residual_flag equal to 1, bS[xD$_i$][yD$_j$] is set equal to 1.
Otherwise, if the prediction mode of the coding subblock containing the sample $p_0$ is different from the prediction mode of the coding subblock containing the sample $q_0$ (i.e. one of the coding subblock is coded in IBC prediction mode and the other is coded in inter prediction mode), bS[xD$_i$][yD$_j$] is set equal to 1.
Otherwise, if cIdx is equal to 0 and one or more of the following conditions are true, bS[xD$_i$][yD$_j$] is set equal to 1:
The coding subblock containing the sample $p_0$ and the coding subblock containing the sample $q_0$ are both coded in IBC prediction mode, and the absolute difference between the horizontal or vertical component of the block vectors used in the prediction of the two coding subblocks is greater than or equal to 8 in units of 1/16 luma samples.
For the prediction of the coding subblock containing the sample $p_0$ different reference pictures or a different number of motion vectors are used than for the prediction of the coding subblock containing the sample $q_0$.
NOTE 1—The determination of whether the reference pictures used for the two coding sublocks are the same or different is based only on which pictures are referenced, without regard to whether a prediction is formed using an index into reference picture list 0 or an index into reference picture list 1, and also without regard to whether the index position within a reference picture list is different.
NOTE 2—The number of motion vectors that are used for the prediction of a coding subblock with top-left sample covering (xSb, ySb), is equal to PredFlagL0[xSb][ySb]+PredFlagL1[xSb][ySb].
One motion vector is used to predict the coding subblock containing the sample $p_0$ and one motion vector is used to predict the coding subblock containing the sample $q_0$, and the absolute difference between the horizontal or vertical component of the motion vectors used is greater than or equal to 8 in units of 1/16 luma samples.
Two motion vectors and two different reference pictures are used to predict the coding subblock containing the sample $p_0$, two motion vectors for the same two reference pictures are used to predict the coding subblock containing the sample $q_0$ and the absolute difference between the horizontal or vertical component of the two motion vectors used in the prediction of the two coding subblocks for the same reference picture is greater than or equal to 8 in units of 1/16 luma samples.
Two motion vectors for the same reference picture are used to predict the coding subblock containing the sample $p_0$, two motion vectors for the same reference picture are used to predict the coding subblock containing the sample $q_0$ and both of the following conditions are true:
The absolute difference between the horizontal or vertical component of list 0 motion vectors used in the prediction of the two coding subblocks is greater than or equal to 1/16 luma samples, or the absolute difference between the horizontal or vertical component of the list 1 motion vectors used in the prediction of the two coding subblocks is greater than or equal to 8 in units of 1/16 luma luma samples.
The absolute difference between the horizontal or vertical component of list 0 motion vector used in the prediction of the coding subblock containing the sample $p_0$ and the list 1 motion vector used in the prediction of the coding subblock containing the sample $q_0$ is greater than or equal to 8 in units of 1/16 luma luma samples, or the absolute difference between the horizontal or vertical component of the list 1 motion vector used in the prediction of the coding subblock containing the sample $p_0$ and list 0 motion vector used in the prediction of the coding subblock containing the sample $q_0$ is greater than or equal to 8 in units of 1/16 luma luma samples.
Otherwise, the variable bS[xD$_i$][yD$_i$] is set equal to 0.

8.8.3.6 Edge Filtering Process for One Direction

Inputs to this process are:
a variable edgeType specifying whether vertical edges (EDGE_VER) or horizontal edges (EDGE_HOR) are currently processed,
a variable cIdx specifying the current colour component,
the reconstructed picture prior to deblocking recPicture,
a location (xCb, yCb) specifying the top-left sample of the current coding block relative to the top-left sample of the current picture,
a variable nCbW specifying the width of the current coding block,
a variable nCbH specifying the height of the current coding block,
the array bS specifying the boundary strength,
the arrays maxFilterLengthPs and maxFilterLengthQs.

Output of this process is the modified reconstructed picture after deblocking recPicture.
For the edge filtering process, the following applies:
The variable gridSize is set as follows:

$$\text{gridSize} = cIdx == 0\,?\,4:8 \quad (8\text{-}1058)$$

The variables subW, subH, xN, yN are derived as follows:

$$subW = cIdx == 0\,?\,1 : \text{SubWidth}C \quad (8\text{-}1059)$$

$$subH = cIdx == 0\,?\,1 : \text{SubHeight}C \quad (8\text{-}1060)$$

$$xN = \text{edgeType} == \text{EDGE\_VER}\,?\,\text{Max}(0,(nCbW/\text{gridSize})-1):(nCbW/4/subW)-1 \quad (8\text{-}1061)$$

$$yN = \text{edgeType} == \text{EDGE\_VER}\,?\,(nCbH/4/subH)-1:\text{Max}(0,(nCbH/\text{gridSize})-1) \quad (8\text{-}1062)$$

The variables $xD_k$ with $k=0 \ldots xN$ and $yD_m$ with $m=0 \ldots yN$ are derived as follows:

$$xD_k = \text{edgeType} == \text{EDGE\_VER}\,?\,(k*\text{gridSize}):(k<<(2/subW)) \quad (8\text{-}1063)$$

$$yD_m = \text{edgeType} == \text{EDGE\_VER}\,?\,(m<<(2/subH)):(m*\text{gridSize}) \quad (8\text{-}1064)$$

For $xD_k$ with $k=0 \ldots xN$ and $yD_m$ with $m=0 \ldots yN$, the following applies:
When $bS[xD_k][yD_m]$ is greater than 0, the following ordered steps apply:
If cIdx is equal to 0, the filtering process for edges in the luma coding block of the current coding unit consists of the following ordered steps:
1. The decision process for luma block edges as specified in clause 8.8.3.6.1 is invoked with the luma picture sample array recPicture, the location of the luma coding block (xCb, yCb), the luma location of the block (xBl, yBl) set equal to ($xD_k$, $yD_m$), the edge direction edgeType, the boundary filtering strength $bS[xD_k][yD_m]$, the maximum filter lengths maxFilterLengthP set equal to maxFilterLengthPs[$xD_k$][$yD_m$] and maxFilterLengthQ set equal to maxFilterLengthQs[$xD_k$][$yD_m$] as inputs, and the decisions dE, dEp and dEq, the modified maximum filter lengths maxFilterLengthP and maxFilterLengthQ, and the variable $t_C$ as outputs.
2. The filtering process for block edges as specified in clause 8.8.3.6.2 is invoked with the luma picture sample array recPicture, the location of the luma coding block (xCb, yCb), the luma location of the block (xBl, yBl) set equal to ($xD_k$, $yD_m$), the edge direction edgeType, the decisions dE, dEp and dEq, the maximum filter lengths maxFilterLengthP and maxFilterLengthQ, and the variable $t_C$ as inputs, and the modified luma picture sample array recPicture as output.
Otherwise (cIdx is not equal to 0), the filtering process for edges in the chroma coding block of current coding unit specified by cIdx consists of the following ordered steps:
1. The variable cQpPicOffset is derived as follows:

$$cQpPicOffset = cIdx == 1\,?\,pps\_cb\_qp\_offset:pps\_cr\_qp\_offset \quad (8\text{-}1065)$$

2. The decision process for chroma block edges as specified in clause 8.8.3.6.3 is invoked with the chroma picture sample array recPicture, the location of the chroma coding block (xCb, yCb), the location of the chroma block (xBl, yBl) set equal to ($xD_k$, $yD_m$), the edge direction edgeType, the variable cIdx, the variable cQpPicOffset, the boundary filtering strength $bS[xD_k][yD_m]$, and the variable maxFilterLengthCbCr set equal to maxFilterLengthPs[$xD_k$][$yD_m$] as inputs, and the modified variable maxFilterLengthCbCr, and the variable $t_C$ as outputs.
3. When maxFilterLengthCbCr is greater than 0, the filtering process for chroma block edges as specified in clause 8.8.3.6.4 is invoked with the chroma picture sample array recPicture, the location of the chroma coding block (xCb, yCb), the chroma location of the block (xBl, yBl) set equal to ($xD_k$, $yD_m$), the edge direction edgeType, the variable maxFilterLengthCbCr, and the variable $t_C$ as inputs, and the modified chroma picture sample array recPicture as output.

8.8.3.6.1 Decision Process For Luma Block Edges
Inputs to this process are:
a picture sample array recPicture,
a location (xCb, yCb) specifying the top-left sample of the current coding block relative to the top-left sample of the current picture,
a location (xBl, yBl) specifying the top-left sample of the current block relative to the top-left sample of the current coding block,
a variable edgeType specifying whether a vertical (EDGE_VER) or a horizontal (EDGE_HOR) edge is filtered,
a variable bS specifying the boundary filtering strength,
a variable maxFilterLengthP specifying the max filter length,
a variable maxFilterLengthQ specifying the max filter length.
Outputs of this process are:
the variables dE, dEp and dEq containing decisions,
the modified filter length variables maxFilterLengthP and maxFilterLengthQ,
the variable $t_C$.
The sample values $p_{i,k}$ and $q_{j,k}$ with $i=0 \ldots$ maxFilterLengthP, $j=0 \ldots$ maxFilterLengthQ and $k=0$ and 3 are derived as follows:
If edgeType is equal to EDGE_VER, the following applies:

$$q_{j,k} = \text{recPicture}_L[xCb+xBl+j][yCb+yBl+k] \quad (8\text{-}1066)$$

$$p_{i,k} = \text{recPicture}_L[xCb+xBl-i-1][yCb+yBl+k] \quad (8\text{-}1067)$$

Otherwise (edgeType is equal to EDGE_HOR), the following applies:

$$q_{j,k} = \text{recPicture}[xCb+xBl+k][yCb+yBl+j] \quad (8\text{-}1068)$$

$$p_{i,k} = \text{recPicture}[xCb+xBl+k][yCb+yBl-i-1] \quad (8\text{-}1069)$$

The variable qpOffset is derived as follows:
If sps_ladf_enabled_flag is equal to 1, the following applies:
The variable lumaLevel of the reconstructed luma level is derived as follow:

$$\text{lumaLevel} = ((p_{0,0}+p_{0,3}+q_{0,0}+q_{0,3}) >> 2), \quad (8\text{-}1070)$$

The variable gpOffset is set equal to sps_ladf_lowest_interval_qp_offset and modified as follows:

```
for( i = 0; i < sps_num_ladf_intervals_minus2 + 1; i++ ) {
  if( lumaLevel > SpsLadfIntervalLowerBound[ i + 1 ] )
    qpOffset = sps_ladf_qp_offset[ i ]         (8-1071)
  else
    break
}
```

Otherwise, qpOffset is set equal to 0.

The variables $Qp_Q$ and $Qp_P$ are set equal to the $Qp_Y$ values of the coding units which include the coding blocks containing the sample $q_{0,0}$ and $p_{0,0}$, respectively. //Here, $Qp_Q$ and $Qp_P$ represent the luma QP values respectively, in order to distinguish two luma QP values, it will be represented by $Qp_{YQ}$ and $Qp_{YP}$ respectively in claim part//

The variable qP is derived as follows:

$$qP=((Qp_Q+Qp_P+1)>>1)+qpOffset \qquad (8\text{-}1072)$$

The value of the variable β' is determined as specified in Table 8-18 based on the quantization parameter Q derived as follows:

$$Q=\text{Clip3}(0,63,qP+(slice\_beta\_offset\_div2<<1)) \qquad (8\text{-}1073)$$

where slice_beta_offset_div2 is the value of the syntax element slice_beta_offset_div2 for the slice that contains sample $q_{0,0}$.

The variable β is derived as follows:

$$\beta=\beta'*(1<<(\text{BitDepth}_Y-8)) \qquad (8\text{-}1074)$$

The value of the variable $t_C'$ is determined as specified in Table 8-18 based on the quantization parameter Q derived as follows:

$$Q=\text{Clip3}(0,65,qP+2*(bS-1)+(slice\_tc\_offset\_div2<<1)) \qquad (8\text{-}1075)$$

where slice_tc_offset_div2 is the value of the syntax element slice_tc_offset_div2 for the slice that contains sample $q_{0,0}$.

The variable $t_C$ is derived as follows:

$$t_C=\text{BitDepth}_Y<10?(t_C'+2)>>(10-\text{BitDepth}_Y):t_C'*(1<<(\text{BitDepth}_Y-10)) \qquad (8\text{-}1076)$$

The following ordered steps apply:
1. The variables dp0, dp3, dq0 and dq3 are derived as follows:

$$dp0=\text{Abs}(p_{2,0}-2*p_{1,0}+p_{0,0}) \qquad (8\text{-}1077)$$

$$dp3=\text{Abs}(p_{2,3}-2*p_{1,3}+p_{0,3}) \qquad (8\text{-}1078)$$

$$dq0=\text{Abs}(q_{2,0}-2*q_{1,0}+q_{0,0}) \qquad (8\text{-}1079)$$

$$dq3=\text{Abs}(q_{2,3}-2*q_{1,3}+q_{0,3}) \qquad (8\text{-}1080)$$

2. When maxFilterLengthP and maxFilterLengthQ both are equal to or greater than 3 the variables sp0, sq0, spq0, sp3, sq3 and spq3 are derived as follows:

$$sp0=\text{Abs}(p_{3,0}-p_{0,0}) \qquad (8\text{-}1081)$$

$$sq0=\text{Abs}(q_{0,0}-q_{3,0}) \qquad (8\text{-}1082)$$

$$spq0=\text{Abs}(p_{0,0}-q_{0,0}) \qquad (8\text{-}1083)$$

$$sp3=\text{Abs}(p_{3,3}-p_{0,3}) \qquad (8\text{-}1084)$$

$$sq3=\text{Abs}(q_{0,3}-q_{3,3}) \qquad (8\text{-}1085)$$

$$spq3=\text{Abs}(p_{0,3}-q_{0,3}) \qquad (8\text{-}1086)$$

3. The variables sidePisLargeBlk and sideQisLargeBlk are set equal to 0.
4. When maxFilterLengthP is greater than 3, sidePisLargeBlk is set equal to 1:
5. When maxFilterLengthQ is greater than 3, sideQisLargeBlk is set equal to 1:
6. When edgeType is equal to EDGE_HOR and (yCb+yBl) % CtbSizeY is equal to 0, sidePisLargeBlk is set equal to 0.
7. The variables dSam0 and dSam3 are initialized to 0.
8. When sidePisLargeBlk or sideQisLargeBlk is greater than 0, the following applies:
   a. The variables dp0L, dp3L are derived and maxFilterLengthP is modified as follows:
      If sidePisLargeBlk is equal to 1, the following applies:

$$dp0L=(dp0+\text{Abs}(p_{5,0}-2*p_{4,0}+p_{3,0})+1)>>1 \qquad (8\text{-}1087)$$

$$dp3L=(dp3+\text{Abs}(p_{5,3}-2*p_{4,3}+p_{3,3})+1)>>1 \qquad (8\text{-}1088)$$

Otherwise, the following applies:

$$dp0L=dp0 \qquad (8\text{-}1089)$$

$$dp3L=dp3 \qquad (8\text{-}1090)$$

$$\text{maxFilterLength}P=3 \qquad (8\text{-}1091)$$

b. The variables dq0L and dq3L are derived as follows:
      If sideQisLargeBlk is equal to 1, the following applies:

$$dq0L=(dq0+\text{Abs}(q_{5,0}-2*q_{4,0}+q_{3,0})+1)>>1 \qquad (8\text{-}1092)$$

$$dq3L=(dq3+\text{Abs}(q_{5,3}-2*q_{4,3}+q_{3,3})+1)>>1 \qquad (8\text{-}1093)$$

Otherwise, the following applies:

$$dq0L=dq0 \qquad (8\text{-}1094)$$

$$dq3L=dq3 \qquad (8\text{-}1095)$$

c. The variables dpq0L, dpq3L, and dL are derived as follows:

$$dpq0L=dp0L+dq0L \qquad (8\text{-}1096)$$

$$dpq3L=dp3L+dq3L \qquad (8\text{-}1097)$$

$$dL=dpq0L+dpq3L \qquad (8\text{-}1098)$$

d. When dL is less than β, the following ordered steps apply:
      i. The variable dpq is set equal to 2*dpq0L.
      ii. The variable sp is set equal to sp0, the variable sq is set equal to sq0 and the variable spq is set equal to spq0.
      iii. The variables $p_0$ $p_3$ $q_o$ and $q_3$ are first initialized to 0 and then modified according to sidePisLargeBlk and sideQisLargeBlk as follows:
      When sidePisLargeBlk is equal to 1, the following applies:

$$p_3=p_{3,0} \qquad (8\text{-}1099)$$

$$p_0=p_{maxFilterLengthP,0} \qquad (8\text{-}1100)$$

When sideQisLargeBlk is equal to 1, the following applies:

$$q_3=q_{3,0} \qquad (8\text{-}1101)$$

$$q_0=q_{maxFilterLengthQ,0} \qquad (8\text{-}1102)$$

iv. For the sample location (xCb+xBl, yCb+yBl), the decision process for a luma sample as specified in clause 8.8.3.6.5 is invoked with the sample values $p_0$, $p_3$, $q_0$, $q_3$, the variables dpq, sp, sq, spq, sidePisLargeBlk, sideQisLargeBlk, β and $t_C$ as inputs, and the output is assigned to the decision dSam0.
      v. The variable dpq is set equal to 2*dpq3L.
      vi. The variable sp is set equal to sp3, the variable sq is set equal to sq3 and the variable spq is set equal to spq3.

vii. The variables $p_0$ $p_3$ $q_0$ and $q_3$ are first initialized to 0 and are then modified according to sidePisLargeBlk and sideQisLargeBlk as follows:
When sidePisLargeBlk is equal to 1, the following applies:

$$p_3 = p_{3,3} \qquad (8\text{-}1103)$$

$$p_0 = p_{maxFilterLengthP,3} \qquad (8\text{-}1104)$$

When sideQisLargeBlk is equal to 1, the following applies:

$$q_3 = q_{3,3} \qquad (8\text{-}1105)$$

$$q_0 = q_{maxFilterLengthQ,3} \qquad (8\text{-}1106)$$

viii. When edgeType is equal to EDGE_VER for the sample location (xCb+xBl, yCb+yBl+3) or when edgeType is equal to EDGE_HOR for the sample location (xCb+xBl+3, yCb+yBl), the decision process for a luma sample as specified in clause 8.8.3.6.5 is invoked with the sample values $p_0$, $p_3$, $q_0$, $q_3$, the variables dpq, sp, sq, spq, sidePisLargeBlk, sideQisLargeBlk, β and $t_C$ as inputs, and the output is assigned to the decision dSam3.

9. The variables dE, dEp and dEq are derived as follows:
If dSam0 and dSam3 are both equal to 1, the variable dE is set equal to 3, dEp is set equal to 1, and dEq is set equal to 1.
Otherwise, the following ordered steps apply:
   a. The variables dpq0, dpq3, dp, dq and d are derived as follows:

$$dpq0 = dp0 + dq0 \qquad (8\text{-}1107)$$

$$dpq3 = dp3 + dq3 \qquad (8\text{-}1108)$$

$$dp = dp0 + dp3 \qquad (8\text{-}1109)$$

$$dq = dq0 + dq3 \qquad (8\text{-}1110)$$

$$d = dpq0 + dpq3 \qquad (8\text{-}1111)$$

b. The variables dE, dEp, dEq, sidePisLargeBlk and sideQisLargeBlk are set equal to 0.
   c. When d is less than β and both maxFilterLengthP and maxFilterLengthQ are greater than 2, the following ordered steps apply:
      i. The variable dpq is set equal to 2*dpq0.
      ii. The variable sp is set equal to sp0, the variable sq is set equal to sq0 and the variable spq is set equal to spq0.
      iii. For the sample location (xCb+xBl, yCb+yBl), the decision process for a luma sample as specified in clause 8.8.3.6.5 is invoked with the variables $p_0$, $p_3$, $q_0$, $q_3$ all set equal to 0, the variables dpq, sp, sq, spq, sidePisLargeBlk, sideQisLargeBlk, β and $t_C$ as inputs, and the output is assigned to the decision dSam0.
      iv. The variable dpq is set equal to 2*dpq3.
      v. The variable sp is set equal to sp3, the variable sq is set equal to sq3 and the variable spq is set equal to spq3.
      vi. When edgeType is equal to EDGE_VER for the sample location (xCb+xBl, yCb+yBl+3) or when edgeType is equal to EDGE_HOR for the sample location (xCb+xBl+3, yCb+yBl), the decision process for a sample as specified in clause 8.8.3.6.5 is invoked with the variables $p_0$, $p_3$, $q_0$, $q_3$ all set equal to 0, the variables dpq, sp, sq, spq, sidePisLargeBlk, sideQisLargeBlk, β and $t_C$ as inputs, and the output is assigned to the decision dSam3.
   d. When d is less than β, the following ordered steps apply:
      i. The variable dE is set equal to 1.
      ii. When dSam0 is equal to 1 and dSam3 is equal to 1, the variable dE is set equal to 2.
      iii. When maxFilterLengthP is greater than 1, and maxFilterLengthQ is greater than 1, and dp is less than (β+(β>>1))>>3, the variable dEp is set equal to 1.
      iv. When maxFilterLengthP is greater than 1, and maxFilterLengthQ is greater than 1, and dq is less than (β+(β>>1))>>3, the variable dEq is set equal to 1.

TABLE 8-18

Derivation of threshold variables β' and $t_C$' from input Q

| | Q | | | | | | | | | | | | | | | | |
|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 |
| β' | 0 | 0 | 0 | 0 | 0 | 0 | 0 | 0 | 0 | 0 | 0 | 0 | 0 | 0 | 0 | 0 | 6 |
| $t_C$' | 0 | 0 | 0 | 0 | 0 | 0 | 0 | 0 | 0 | 0 | 0 | 0 | 0 | 0 | 0 | 0 | 0 |

| | Q | | | | | | | | | | | | | | | | |
|---|---|---|---|---|---|---|---|---|---|---|---|---|---|---|---|---|---|
| | 17 | 18 | 19 | 20 | 21 | 22 | 23 | 24 | 25 | 26 | 27 | 28 | 29 | 30 | 31 | 32 | 33 |
| β' | 7 | 8 | 9 | 10 | 11 | 12 | 13 | 14 | 15 | 16 | 17 | 18 | 20 | 22 | 24 | 26 | 28 |
| $t_C$' | 0 | 3 | 4 | 4 | 4 | 4 | 5 | 5 | 5 | 5 | 7 | 7 | 8 | 9 | 10 | 10 | 11 |

| | Q | | | | | | | | | | | | | | | | |
|---|---|---|---|---|---|---|---|---|---|---|---|---|---|---|---|---|---|
| | 34 | 35 | 36 | 37 | 38 | 39 | 40 | 41 | 42 | 43 | 44 | 45 | 46 | 47 | 48 | 49 | 50 |
| β' | 30 | 32 | 34 | 36 | 38 | 40 | 42 | 44 | 46 | 48 | 50 | 52 | 54 | 56 | 58 | 60 | 62 |
| $t_C$' | 13 | 14 | 15 | 17 | 19 | 21 | 24 | 25 | 29 | 33 | 36 | 41 | 45 | 51 | 57 | 64 | 71 |

TABLE 8-18-continued

Derivation of threshold variables β' and $t_C$' from input Q

| | Q | | | | | | | | | | | | | | |
|---|---|---|---|---|---|---|---|---|---|---|---|---|---|---|---|
| | 51 | 52 | 53 | 54 | 55 | 56 | 57 | 58 | 59 | 60 | 61 | 62 | 63 | 64 | 65 |
| β' | 64 | 66 | 68 | 70 | 72 | 74 | 76 | 78 | 80 | 82 | 84 | 86 | 88 | — | — |
| $t_C$' | 80 | 89 | 100 | 112 | 125 | 141 | 157 | 177 | 198 | 222 | 250 | 280 | 314 | 352 | 395 |

8.8.3.6.2 Filtering Process for Luma Block Edges
Inputs to this process are:
  a picture sample array recPicture,
  a location (xCb, yCb) specifying the top-left sample of the current coding block relative to the top-left sample of the current picture,
  a location (xBl, yBl) specifying the top-left sample of the current block relative to the top-left sample of the current coding block,
  a variable edgeType specifying whether a vertical (EDGE_VER) or a horizontal (EDGE_HOR) edge is filtered,
  the variables dE, dEp and dEq containing decisions,
  the variables maxFilterLengthP and maxFilterLengthQ containing max filter lengths,
  the variable $t_C$.
Output of this process is the modified picture sample array recPicture.
Depending on the value of edgeType, the following applies:
  If edgeType is equal to EDGE_VER, the following ordered steps apply:
  1. The sample values $p_{i,k}$ and $q_{j,k}$ with i=0 ... maxFilterLengthP, j=0 ... maxFilterLengthQ and k=0 ... 3 are derived as follows:

$q_{j,k} = recPicture_L[xCb+xBl+j][yCb+yBl+k]$ (8-1112)

$p_{i,k} = recPicture_L[xCb+xBl-i-1][yCb+yBl+k]$ (8-1113)

2. When dE is not equal to 0 and dE is not equal to 3, for each sample location (xCb+xBl, yCb+yBl+k), k=0 ... 3, the following ordered steps apply:
    a. The filtering process for a luma sample using short filters as specified in clause 8.8.3.6.6 is invoked with the sample values $p_{i,k}$, $q_{i,k}$ with i=0 ... maxFilterLengthP, the locations (xP$_i$, yP$_i$) set equal to (xCb+xBl-i-1, yCb+yBl+k) and (xQ$_i$, yQ$_i$) set equal to (xCb+xBl+j, yCb+yBl+k) with j=0 ... maxFilterLengthQ, the decision dE, the variables dEp and dEq and the variable $t_C$ as inputs, and the number of filtered samples nDp and nDq from each side of the block boundary and the filtered sample values $p_i$' and $q_j$' as outputs.
    b. When nDp is greater than 0, the filtered sample values $p_i$' with i=0 ... nDp−1 replace the corresponding samples inside the sample array recPicture as follows:

recPicture[xCb+xBl−i−1][yCb+yBl+k]=$p_i$'  (8-1114)

c. When nDq is greater than 0, the filtered sample values $q_j$' with j=0 ... nDq−1 replace the corresponding samples inside the sample array recPicture as follows:

recPicture[xCb+xBl+j][yCb+yBl+k]=$q_j$'  (8-1115)

3. When dE is equal to 3, for each sample location (xCb+xBl, yCb+yBl+k), k=0 ... 3, the following ordered steps apply:
    a. The filtering process for a luma sample using long filters as specified in clause 8.8.3.6.7 is invoked with the sample values $p_{i,k}$, $q_{i,k}$ with i=0 ... maxFilterLengthP and j=0 ... maxFilterLengthQ, the locations (xP$_i$, yP$_i$) set equal to (xCb+xBl−i−1, yCb+yBl+k) with i=0 ... maxFilterLengthP−1 and (xQ$_j$, yQ$_j$) set equal to (xCb+xBl+j, yCb+yBl+k) with j=0 ... maxFilterLengthQ−1, the variables maxFilterLengthP, maxFilterLengthQ and $t_C$ as inputs and the filtered samples values $p_i$' and $q_j$' as outputs.
    b. The filtered sample values $p_j$' with i=0 ... maxFilterLengthP−1 replace the corresponding samples inside the sample array recPicture as follows:

recPicture[xCb+xBl−i−1][yCb+yBl+k]=$p_i$'  (8-1116)

c. The filtered sample values $q_j$' with j=0 ... maxFilterLengthQ−1 replace the corresponding samples inside the sample array recPicture as follows:

recPicture[xCb+xBl+j][yCb+yBl+k]=$q_j$'  (8-1117)

Otherwise (edgeType is equal to EDGE_HOR), the following ordered steps apply:
  1. The sample values $p_{i,k}$ and $q_{j,k}$ with i=0 ... maxFilterLengthP, j=0 ... maxFilterLengthQ and k=0 ... 3 are derived as follows:

$q_{i,k} = recPicture_L[xCb+xBl+k][yCb+yBl+j]$ (8-1118)

$p_{i,k} = recPicture_L[xCb+xBl+k][yCb+yBl−i−1]$ (8-1119)

2. When dE is not equal to 0 and dE is not equal to 3, for each sample location (xCb+xBl+k, yCb+yBl), k=0 ... 3, the following ordered steps apply:
    a. The filtering process for a luma sample using short filters as specified in clause 8.8.3.6.6 is invoked with the sample values $p_{i,k}$, $q_{i,k}$ with i=0 ... maxFilterLengthP, the locations (xP$_i$, yP$_i$) set equal to (xCb+xBl+k, yCb+yBl−i−1) and (xQ$_j$, yQ$_j$) set equal to (xCb+xBl+k, yCb+yBl+j) with j=0 ... maxFilterLengthQ, the decision dE, the variables dEp and dEq, and the variable $t_C$ as inputs, and the number of filtered samples nDp and nDq from each side of the block boundary and the filtered sample values $p_i$' and $q_j$' as outputs.
    b. When nDp is greater than 0, the filtered sample values $p_i$' with i=0 ... nDp−1 replace the corresponding samples inside the sample array recPicture as follows:

recPicture[xCb+xBl+k][yCb+yBl−i−1]=$p_i$'  (8-1120)

c. When nDq is greater than 0, the filtered sample values $q_j$' with j=0 ... nDq−1 replace the corresponding samples inside the sample array recPicture as follows:

recPicture[xCb+xBl+k][yCb+yBl+j]=$q_j$'  (8-1121)

3. When dE is equal to 3, for each sample location $(xCb+xBl+k, yCb+yBl)$, $k=0 \ldots 3$, the following ordered steps apply:
  a. The filtering process for a luma sample using long filters as specified in clause 8.8.3.6.7 is invoked with the sample values $p_{i,k}$, $q_{i,k}$ with $i=0 \ldots$ maxFilterLengthP and $j=0 \ldots$ maxFilterLengthQ, the locations $(xP_i, yP_i)$ set equal to $(xCb+xBl+k, yCb+yBl-i-1)$ with $i=0 \ldots$ maxFilterLengthP−1 and $(xQ_j, yQ_j)$ set equal to $(xCb+xBl+k, yCb+yBl+j)$ with $j=0 \ldots$ maxFilterLengthQ−1, the variables maxFilterLengthP, maxFilterLengthQ, and the variable $t_C$ as inputs, and the filtered sample values $p_i'$ and $q_j'$ as outputs.
  b. The filtered sample values $p_i'$ with $i=0 \ldots$ maxFilterLengthP−1 replace the corresponding samples inside the sample array recPicture as follows:

$$\text{recPicture}[xCb+xBl+k][yCb+yBl-i-1]=p_i' \quad (8\text{-}1122)$$

c. The filtered sample values $q_j'$ with $j=0 \ldots$ maxFilterLengthQ−1 replace the corresponding samples inside the sample array recPicture as follows:

$$\text{recPicture}[xCb+xBl+k][yCb+yBl+j]=q_j' \quad (8\text{-}1123)$$

8.8.3.6.3 Decision Process for Chroma Block Edges

This process is only invoked when ChromaArrayType is not equal to 0.

Inputs to this process are:
  a chroma picture sample array recPicture,
  a chroma location (xCb, yCb) specifying the top-left sample of the current chroma coding block relative to the top-left chroma sample of the current picture,
  a chroma location (xBl, yBl) specifying the top-left sample of the current chroma block relative to the top-left sample of the current chroma coding block,
  a variable edgeType specifying whether a vertical (EDGE_VER) or a horizontal (EDGE_HOR) edge is filtered,
  a variable cIdx specifying the colour component index,
  a variable cQpPicOffset specifying the picture-level chroma quantization parameter offset,
  a variable bS specifying the boundary filtering strength,
  a variable maxFilterLengthCbCr.

Outputs of this process are
  the modified variable maxFilterLengthCbCr,
  the variable tc.

The variable maxK is derived as follows:
  If edgeType is equal to EDGE_VER, the following applies:

$$\max K=(\text{SubHeight}C==1)?3:1 \quad (8\text{-}1124)$$

Otherwise (edgeType is equal to EDGE_HOR), the following applies:

$$\max K=(\text{SubWidth}C==1)?3:1 \quad (8\text{-}1125)$$

The values $p_i$ and $q_i$ with $i=0 \ldots$ maxFilterLengthCbCr and $k=0 \ldots$ maxK are derived as follows:
  If edgeType is equal to EDGE_VER, the following applies:

$$q_{i,k}=\text{recPicture}[xCb+xBl+i][yCb+yBl+k] \quad (8\text{-}1126)$$

$$p_{i,k}=\text{recPicture}[xCb+xBl-i-1][yCb+yBl+k] \quad (8\text{-}1127)$$

$$\text{subSample}C=\text{SubHeight}C \quad (8\text{-}1128)$$

Otherwise (edgeType is equal to EDGE_HOR), the following applies:

$$q_{i,k}=\text{recPicture}[xCb+xBl+k][yCb+yBl+i] \quad (8\text{-}1129)$$

$$p_{i,k}=\text{recPicture}[xCb+xBl+k][yCb+yBl-i-1] \quad (8\text{-}1130)$$

$$\text{subSample}C=\text{SubWidth}C \quad (8\text{-}1131)$$

The variables $Qp_Q$ and $Qp_P$ are set equal to the $Qp_Y$ values of the coding units which include the coding blocks containing the sample $q_{0,0}$ and $p_{0,0}$ respectively.

The variable $Qp_C$ is derived as follows:

$$qPi=\text{Clip3}(0,63,((Qp_Q+Qp_P+1)>>1)+cQpPicOffset) \quad (8\text{-}1132)$$

$$Qp_C=\text{ChromaQpTable}[cIdx-1][qPi] \quad (8\text{-}1133)$$

NOTE—The variable cQpPicOffset provides an adjustment for the value of pps_cb_qp_offset or pps_cr_qp_offset, according to whether the filtered chroma component is the Cb or Cr component. However, to avoid the need to vary the amount of the adjustment within the picture, the filtering process does not include an adjustment for the value of slice_cb_qp_offset or slice_cr_qp_offset nor (when cu_chroma_qp_offset_enabled_flag is equal to 1) for the value of $CuQpOffset_{Cb}$, $CuQpOffset_{Cr}$, or $CuQpOffset_{CbCr}$ The value of the variable $\beta'$ is determined as specified in Table 8-18 based on the quantization parameter Q derived as follows:

$$Q=\text{Clip3}(0,63,Qp_C+(\text{slice\_beta\_offset\_div2}<<1)) \quad (8\text{-}1134)$$

where slice_beta_offset_div2 is the value of the syntax element slice_beta_offset_div2 for the slice that contains sample $q_{0,0}$.

The variable $\beta$ is derived as follows:

$$\beta=\beta'*(1<<(\text{BitDepth}_C-8)) \quad (8\text{-}1135)$$

The value of the variable $t_C'$ is determined as specified in Table 8-18 based on the chroma quantization parameter Q derived as follows:

$$Q=\text{Clip3}(0,65,Qp_C+2*(bS-1)+(\text{slice\_tc\_offset\_div2}<<1)) \quad (8\text{-}1136)$$

where slice_tc_offset_div2 is the value of the syntax element slice_tc_offset_div2 for the slice that contains sample $q_{0,0}$.

The variable $t_C$ is derived as follows:

$$t_C=(\text{BitDepth}_C<10)?(t_C'+2)>>(10-(\text{BitDepth}_C):t_C'*(1<<(\text{BitDepth}_C-8)) \quad (8\text{-}1137)$$

When maxFilterLengthCbCr is equal to 1 and bS is not equal to 2, maxFilterLengthCbCr is set equal to 0.

When maxFilterLengthCbCr is equal to 3, the following ordered steps apply:
1. The variables n1, dpq0, dpq1, dp, dq and d are derived as follows:

$$n1=(\text{subSample}C==2)?1:3 \quad (8\text{-}1138)$$

$$dp0=\text{Abs}(p_{2,0}-2*p_{1,0}+p_{0,0}) \quad (8\text{-}1139)$$

$$dp1=\text{Abs}(p_{2,n1}-2*p_{1,n1}+p_{0,n1}) \quad (8\text{-}1140)$$

$$dq0=\text{Abs}(q_{2,0}-2*q_{1,0}+q_{0,0}) \quad (8\text{-}1141)$$

$$dq1=\text{Abs}(q_{2,n1}-2*q_{1,n1}+q_{0,n1}) \quad (8\text{-}1142)$$

$$dpq0=dp0+dq0 \quad (8\text{-}1143)$$

$$dpq1=dp1+dq1 \quad (8\text{-}1144)$$

$$dp=dp0+dp1 \quad (8\text{-}1145)$$

$$dq=dq0+dq1 \quad (8\text{-}1146)$$

$$d=dpq0+dpq1 \quad (8\text{-}1147)$$

2. The variables dSam0 and dSam1 are both set equal to 0.
3. When d is less than β, the following ordered steps apply:
   a. The variable dpq is set equal to 2*dpq0.
   b. The variable dSam0 is derived by invoking the decision process for a chroma sample as specified in clause 8.8.3.6.8 for the sample location (xCb+xBl, yCb+yBl) with sample values $p_{0,0}$, $p_{3,0}$, $q_{0,0}$, and $q_{3,0}$, the variables dpq, β and $t_C$ as inputs, and the output is assigned to the decision dSam0.
   c. The variable dpq is set equal to 2*dpq1.
   d. The variable dSam1 is modified as follows:
      If edgeType is equal to EDGE_VER, for the sample location (xCb+xBl, yCb+yBl+n1), the decision process for a chroma sample as specified in clause 8.8.3.6.8 is invoked with sample values $p_{0,n1}$, $p_{3,n1}$, $q_{0,n1}$, and $q_{3,n1}$, the variables dpq, β and $t_C$ as inputs, and the output is assigned to the decision dSam1.
      Otherwise (edgeType is equal to EDGE_HOR), for the sample location (xCb+xBl+n1, yCb+yBl), the decision process for a chroma sample as specified in clause 8.8.3.6.8 is invoked with sample values $p_{0,n1}$, $p_{3,n1}$, $q_{0,n1}$, and $q_{3,n1}$, the variables dpq, β and $t_C$ as inputs, and the output is assigned to the decision dSam1.
4. The variable maxFilterLengthCbCr is modified as follows:
   If dSam0 is equal to 1 and dSam1 is equal to 1, maxFilterLengthCbCr is set equal to 3.
   Otherwise, maxFilterLengthCbCr is set equal to 1.
It is noted that as illustrated in the 8-1132 and 8-1133 of the section 8.8.3.6.3, in the conventional approach, a Luma QP (e.g. qPi) is derived based on an average of Luma QPs of two adjacent blocks (e.g. $Qp_Q$ and $Qp_P$); then a Chroma QP (e.g. $Qp_C$) is derived from the Luma QP (e.g. qPi) (using one LUT). The embodiment of the present disclosure improves over the conventional approach and the details on how a decision process for the chroma block edge is performed will be described below.

8.8.3.6.4 Filtering Process for Chroma Block Edges
This process is only invoked when ChromaArrayType is not equal to 0.
Inputs to this process are:
   a chroma picture sample array recPicture,
   a chroma location (xCb, yCb) specifying the top-left sample of the current chroma coding block relative to the top-left chroma sample of the current picture,
   a chroma location (xBl, yBl) specifying the top-left sample of the current chroma block relative to the top-left sample of the current chroma coding block,
   a variable edgeType specifying whether a vertical (EDGE_VER) or a horizontal (EDGE_HOR) edge is filtered,
   a variable maxFilterLengthCbCr containing the maximum chroma filter length,
   the variable $t_C$.
Output of this process is the modified chroma picture sample array recPicture.
The variable maxK is derived as follows:
   If edgeType is equal to EDGE_VER, the following applies:

$$maxK=(SubHeightC==1)?3:1 \qquad (8\text{-}1148)$$

Otherwise (edgeType is equal to EDGE_HOR), the following applies:

$$maxK=(SubWidthC==1)?3:1 \qquad (8\text{-}1149)$$

The values $p_i$ and $q_i$ with i=0 ... maxFilterLengthCbCr and k=0 ... maxK are derived as follows:
   If edgeType is equal to EDGE_VER, the following applies:

$$q_{i,k}=recPicture[xCb+xBl+i][yCb+yBl+k] \qquad (8\text{-}1150)$$

$$p_{i,k}=recPicture[xCb+xBl-i-1][yCb+yBl+k] \qquad (8\text{-}1151)$$

Otherwise (edgeType is equal to EDGE_HOR), the following applies:

$$q_{i,k}=recPicture[xCb+xBl+k][yCb+yBl+i] \qquad (8\text{-}1152)$$

$$p_{i,k}=recPicture[xCb+xBl+k][yCb+yBl-i-1] \qquad (8\text{-}1153)$$

Depending on the value of edgeType, the following applies:
   If edgeType is equal to EDGE_VER, for each sample location (xCb+xBl, yCb+yBl+k), k=0 ... maxK, the following ordered steps apply:
1. The filtering process for a chroma sample as specified in clause 8.8.3.6.9 is invoked with the variable maxFilterLengthCbCr, the sample values $p_{i,k}$, $q_{i,k}$ with i=0 ... maxFilterLengthCbCr, the locations (xCb+xBl-i-1, yCb+yBl+k) and (xCb+xBl+i, yCb+yBl+k) with i=0 ... maxFilterLengthCbCr-1, and the variable $t_C$ as inputs, and the filtered sample values $p_i'$ and $q_i'$ with i=0 ... maxFilterLengthCbCr-1 as outputs.
2. The filtered sample values $p_i'$ and $q_i'$ with i=0 ... maxFilterLengthCbCr-1 replace the corresponding samples inside the sample array recPicture as follows:

$$recPicture[xCb+xBl+i][yCb+yBl+k]=q_i' \qquad (8\text{-}1154)$$

$$recPicture[xCb+xBl-i-1][yCb+yBl+k]=p_i' \qquad (8\text{-}1155)$$

Otherwise (edgeType is equal to EDGE_HOR), for each sample location (xCb+xBl+k, yCb+yBl), k=0 ... maxK, the following ordered steps apply:
1. The filtering process for a chroma sample as specified in clause 8.8.3.6.9 is invoked with the variable maxFilterLengthCbCr, the sample values $p_{i,k}$, $q_{i,k}$ with i=0 ... maxFilterLengthCbCr, the locations (xCb+xBl+k, yCb+yBl-i-1) and (xCb+xBl+k, yCb+yBl+i), and the variable $t_C$ as inputs, and the filtered sample values $p_i'$ and $q_i'$ as outputs.
2. The filtered sample values $p_i'$ and $q_i'$ replace the corresponding samples inside the sample array recPicture as follows:

$$recPicture[xCb+xBl+k][yCb+yBl+i]=q_i' \qquad (8\text{-}1156)$$

$$recPicture[xCb+xBl+k][yCb+yBl-i-1]=p_i' \qquad (8\text{-}1157)$$

It is noted that the filtering process for the chroma block edge based on the threshold parameter (e.g. the variable $t_C$) can be found in documents such as in the above section 8.8.3.6.4 of the VVC specification, and will not be repeated in the following.

8.8.3.6.5 Decision Process for a Luma Sample
Inputs to this process are:
   the sample values $p_0$, $p_3$, $q_0$ and $q_3$,
   the variables dpq, sp, sq, spq, sidePisLargeBlk, sideQisLargeBlk, β and $t_C$.
Output of this process is the variable dSam containing a decision.
The variables sp and sq are modified as follows:
   When sidePisLargeBlk is equal to 1, the following applies:

$$sp=(sp+Abs(p_3-p_0)+1)>>1 \qquad (8\text{-}1158)$$

When sideQisLargeBlk is equal to 1, the following applies:

$$sq=(sq+Abs(q_3-q_0)+1)>>1 \qquad (8\text{-}1159)$$

The variable sThr is derived as follows:
   If sidePisLargeBlk is equal to 1 or sideQisLargeBlk is equal to 1, the following applies:

$$sThr=3*\beta>>5 \quad (8\text{-}1160)$$

Otherwise, the following applies:

$$sThr=\beta>>3 \quad (8\text{-}1161)$$

The variable dSam is specified as follows:
   If all of the following conditions are true, dSam is set equal to 1:
   dpq is less than ($\beta>>2$),
   sp+sq is less than sThr,
   spq is less than ($5*t_C+1$)>>1.
       Otherwise, dSam is set equal to 0.

8.8.3.6.6 Filtering Process for a Luma Sample Using Short Filters

Inputs to this process are:
   the sample values $p_i$ and $q_i$ with i=0 . . . 3,
   the locations of $p_i$ and $q_i$, $(xP_i, yP_i)$ and $(xQ_i, yQ_i)$ with i=0 . . . 2,
   a variable dE,
   the variables dEp and dEq containing decisions to filter samples p1 and q1, respectively,
   a variable $t_C$.
Outputs of this process are:
   the number of filtered samples nDp and nDq,
   the filtered sample values $p_i'$ and $q_j'$ with i=0 . . . nDp−1, j=0 . . . nDq−1.
Depending on the value of dE, the following applies:
   If the variable dE is equal to 2, nDp and nDq are both set equal to 3 and the following strong filtering applies:

$$p_0'=\text{Clip3}(p_0-3*t_C,p_0+3*t_C,(p_2+2*p_1+2*p_0+2*q_0+q_1+4)>>3) \quad (8\text{-}1162)$$

$$p_1'=\text{Clip3}(p_1-2*t_C,p_1+2*t_C,(p_2+p_1+p_0+q_{0b+2})>>2) \quad (8\text{-}1163)$$

$$p_2'=\text{Clip3}(p_2-1*t_C,p_2+1*t_C,(2*p_3+3*p_2+p_1+p_0+q_0+4)>>3) \quad (8\text{-}1164)$$

$$q_0'=\text{Clip3}(q_0-3*t_C,q_0+3*t_C,(p_1+2*p_0+2*q_0+2*q_1+q_2+4)>>3) \quad (8\text{-}1165)$$

$$q_1'=\text{Clip3}(q_1-2*t_C,q_1+2*t_C,(p_0+q_0+q_1+q_2+2)>>2) \quad (8\text{-}1166)$$

$$q_2'=\text{Clip3}(q_2-1*t_C,q_2+1*t_C,(p_0+q_0+q_1+3*q_2+2*q_3+4)>>3) \quad (8\text{-}1167)$$

Otherwise, nDp and nDq are set both equal to 0 and the following weak filtering applies:
   The following applies:

$$\Delta=(9*(q_0-p_0)-3*(q_1-p_1)+8)>>4 \quad (8\text{-}1168)$$

When Abs($\Delta$) is less than $t_C*10$, the following ordered steps apply:
       The filtered sample values $p_0'$ and $q_0'$ are specified as follows:

$$\Delta=\text{Clip3}(-t_C,t_C,\Delta) \quad (8\text{-}1169)$$

$$p_0'=\text{Clip1}_Y(p_0+\Delta) \quad (8\text{-}1170)$$

$$q_0'=\text{Clip1}_Y(q_0-\Delta) \quad (8\text{-}1171)$$

When dEp is equal to 1, the filtered sample value $p_1'$ is specified as follows:

$$\Delta p=\text{Clip3}(-(t_C>>1),t_C>>1,(((p_2+p_0+1)>>1)-p_1+\Delta)>>1) \quad (8\text{-}1172)$$

$$p_1'=\text{Clip1}_Y(p_1+\Delta p) \quad (8\text{-}1173)$$

When dEq is equal to 1, the filtered sample value $q_1'$ is specified as follows:

$$\Delta q=\text{Clip3}(-(t_C>>1),t_C>>1,(((q_2+q_0+1)>>1)-q_1-\Delta)>>1) \quad (8\text{-}1174)$$

$$q_1'=\text{Clip1}_Y(q_1+\Delta q) \quad (8\text{-}1175)$$

nDp is set equal to dEp+1 and nDq is set equal to dEq+1.
When nDp is greater than 0 and one or more of the following conditions are true, nDp is set equal to 0:
   cu_transquant_bypass_flag of the coding unit that includes the coding block containing the sample $p_0$ is equal to 1.
   pred_mode_plt_flag of the coding unit that includes the coding block containing the sample $p_0$ is equal to 1.
When nDq is greater than 0 and one or more of the following conditions are true, nDq is set equal to 0:
   cu_transquant_bypass_flag of the coding unit that includes the coding block containing the sample $q_0$ is equal to 1.
   pred_mode_plt_flag of the coding unit that includes the coding block containing the sample $q_0$ is equal to 1.

8.8.3.6.7 Filtering Process for a Luma Sample Using Long Filters

Inputs to this process are:
   the variables maxFilterLengthP and maxFilterLengthQ,
   the sample values $p_i$ and $q_j$ with i=0 . . . maxFilterLengthP and j=0 . . . maxFilterLengthQ,
   the locations of $p_i$ and $q_j$, $(xP_i, yP_i)$ and $(xQ_j, yQ_j)$ with i=0 . . . maxFilterLengthP−1 and j=0 . . . maxFilterLengthQ−1,
   a variable $t_C$.
Outputs of this process are:
   the filtered sample values $p_i'$ and $q_j'$ with i=0 . . . maxFilterLengthP−1, j=0 . . . maxFilterLenghtQ−1.
The variable refMiddle is derived as follows:
   If maxFilterLengthP is equal to maxFilterLengthQ and maxFilterLengthP is equal to 5, the following applies:

$$\text{refMiddle}=(p_4+p_3+2*(p_2+p_1+p_0+q_0+q_1+q_2)+q_3+q_4+8)>>4 \quad (8\text{-}1176)$$

Otherwise, if maxFilterLengthP is equal to maxFilterLengthQ and maxFilterLengthP is not equal to 5, the following applies:

$$\text{refMiddle}=(p_6+p_5+p_4+p_3+p_2+p_1+2*(p_0+q_0)+q_1+q_2+q_3+q_4+q_5+q_6+8)>>4 \quad (8\text{-}1177)$$

Otherwise, if one of the following conditions are true,
   maxFilterLengthQ is equal to 7 and maxFilterLengthP is equal to 5,
   maxFilterLengthQ is equal to 5 and maxFilterLengthP is equal to 7,
   the following applies:

$$\text{refMiddle}=(p_4+p_3+2*(p_2+p_1+p_0+q_0+q_1+q_2)+q_3+q_4+8)>>4 \quad (8\text{-}1178)$$

Otherwise, if one of the following conditions are true,
   maxFilterLengthQ is equal to 5 and maxFilterLengthP is equal to 3,
   maxFilterLengthQ is equal to 3 and maxFilterLengthP is equal to 5,
   the following applies:

$$\text{refMiddle}=(p_3+p_2+p_1+p_0+q_0+q_1+q_2+q_3+4)>>3 \quad (8\text{-}1179)$$

Otherwise, if maxFilterLengthQ is equal to 7 and maxFilterLengthP is equal to 3, the following applies:

$$\text{refMiddle}=(2*(p_2+p_1+p_0+q_0)+p_0+p_1+q_1+q_2+q_3+q_4+q_5+q_6+8)>>4 \quad (8\text{-}1180)$$

Otherwise, the following applies:

$$\text{refMiddle}=(p_6+p_5+p_4+p_3+p_2+p_1+2*(q_2+q_1+q_0+p_0)+q_0+q_1+8)>>4 \quad (8\text{-}1181)$$

The variables refP and refQ are derived as follows:

$$\text{refP}=(p_{\text{maxFilterLengtP}}+p_{\text{maxFilterLengthP-1}}+1)>>1 \quad (8\text{-}1182)$$

$$\text{refQ}=(q_{\text{maxFilterLengtQ}}+q_{\text{maxFilterLengthQ-1}}+1)>>1 \quad (8\text{-}1183)$$

The variables $f_i$ and $t_C PD_i$ are defined as follows:
If maxFilterLengthP is equal to 7, the following applies:

$$f_{0\ldots 6}=\{59,50,41,32,23,14,5\} \quad (8\text{-}1184)$$

$$t_C PD_{0\ldots 6}=\{6,5,4,3,2,1,\} \quad (8\text{-}1185)$$

Otherwise, if maxFilterLengthP is equal to 5, the following applies:

$$f_{0\ldots 4}=\{58,45,32,19,6\} \quad (8\text{-}1186)$$

$$t_C PD_{0\ldots 4}=\{6,5,4,3,2\} \quad (8\text{-}1187)$$

Otherwise, the following applies:

$$f_{0\ldots 2}=\{53,32,11\} \quad (8\text{-}1188)$$

$$t_C PD_{0\ldots 2}=\{6,4,2\} \quad (8\text{-}1189)$$

The variables $g_j$ and $t_C QD_j$ are defined as follows:
If maxFilterLengthQ is equal to 7, the following applies:

$$g_{0\ldots 6}=\{59,50,41,32,23,14,5\} \quad (8\text{-}1190)$$

$$t_C QD_{0\ldots 6}=\{6,5,4,3,2,1,1\} \quad (8\text{-}1191)$$

Otherwise, if maxFilterLengthQ is equal to 5, the following applies:

$$g_{0\ldots 4}=\{58,45,32,19,6\} \quad (8\text{-}1192)$$

$$t_C QD_{0\ldots 4}=\{6,5,4,3,2\} \quad (8\text{-}1193)$$

Otherwise, the following applies:

$$g_{0\ldots 2}=\{53,32,1\} \quad (8\text{-}1194)$$

$$t_C QD_{0\ldots 2}=\{6,4,2\} \quad (8\text{-}1195)$$

The filtered sample values $p_i'$ and $q_j'$ with $i=0 \ldots$ maxFilterLengthP−1 and $j=0 \ldots$ maxFilterLengthQ−1 are derived as follows:

$$p_i'=\text{Clip3}(p_i-(t_C*t_C PD_i)>>1, p_i+(t_C*t_C PD_i)>>1, (\text{refMiddle}*f_i+\text{refP}*(64-f_i)+32)>>6) \quad (8\text{-}1196)$$

$$q_j'=\text{Clip3}(q_j-(t_C*t_C QD_j)>>1, q_j+(t_C*t_C QD_j)>>1, (\text{refMiddle}*g_j+\text{refQ}*(64-g_j)+32)>>6) \quad (8\text{-}1197)$$

When one or more of the following conditions are true, the filtered sample value, $p_i'$ is substituted by the corresponding input sample value $p_i$ with $i=0 \ldots$ maxFilterLengthP−1:
  cu_transquant_bypass_flag of the coding unit that includes the coding block containing the sample p, is equal to 1.
  pred_mode_plt_flag of the coding unit that includes the coding block containing the sample p, is equal to 1.
When one or more of the following conditions are true, the filtered sample value, $q_j'$ is substituted by the corresponding input sample value $q_j$ with $j=0 \ldots$ maxFilterLengthQ−1:
  cu_transquant_bypass_flag of the coding unit that includes the coding block containing the sample $q_j$ is equal to 1.
  pred_mode_plt_flag of the coding unit that includes the coding block containing the sample $q_j$ is equal to 1.

Figure 11:
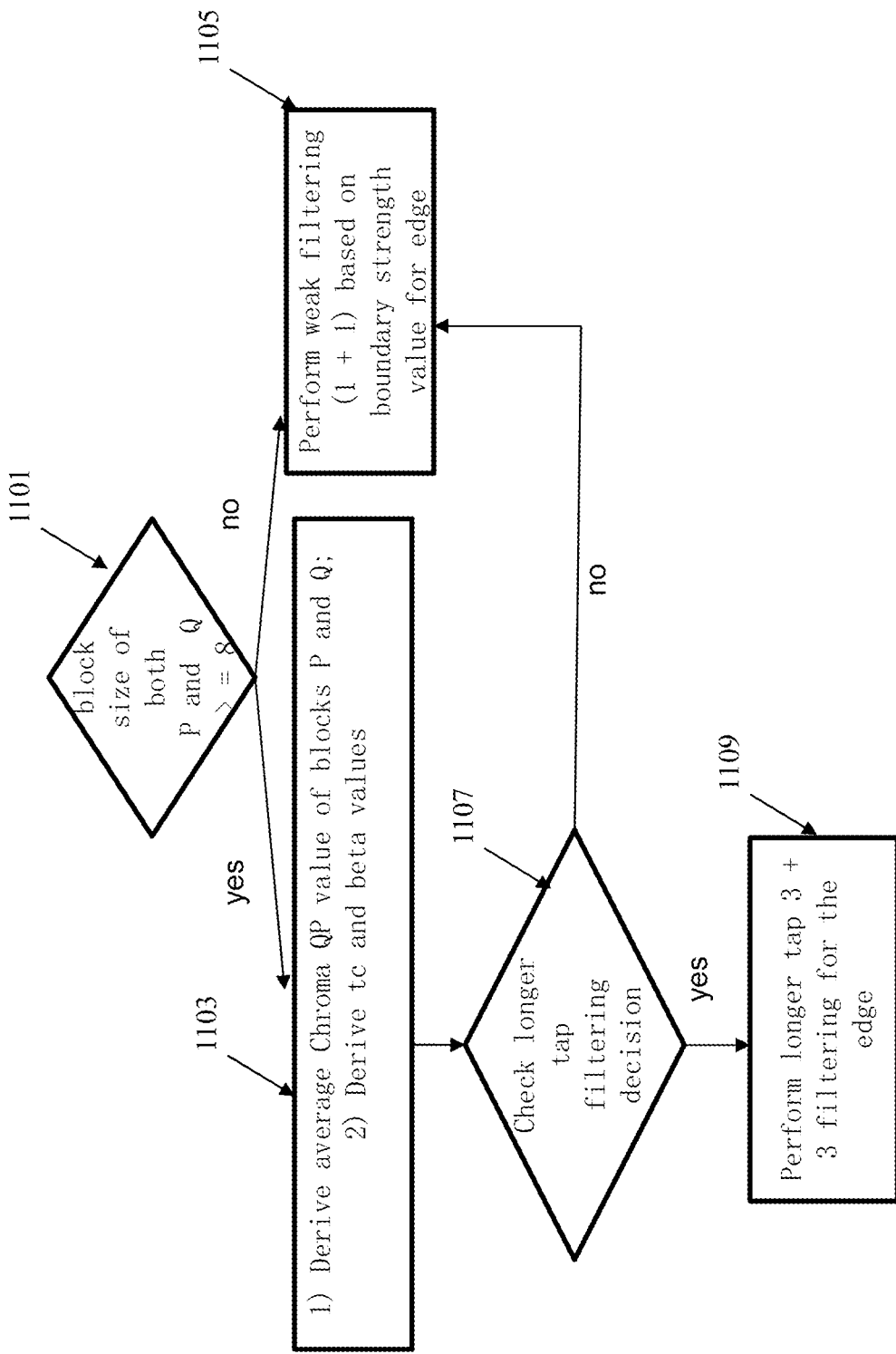
FIG. 11 shows an embodiment of a flow chart illustrating a deblocking method, for deblocking a chroma block edge between a first chroma block of a first image block and a second chroma block of a second image block.

8.8.3.6.8 Decision Process for a Chroma Sample
Inputs to this process are:
  the sample values $p_0$, $p_3$, $q_0$ and $q_3$,
  the variables dpq, β and $t_C$.
Output of this process is the variable dSam containing a decision.
The variable dSam is specified as follows:
  If all of the following conditions are true, dSam is set equal to 1:
  dpq is less than (β>>2),
  $\text{Abs}(p_3-p_0)+\text{Abs}(q_0-q_3)$ is less than (β>>3),
  $\text{Abs}(p_0-q_0)$ is less than $(5*t_C+1)>>1$.
  Otherwise, dSam is set equal to 0.
//it is noted that as shown in FIG. 11, the variable dSam containing a decision 1107, when dSam is set equal to 1, it means that the result of the decision 1107 is YES, then in an example, step 1109 may be performed; when dSam is set equal to 0, it means that the result of the decision 1107 is NO, then in an example, step 1105 may be performed.//

8.8.3.6.9 Filtering Process for a Chroma Sample
This process is only invoked when ChromaArrayType is not equal to 0.
Inputs to this process are:
  the variable maxFilterLength,
  the chroma sample values $p_i$ and $q_i$ with $i=0 \ldots$ maxFilterLengthCbCr,
  the chroma locations of $p_i$ and $q_i$, $(xP_i, yP_i)$ and $(xQ_i, yQ_i)$ with $i=0 \ldots$ maxFilterLengthCbCr−1,
  a variable $t_C$.
Outputs of this process are the filtered sample values $p_i'$ and $q_i'$ with $i=0 \ldots$ maxFilterLengthCbCr−1.
The filtered sample values $p_i'$ and $q_i'$ with $i=0 \ldots$ maxFilterLengthCbCr−1 are derived as follows:
  If maxFilterLengthCbCr is equal to 3, the following strong filtering applies:

$$p_0'=\text{Clip3}(p_0-t_C, p_0+t_C, (p_3+p_2+p_1+2*p_0+q_0+q_1+q_2+4)>>3) \quad (8\text{-}1198)$$

$$p_1'=\text{Clip3}(p_1-t_C, p_1+t_C, (2*p_3+p_2+2*p_1+p_0+q_0+q_1+4)>>3) \quad (8\text{-}1199)$$

$$p_2'=\text{Clip3}(p_2-t_C, p_2+t_C, (3*p_3+2*p_2+p_1+p_0+q_0+4)>>3) \quad (8\text{-}1200)$$

$$q_0'=\text{Clip3}(q_0-t_C, q_0+t_C, (p_2+p_1+p_0+2*q_0+q_1+q_2+q_3+4)>>3) \quad (8\text{-}1201)$$

$$q_1'=\text{Clip3}(q_1-t_C, q_1+t_C, (p_1+p_0+q_0+2*q_1+q_2+2*q_3+4)>>3) \quad (8\text{-}1202)$$

$$q_2'=\text{Clip3}(q_2-t_C, q_2+t_C, (p_0+q_0+q_1+2*q_2+3*q_3+4)>>3) \quad (8\text{-}1203)$$

Otherwise, the following weak filtering applies:

$$\Delta=\text{Clip3}(-t_C, t_C, ((((q_0-p_0)<<2)+p_1-q_1+4)>>3)) \quad (8\text{-}1204)$$

$$p_0'=\text{Clip1}_C(p_0+\Delta) \quad (8\text{-}1205)$$

$$q_0'=\text{Clip1}_C(q_0-\Delta) \quad (8\text{-}1206)$$

When one or more of the following conditions are true, the filtered sample value, $p_i'$ is substituted by the corresponding input sample value $p_i$ with $i=0 \ldots$ maxFilterLengthCbCr−1:

cu_transquant_bypass_flag of the coding unit that includes the coding block containing the sample $p_i$ is equal to 1.

pred_mode_plt_flag of the coding unit that includes the coding block containing the sample p, is equal to 1.

When one or more of the following conditions are true, the filtered sample value, $q_i'$ is substituted by the corresponding input sample value $q_i$ with i=0 . . . maxFilterLengthCbCr−1:

cu_transquant_bypass_flag of the coding unit that includes the coding block containing the sample $q_i$ is equal to 1.

pred_mode_plt_flag of the coding unit that includes the coding block containing the sample $q_i$ is equal to 1.

Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Versatile Video Coding (VVC) uses a tool called as Joint Chroma residual coding (JCCR), which is signaled in the bitstream using the flag "tu_joint_cbcr_residual_flag". This tool specifies whether the residual samples for both Chroma components Cb and Cr are coded as a single transform block. The flag "tu_joint_cbcr_residual_flag" equal to 1 specifies that the transform unit syntax includes the transform coefficient levels for a single transform block from which the residual samples for both Cb and Cr are derived. JCCR tool takes advantage of the fact that both Cb and Cr residuals appear to mostly correlate inversely with each other. Depending on tu_joint_cbcr_residual_flag, tu_cbf_cb, and tu_cbf_cr, the variable TuCResMode is derived as follows, where, tu_cbf_cb specifies the coded block flag of the Cb component, tu_cbf_cr is the coded block flag of the Cr component. And TuCResMode indicates the JCCR mode.

If tu_joint_cbcr_residual_flag is equal to 0, the variable TuCResMode is set equal to 0;

Otherwise, if tu_cbf_cb is equal to 1 and tu_cbf_cr is equal to 0, the variable TuCResMode is set equal to 1;

Otherwise, if tu_cbf_cb is equal to 1, the variable TuCResMode is set equal to 2;

Otherwise, the variable TuCResMode is set equal to 3.

The relation between the "reconstruction of Cb and Cr residuals" based on the variables tu_cbf_cb, and tu_cbf_cr, the variable TuCResMode is as shown in the table below.

| tu_cbf_cb | tu_cbf_cr | TuCResMode | Reconstruction of Cb and Cr residuals |
|---|---|---|---|
| 1 | 0 | 1 | resCb[ x ][ y ] = resJointC[ x ][ y ]<br>resCr[ x ][ y ] = ( CSign * resJointC[ x ][ y ] ) >> 1 |
| 1 | 1 | 2 | resCb[ x ][ y ] = resJointC[ x ][ y ]<br>resCr[ x ][ y ] = CSign * resJointC[ x ][ y ] |
| 0 | 1 | 3 | resCb[ x ][ y ] = ( CSign * resJointC[ x ][ y ] ) >> 1<br>resCr[ x ][ y ] = resJointC[ x ][ y ] |

The variable CSign is sign value (+1 or −1) and this is signaled in the slice header. resJointC[x][y] is the actual transmitted residual in the bitstream.

resCb[x][y] indicates the derived residual samples for the Chroma component Cb;

resCr[x][y] indicates the derived residual samples for the Chroma component Cr.

The present disclosure may use respective Chroma QP mapping tables for each of the Chroma components Cb and Cr and joint Cb-Cr residuals. When the syntax element "same_qp_table_for_chroma" equals to 1, it specifies that the same Chroma QP tables are used and these same tables apply to Cb, Cr and joint Cb-Cr residuals. When "same_qp_table_for_chroma" equals to 0, it represents that a different Chroma QP mapping table is used for Cb, Cr or joint Cb-Cr residuals. The three chroma mapping tables might be represented in different forms.

As shown in FIGS. 12A and 12B, there are three sub-tables (i.e., the rows with index value equals to 0, 1, and 2). As the content of row 2 is different from row 0 and/or 1, the syntax element same_qp_table_for_chroma should be equal to 0. Otherwise, if the syntax element same_qp_table_for_chroma is equal to 1, the content of row 1 and 2 shall be the same to that of row 0.

As shown in FIG. 13, there are three separate tables, designed for Cb, Cr, and joint Cb-Cr residuals, respectively. As the content of tables for Cb, Cr, and joint Cb-Cr residuals are different with each other, the syntax element same_qp_table_for_chroma should be equal to 0. Otherwise, if the syntax element same_qp_table_for_chroma is equal to 1, the content of tables for Cb, Cr, and joint Cb-Cr residuals should be the same.

The syntax elements num_points_in_qp_table_minus1[i], delta_qp_in_val_minus1[i][j], delta_qp_out_val[i][j] are further used to derive the Chroma QP mapping tables. The semantics of these syntax elements and the procedure to derive the Chroma QP mapping tables is as shown below:

num_points_in_qp_table_minus1[i] plus 1 specifies the number of points used to describe the i-th chroma QP mapping table. The value of num_points_in_qp_table_minus1[i] shall be in the range of 0 to 63+QpBdOffset$_C$, inclusive. When num_points_in_qp_table_minus1[0] is not present in the bitstream, the value of num_points_in_qp_table_minus1[0] is inferred to be equal to 0.

delta_qp_in_val_minus1[i][j] specifies a delta value used to derive the input coordinate of the j-th pivot point of the i-th chroma QP mapping table. When delta_qp_in_val_minus1[0][j] is not present in the bitstream, the value of delta_qp_in_val_minus1[0][j] is inferred to be equal to 0.

delta_qp_out_val[i][j] specifies a delta value used to derive the output coordinate of the j-th pivot point of the i-th chroma QP mapping table. When delta_qp_out_val[0][j] is not present in the bitstream, the value of delta_qp_out_val[0][j] is inferred to be equal to 0.

It is noted that in the present disclosure, the details on the example on how the derivation of the first chroma QP mapping table, the second chroma QP mapping table and the third chroma QP mapping table will be described in the following.

The i-th chroma QP mapping table ChromaQpTable[i] for i=0 . . . same_qp_table_for_chroma ? 0:2 is derived as follows:

```
qpInVal[ i ][ 0 ] = −QpBdOffset_C + delta_qp_in_val_minus1[ i ][ 0 ]
qpOutVal[ i ][ 0 ] = −QpBdOffset_C + delta_qp_out_val[ i ][ 0 ]
for( j = 1; j <= num_points_in_qp_table_minus1[ i ]; j++ ) {
  qpInVal[ i ][ j ] = qpInVal[ i ][ j − 1 ] + delta_qp_in_val_minus1[ i ][ j ] + 1
```

```
qpOutVal[ i ][ j ] = qpOutVal[ i ][ j - 1 ] + delta_qp_out_val[ i ][ j ]
}
ChromaQpTable[ i ][ qpInVal[ i ][ 0 ] ] = qpOutVal[ i ][ 0 ]
for( k = qpInVal[ i ][ 0 ] - 1; k >= -QpBdOffset_C; k - - )
   ChromaQpTable[ i ][ k ] = Clip3( -QpBdOffset_C, 63, ChromaQpTable[ i ][ k + 1 ] - 1
)
   (7-31)
for( j = 0; j < num_points_in_qp_table_minus1[ i ]; j++ ) {
   sh = ( delta_qp_in_val_minus1[ i ][j + 1 ] + 2 ) >> 1
   for( k = qpInVal[ i ][ j ] + 1, m = 1; k <= qpInval[ i ][ j + 1 ]; k++, m++)
      ChromaQpTable[ i ][ k ] = ChromaQpTable[ i ][ qpInVal[ i ][ j ] ] +
        ( delta_qp_out_val[ i ][j + 1] * m + sh ) /
( delta_qp_in_val_minus1[ i ][j + 1] + 1 )
}
for( k = qpInVal[ i ][ num_points_in_qp_table_minus1[ i ] ] + 1; k <= 63; k++ )
   ChromaQpTable[ i ] [ k ] = Clip3( -QpBdOffsetC, 63, ChromaQpTable[ i ] [k - 1 ] +
1 )
```

When same_qp_table_for_chroma is equal to 1, ChromaQpTable[1][k] and ChromaQpTable[2][k] are set equal to ChromaQpTable[0][k] for k=QpBdOffset$_C$ ... 63.

It is a requirement of bitstream conformance that the values of qpInVal[i][j] and qpOutVal[i][j] shall be in the range of QpBdOffset$_C$ to 63, inclusive for i=0 . . . same_qp_table_for_chroma ? 0:2 and j=0 . . . num_points_in_qp_table_minus1[i].

Please note that ChromaQPmapping table can also be expressed using a simple formula which takes as input the luma QP value ($QP_i$) and the color component value (cIdx) and then output the corresponding Chroma Qp value ($QP_c$). The formula may depict a linear relationship between the Luma QP and chroma QP. For e.g. the formula can be as follows:

$$QP_c = QP_i - x$$

where x is constant dependent on the color component value (cIdx) and x can take different values for different color component indexes including the joint Cb-Cr component.

Embodiments of the video encoder 20 (respectively loop filter unit 220) may be configured to output loop filter parameters (such as SAO filter parameters or ALF filter parameters or LMCS parameters), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown) . . . The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition a picture from a video sequence into a sequence of coding tree units (CTUs), and the CTU 203 may be further partitioned into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may be configured to partition a picture from a video sequence into a sequence of coding tree units (CTUs), and the partitioning unit 262 may partition (or split) a coding tree unit (CTU) 203 into smaller partitions, e.g. smaller blocks of square or rectangular size. For a picture that has three sample arrays, a CTU consists of an N×N block of luma samples together with two corresponding blocks of chroma samples. The maximum allowed size of the luma block in a CTU is specified to be 128×128 in the developing versatile video coding (VVC), but it can be specified to be value rather than 128×128 in the future, for example, 256×256. The CTUs of a picture may be clustered/grouped as slices/tile groups, tiles or bricks. A tile covers a rectangular region of a picture, and a tile can be divided into one or more bricks. A brick consists of a number of CTU rows within a tile. A tile that is not partitioned into multiple bricks can be referred to as a brick. However, a brick is a true subset of a tile and is not referred to as a tile.

There are two modes of tile groups are supported in VVC, namely the raster-scan slice/tile group mode and the rectangular slice mode. In the raster-scan tile group mode, a slice/tile group contains a sequence of tiles in tile raster scan of a picture. In the rectangular slice mode, a slice contains a number of bricks of a picture that collectively form a rectangular region of the picture. The bricks within a rectangular slice are in the order of brick raster scan of the slice. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the leaf CU level. Each leaf CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quadtree structure similar to the coding tree for the CU.

In embodiments, e.g., according to the latest video coding standard currently in development, which is referred to as Versatile Video Coding (VVC), a combined Quad-tree nested multi-type tree using binary and ternary splits segmentation structure for example used to partition a coding tree unit. In the coding tree structure within a coding tree unit, a CU can have either a square or rectangular shape. For example, the coding tree unit (CTU) is first partitioned by a quaternary tree. Then the quaternary tree leaf nodes can be further partitioned by a multi-type tree structure. There are four splitting types in multi-type tree structure, vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is smaller than the width or height of the colour component of the CU.VVC develops a unique signaling mechanism of the partition splitting information in quadtree with nested multi-type tree coding tree structure. In the signalling mechanism, a coding tree unit (CTU) is treated as the root of a quaternary tree and is first partitioned by a quaternary tree structure. Each quaternary tree leaf node (when sufficiently large to allow it) is then further partitioned by a multi-type tree structure. In the multi-type tree structure, a first flag (mtt_split_cu_flag) is signalled to indicate whether the node is further partitioned; when a node is further partitioned, a second flag (mtt_split_cu_vertical_flag) is signalled to indicate the splitting direction, and then a third flag (mtt_split_cu_binary_flag) is signalled to indicate whether the split is a binary split or a ternary split. Based on the values of mtt_split_cu_vertical_flag and mtt_split_cu_binary_flag, the multi-type tree slitting mode (MttSplitMode) of a CU can be derived by a decoder based on a predefined rule or a table. It should be noted, for a certain design, for example, 64×64 Luma block and 32×32 Chroma pipelining design in VVC hardware decoders, TT split is forbidden when either width or height of a luma coding block is larger than 64, as shown in FIG. 6. TT split is also forbidden when either width or height of a chroma coding block is larger than 32. The pipelining design will divide a picture into Virtual pipeline data units (VPDUs) which are defined as non-overlapping units in a picture. In hardware decoders, successive VPDUs are processed by multiple pipeline stages simultaneously. The VPDU size is roughly proportional to the buffer size in most pipeline stages, so it is important to keep the VPDU size small. In most hardware decoders, the VPDU size can be set to maximum transform block (TB) size. However, in VVC, ternary tree (TT) and binary tree (BT) partition may lead to the increasing of VPDUs' size.

In addition, it should be noted that, when a portion of a tree node block exceeds the bottom or right picture boundary, the tree node block is forced to be split until the all samples of every coded CU are located inside the picture boundaries.

As an example, the Intra Sub-Partitions (ISP) tool may divide luma intra-predicted blocks vertically or horizontally into 2 or 4 sub-partitions depending on the block size. In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC. As an example, several conventional angular intra prediction modes are adaptively replaced with wide-angle intra prediction modes for the non-square blocks, e.g. as defined in VVC. As another example, to avoid division operations for DC prediction, only the longer side is used to compute the average for non-square blocks. And, the results of intra prediction of planar mode may be further modified by a position dependent intra prediction combination (PDPC) method.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DPB 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pa, quarter-pa and/or ¹⁄₁₆ luma pa interpolation, or not.

Additional to the above prediction modes, skip mode, direct mode and/or other inter prediction mode may be applied.

For example, Extended merge prediction, the merge candidate list of such mode is constructed by including the following five types of candidates in order: Spatial MVP from spatial neighbor CUs, Temporal MVP from collocated CUs, History-based MVP from an FIFO table, Pairwise average MVP and Zero MVs. And a bilateral-matching based decoder side motion vector refinement (DMVR) may be applied to increase the accuracy of the MVs of the merge mode. Merge mode with MVD (MMVD), which comes from merge mode with motion vector differences. A MMVD flag is signaled right after sending a skip flag and merge flag to specify whether MMVD mode is used for a CU. And a CU-level adaptive motion vector resolution (AMVR) scheme may be applied. AMVR allows MVD of the CU to be coded in different precision. Dependent on the prediction mode for the current CU, the MVDs of the current CU can be adaptively selected. When a CU is coded in merge mode, the combined inter/intra prediction (CIIP) mode may be applied to the current CU. Weighted averaging of the inter and intra prediction signals is performed to obtain the CIIP prediction. Affine motion compensated prediction, the affine motion field of the block is described by motion information of two control point (4-parameter) or three control point motion vectors (6-parameter). Subblock-based temporal motion vector prediction (SbTMVP), which is similar to the temporal motion vector prediction (TMVP) in HEVC, but predicts the motion vectors of the sub-CUs within the current CU. Bi-directional optical flow (BDOF), previously referred to as BIO, is a simpler version that requires much less computation, especially in terms of number of multiplications and the size of the multiplier. Triangle partition mode, in such a mode, a CU is split evenly into two triangle-shaped partitions, using either the diagonal split or the anti-diagonal split. Besides, the bi-prediction mode is extended beyond simple averaging to allow weighted averaging of the two prediction signals.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter unit 320, a decoded picture buffer (DPB) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214, the loop filter unit 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter unit 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 may be configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. an adaptive loop filter (ALF), a noise suppression filter (NSF), or any combination thereof. In an example, the loop filter unit 220 may comprise a de-blocking filter, a SAO filter and an ALF filter. The order of the filtering process may be the deblocking filter, SAO and ALF. In another example, a process called the luma mapping with chroma scaling (LMCS) (namely, the adaptive in-loop reshaper) is added. This process is performed before deblocking. In another example, the deblocking filter process may be also applied to internal sub-block edges, e.g. affine sub-blocks edges, ATMVP sub-blocks edges, sub-block transform (SBT) edges and intra sub-partition (ISP) edges. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the intra prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs) or one or more groups of blocks (e.g. tiles (H.265/HEVC and VVC) or bricks (VVC)).

Embodiments of the video decoder 30 as shown in FIG. 3 may be configured to partition and/or decode the picture by using slices/tile groups (also referred to as video tile groups) and/or tiles (also referred to as video tiles), wherein a picture may be partitioned into or decoded using one or more slices/tile groups (typically non-overlapping), and each slice/tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filter unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{(bitDepth-1)} \sim 2^{(bitDepth-1)}-1$, where "^" means exponentiation. For example, if bitDepth is set equal to 16, the range is $-32768 \sim 32767$; if bitDepth is set equal to 18, the range is $-131072 \sim 431071$. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Figure 4:
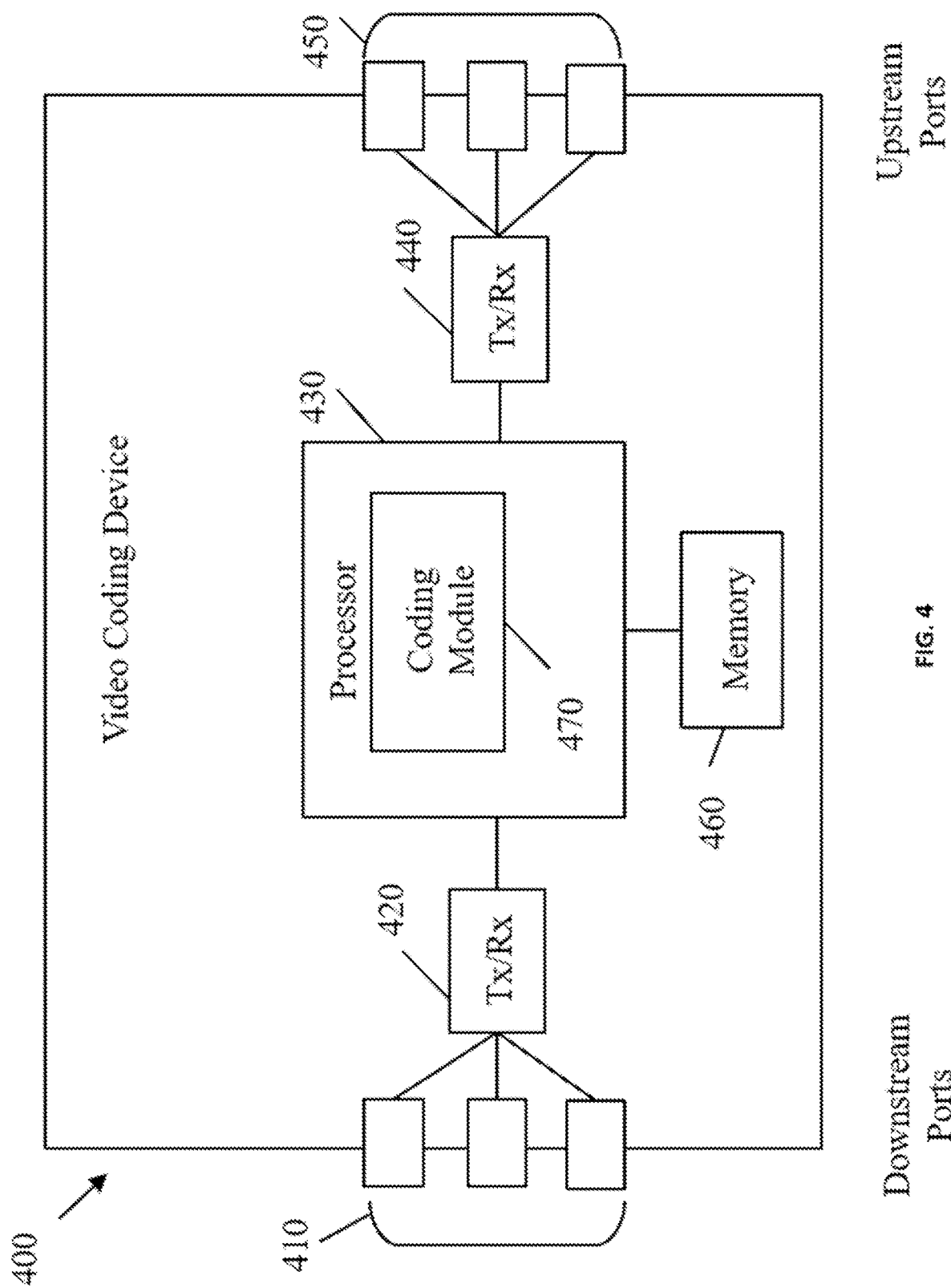
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
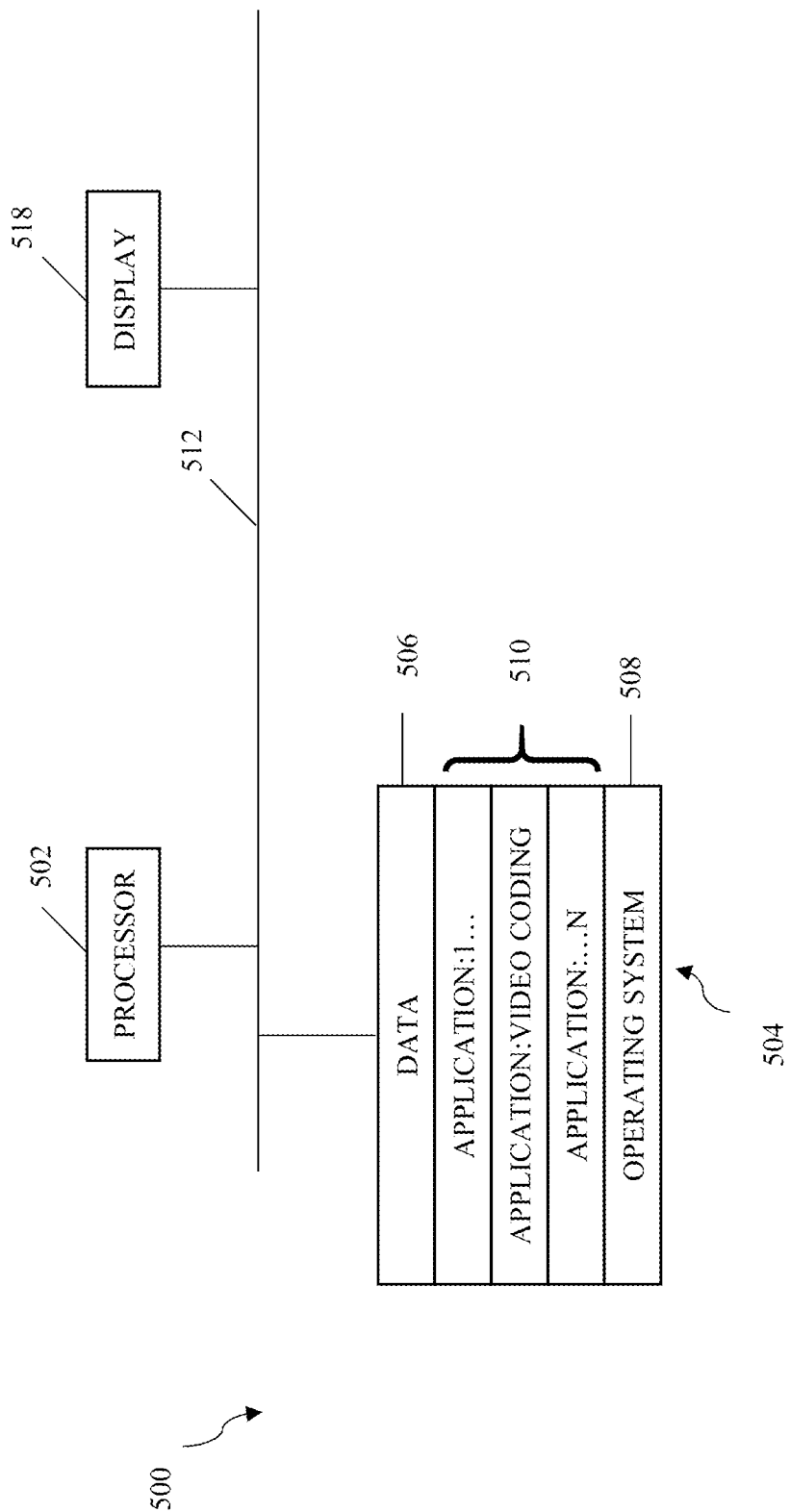
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1A according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

The following describes the embodiments of the present invention with reference to the accompanying drawings of the specification. It should be understood that the embodiments described herein are merely used to describe and explain the present invention, but are not intended to limit the present invention.

Figure 6A:
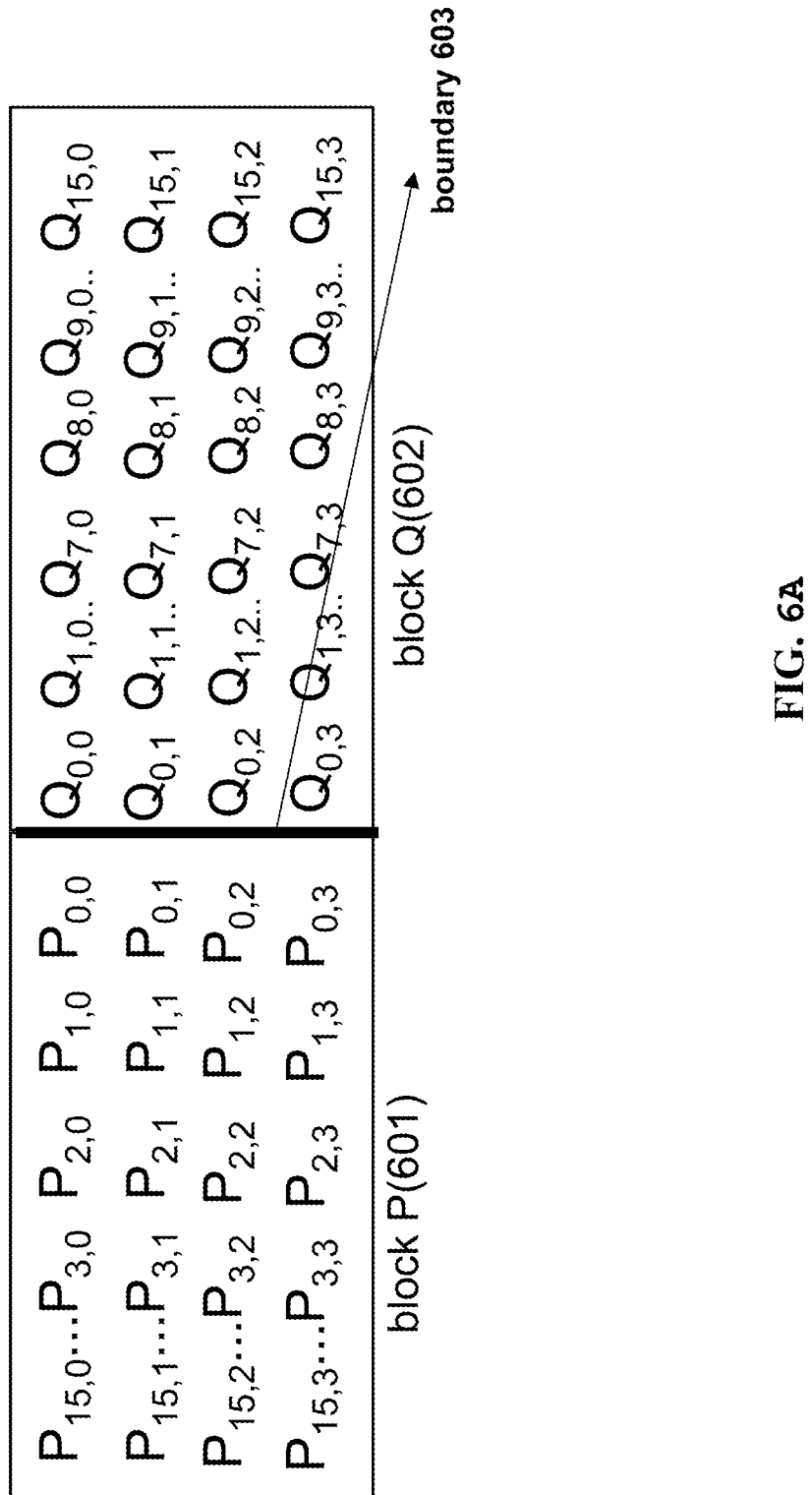
FIG. 6A shows two exemplary image blocks (such as transform blocks or coding blocks)
Figure 6B:
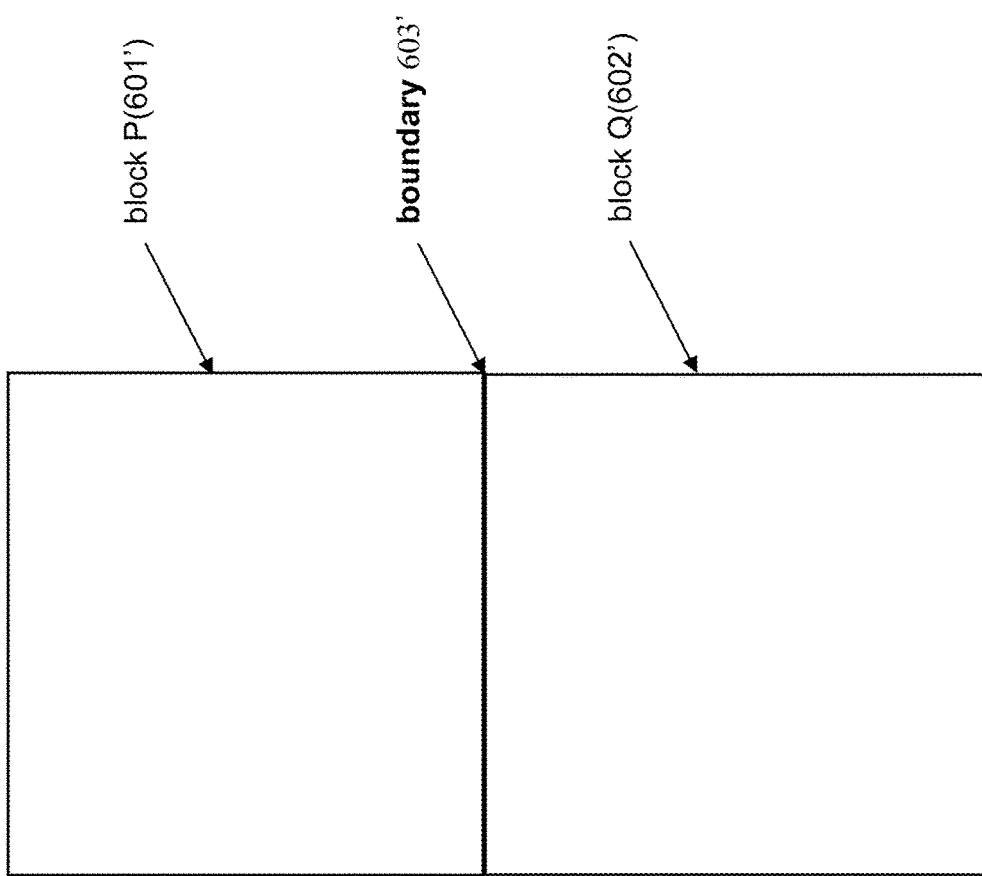
FIG. 6B shows two exemplary image blocks (such as transform blocks or coding blocks)

Example scenarios for applying deblocking filter are depicted in FIGS. 6A and 6B. As shown in the FIG. 6A. Blocks 601, 602, also referred to as P, Q are two coding blocks or transform blocks, the size of the CU's is 16×4 samples. As shown in FIGS. 6A and 6B, the technology presented herein applies to both vertical and horizontal edges.

Video coding may be performed based on color space and color format. For example, color video plays an important role in multimedia systems, where various color spaces are used to efficiently represent color. A color space specifies color with numerical values using multiple components. A popular color space is the RGB color space, where color is represented as a combination of three primary color component values (i.e., red, green and blue). For color video compression, the YCbCr color space has been widely used, as described in A. Ford and A. Roberts, "Colour space conversions," University of Westminster, London, Tech. Rep., August 1998.

Figure 7A:
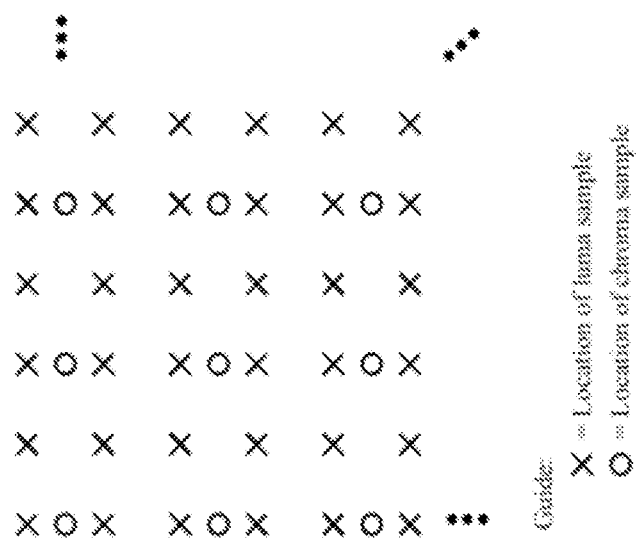
FIG. 7A is a conceptual diagram illustrating nominal vertical and horizontal relative locations of luma and chroma samples.
Figure 7B:
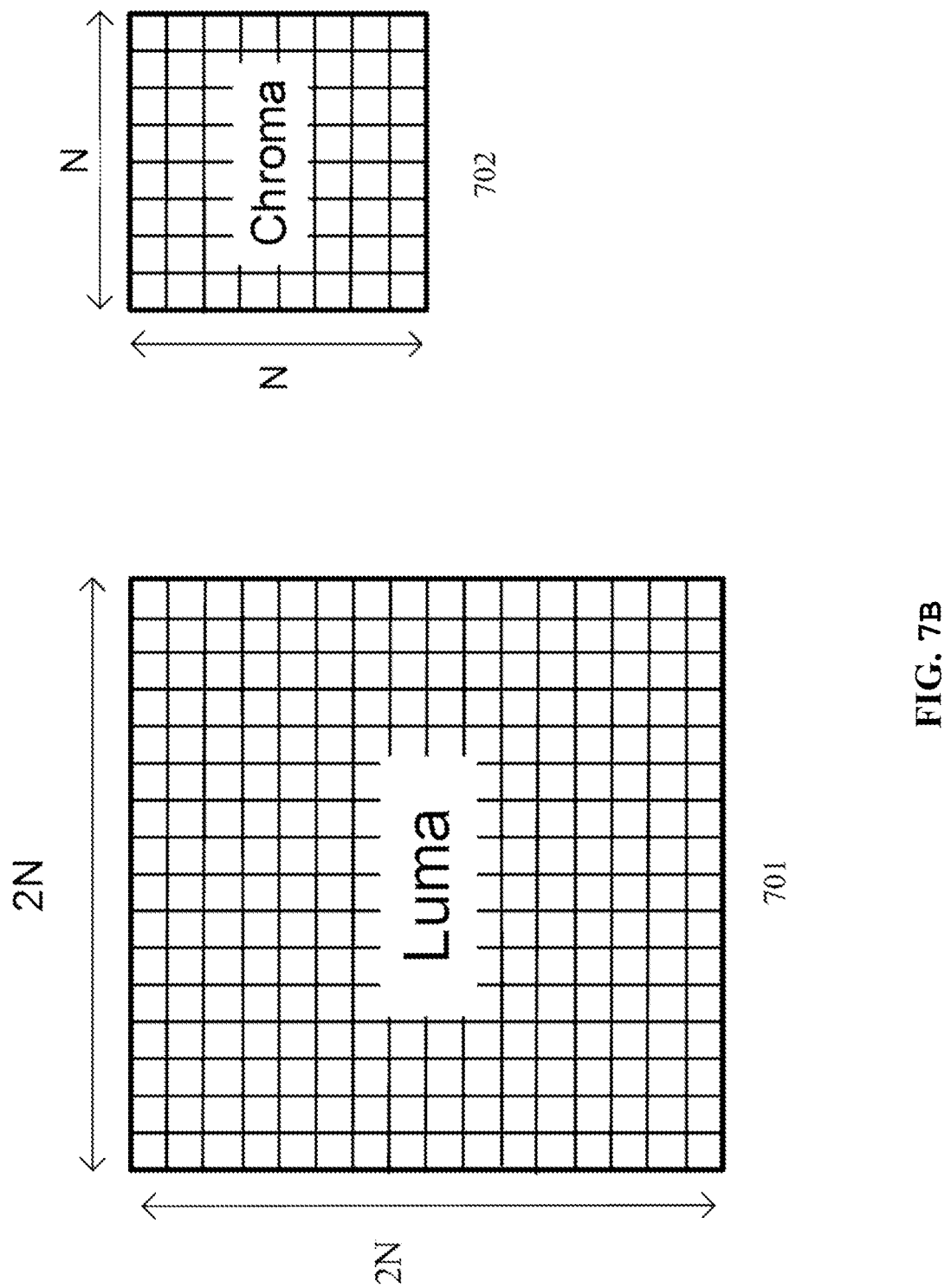
FIG. 7B is a schematic diagram illustrating a co-located luma block and a chroma block.

YCbCr can be easily converted from the RGB color space via a linear transformation and the redundancy between different components, namely the cross component redundancy, is significantly reduced in the YCbCr color space. One advantage of YCbCr is the backward compatibility with black and white TV as Y signal conveys luminance information. In addition, chrominance bandwidth can be reduced by subsampling the Cb and Cr components in 4:2:0 chroma sampling format with significantly less subjective impact than subsampling in the RGB color space. Because of these advantages, YCbCr has been the major color space in video compression. There are also other color spaces, such as YCoCg, used in video compression. In this disclosure, regardless of the actual color space used, the luma (or L or Y) and two chroma (Cb and Cr) are used to represent the three color components in the video compression scheme. For example, when the chroma format sampling structure is 4:2:0 sampling, each of the two chroma arrays has half the height and half the width of the luma array. An example of the nominal vertical and horizontal relative locations of luma and chroma samples in pictures are shown in FIG. 7A. FIG. 7B illustrates an example of 4:2:0 sampling. FIG. 7B illustrates an example of a co-located luma block and a chroma block. If the video format is YUV4:2:0, then there are one 16×16 luma block and two 8×8 chroma blocks.

Specifically, a coding block or a transform block contains a luma block and two chroma blocks.

As shown, the luma block contains four times the samples as the chroma block. Specifically, the chroma block contains N number of samples by N number of samples while the luma block contains 2N number of samples by 2N number of samples. Hence, the luma block is four times the resolution of the chroma block. For example, when YUV4:2:0 format is used, the luma samples may be down-sampled by a factor of four (e.g., width by two, and height by two). YUV is a color encoding system that employs a color space in terms of luma components Y and two chrominance components U and V.

Figure 8:
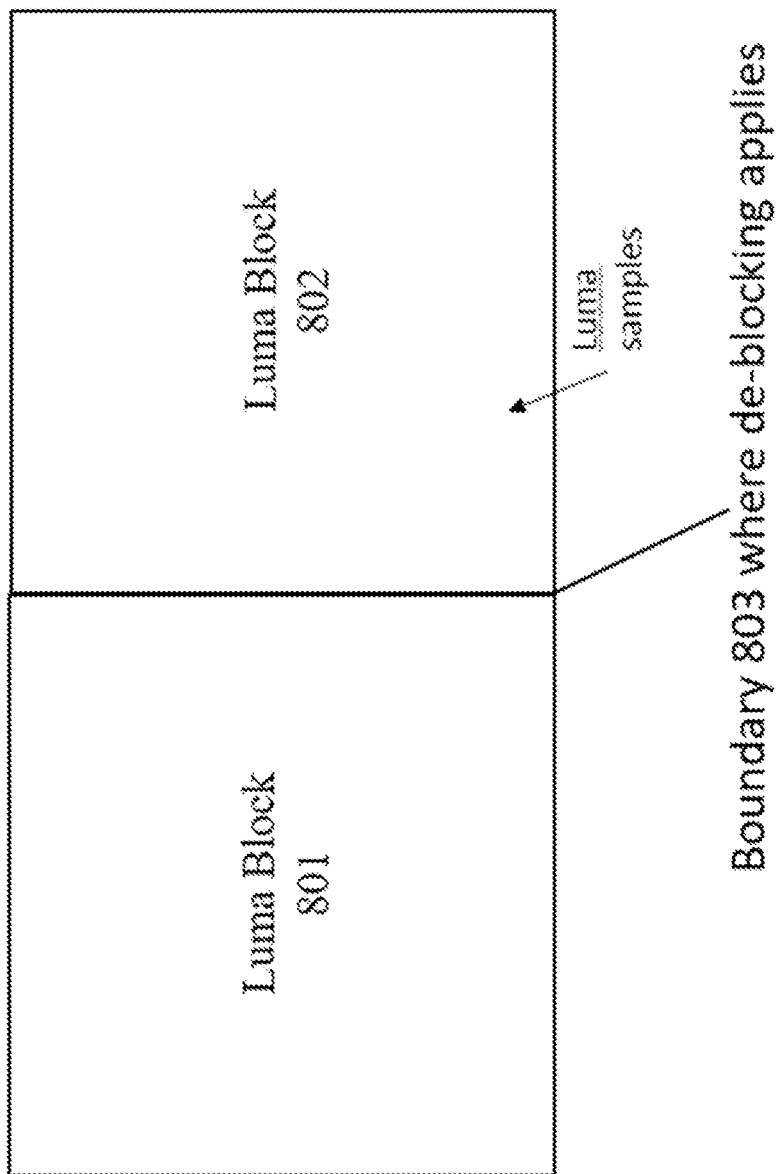
FIG. 8 shows two exemplary luma blocks (such as luma components of transform blocks or coding blocks)

An example of a scenario for applying deblocking filter for two luma blocks is depicted in FIG. 8. There is a luma block edge 803 between a first luma block 801 of a first image block (601, 601') and a second luma block 802 of a second image block (602, 602').

Figures 9G, 9H:
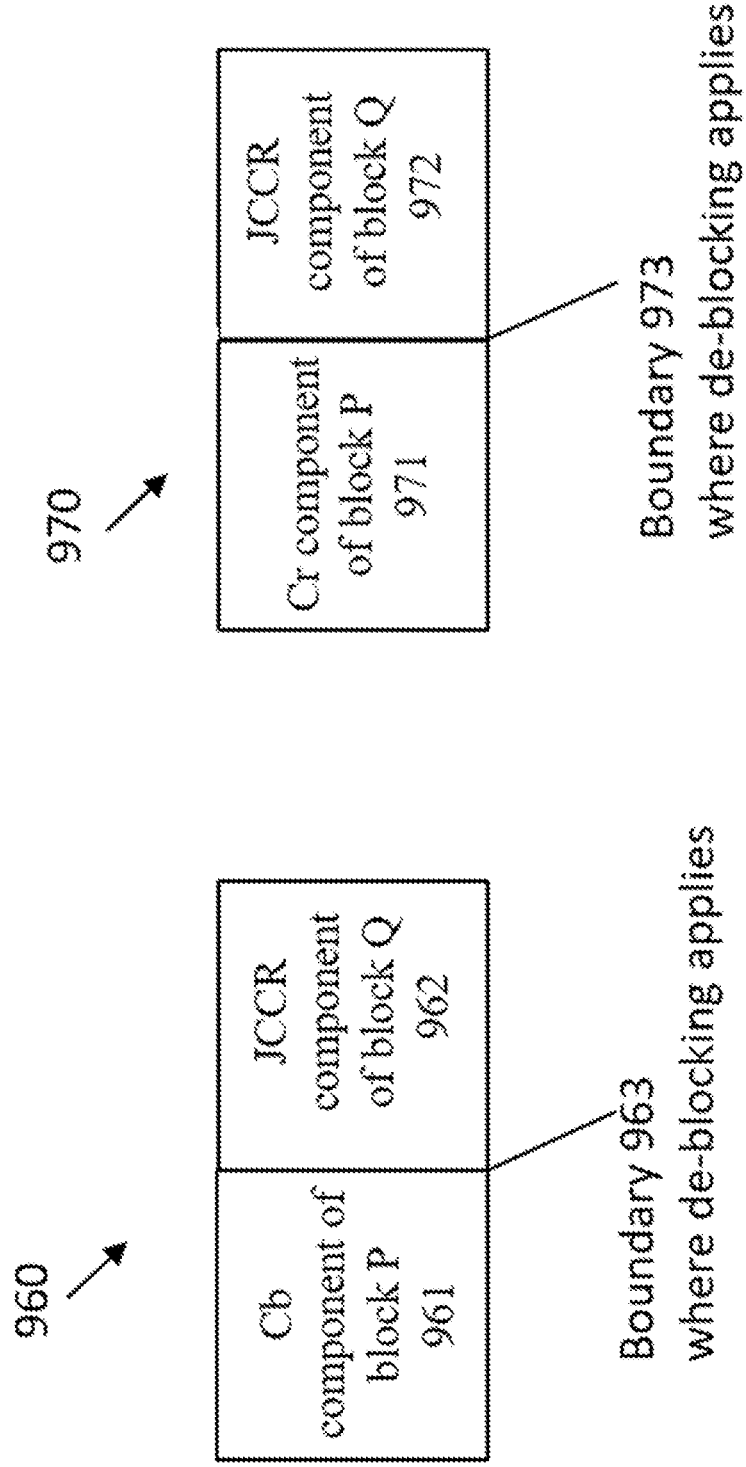

Scenarios where the deblocking filter is applied for two chroma blocks are depicted in FIG. 9A-9H. FIG. 9A illustrates a chroma block P 901 of a first image block (601, 601'), a chroma block Q 902 of a second image block (602, 602'), and a chroma block edge 903 for which the deblocking filter is applied. As shown in the FIG. 9A, a vertical chroma block edge 903 between chroma blocks 901, 902 is filtered according to the embodiment of the present invention. Each of FIGS. 9B-9H shows an example of the chroma block for chroma block P and chroma block Q. For example, in FIG. 9B, the vertical Cb component edge 913 between Cb components 911, 912 is filtered according to the embodiment of the present invention. In the FIG. 9C, a vertical Cr component edge 923 between Cr components 921, 922 is filtered according to the embodiment of the present invention.

In the previous VVC deblocking design, whenever a given Chroma block (Cb or Cr) uses joint Cb-Cr residual (JCCR) coding tool, the corresponding QP used in the Chroma deblocking is derived from the ChromaQP mapping table designed for individual Cb and Cr components. For the Joint Cb-Cr coded blocks or Joint Cb-Cr components, using the ChromaQPTable designed for Cb and Cr components may result in wrong Chroma QP derivation and therefore the deblocking decisions and/or deblocking process (which depends on the Chroma QP value) are affected. This results in inaccurate deblocking decisions and/or deblocking process and therefore may lead to blocking artifacts remaining the image, which affects the overall visual quality of the coded image.

In the previous Versatile Video Coding (VVC) deblocking design, the Chroma QP is derived as follows:

The variables $Qp_Q$ and $Qp_P$ are set equal to the $Qp_Y$ values of the coding units which include the coding blocks containing the sample $q_{0,0}$ and $p_{0,0}$, respectively. It can be understood that the variable $Qp_Q$ represents the $Qp_Y$ value for a corresponding luma block Q, and the variable $Qp_P$ represents the $Qp_Y$ value for a corresponding luma block P.

The variable $Qp_C$ is derived as follows:

$$qPi=Clip3(0,63,((Qp_Q+Qp_P+1)>>1)+cQpPicOffset) \quad (8\text{-}1132)$$

$$Qp_C=ChromaQpTable[cIdx-1][qPi] \quad (8\text{-}1133)$$

Therefore the Chroma QP value used in Chroma deblocking is basically derived by averaging the Luma QP values and then the ChromaQPtable is used to map the averaged Luma QP to Chroma QP.

The problem of the previous deblocking scheme is that, for Joint Cb-Cr residual (JCCR) coded blocks or joint Cb-Cr components, the Chroma QP mapping is also done using the ChromaQPtable which is specifically designed for the Cb and Cr components.

The embodiments of the present invention aim to improve the conventional deblocking filtering. The disclosure presented herein involves a deblocking filter apparatus, an encoder, a decoder and corresponding methods that can perform deblocking a chroma block edge (903, 913, 923, 933, 943, 953, 963, 973) between a first chroma block (901, 911, 921, 931, 941, 951, 961, 971) of a first image block (601, 601') and a second chroma block (902, 912, 922, 932, 942, 952, 962, 972) of a second image block (602, 602') in accurate way. Further, the deblocking should be efficient and accurate.

Embodiments of the Technical Implementation of the Present Application

According to embodiment of the present invention, whenever a given Chroma block (Cb or Cr) uses joint chroma coding (JCCR) tools, a chroma quantization parameter Qpc is determined based on the averaged luma quantization parameter by using a conversion rule which is different when compared to the Cb and Cr color component.

According to an embodiment of the present invention, whenever a given Chroma block (Cb or Cr) uses joint chroma coding (JCCR) tools, the corresponding QP which is used in the Chroma deblocking should be derived using the ChromaQPTable which is designed for joint Cb-Cr coded blocks or joint Cb-Cr component (short for JCCR blocks).

The Chroma QP mapping table specifically designed for JCCR blocks whose index is represented by an integer value. The index value is not the same as Cb and Cr index value and it can values 3, 4, 5 . . . .

In an example, as illustrated in FIG. 13, every Chroma component (Cb, Cr or Joint Cb-Cr) has its own Chroma QP mapping table. In another example, as illustrated in FIGS. 12A and 12B, a single table with three different entries for Cb, Cr and Joint Cb-Cr.

In an aspect, the present invention is to derive correctly the Chroma QP which is used when at least one of chroma blocks neighboring with each other are Joint Cb-Cr residual (JCCR) coded blocks or the at least one of chroma blocks is coded using Joint Cb-Cr residual (JCCR) mode.

In another aspect, the present invention is to perform the deblocking decisions and/or deblocking filtering process which are indirectly dependent from the Chroma QP value which is derived correctly, and therefore blocking artifacts can be reduced and in turn improve the overall subjective quality.

The First Embodiment of the Present Application

According to a first aspect the invention relates to a deblocking method, for deblocking a chroma block edge between a first chroma block of a first image block and a second chroma block of a second image block, in an image encoding and/or an image decoding, wherein the deblocking method comprises:

Performing a decision process for the chroma block edge, wherein the decision process comprises:
    in the case that at least one of the first chroma block and the second chroma block is a Joint Cb-Cr residual (JCCR) coded block (or at least one of the first chroma block and the second chroma block use joint Cb-Cr residuals (JCCR) tools or the at least one of the first chroma block and the second chroma block is coded using Joint Cb-Cr residual (JCCR) mode), determining an averaged luma quantization parameter qPi based on a first luma QP (such as $Qp_{YP}$) of a first luma block of the first image block and a second luma QP (such as $Qp_{YQ}$) of a second luma block of the second image block; and determining a chroma quantization parameter $Qp_c$ based on the averaged luma quantization parameter qPi by using a chroma Qp mapping table (such as ChromaQPTable) whose index being a first index value or by using a chroma Qp mapping table comprising information entries whose index being a first index value, wherein the first index value indicates the at least one of the first chroma block and the second chroma block being a Joint Cb-Cr residual (JCCR) coded block or the first index value corresponds to the case in which the at least one of the first chroma block and the second chroma block use JCCR tools;

performing a filtering process for the chroma block edge based on a decision result of the decision process.

The decision result indicates determining whether the block edge (403, 504, 903) is to be filtered and/or whether long filtering is to be performed.

In a possible implementation form of the method according to the first aspect as such, the first index value corresponds to a chroma Qp mapping table, or the first index value corresponds to information entries of a chroma Qp mapping table.

In a possible implementation form of the method according to any preceding implementation of the first aspect or the first aspect as such, wherein the first index value is different from the value of a component (Cb, Cr) index (cIdx), or the first index value is different from the value of a component (Cb, Cr) index (cIdx) minus 1.

In a possible implementation form of the method according to any preceding implementation of the first aspect or the first aspect as such, wherein the first index value is 2, or the first index value is a component (joint Cb-Cr component) index (cIdx) value being 3.

In a possible implementation form of the method according to any preceding implementation of the first aspect or the first aspect as such, wherein the chroma quantization parameter $Qp_c$ is used for the decision process for the chroma block edge, or the chroma quantization parameter $Qp_c$ is directly or indirectly used for determining whether the chroma block edge is to be filtered and/or whether a long filtering is to be performed.

In a possible implementation form of the method according to any preceding implementation of the first aspect or the first aspect as such, the value of a first threshold variable (such as β') is determined based on the chroma quantization parameter Qpc or a first clipped Qpc using a mapping table; and the value of a first variable (such as β) is derived based on the value of the first threshold variable (such as β'); wherein the value of the first variable (such as β) is used for the decision process for the chroma block edge or the value of the first variable (such as β) is used for determining whether the chroma block edge is to be filtered and/or whether a long filtering is to be performed.

In a possible implementation form of the method according to any preceding implementation of the first aspect or the first aspect as such, the value of a second threshold variable (such as $t_C'$) is determined based on the chroma quantization parameter Qpc or a second clipped Qpc using a mapping table; the value of a second variable (such as $t_C$) is derived based on the value of the second threshold variable (such as $t_C'$); wherein the value of the second variable (such as $t_C$) is used for the decision process for the chroma block edge (or the value of the second variable (such as $t_C$) is used for determining whether the chroma block edge is to be filtered and/or whether a long filtering is to be performed) and the filtering process for the chroma block edge.

In a possible implementation form of the method according to any preceding implementation of the first aspect or the first aspect as such, the mapping table comprises the mapping between a plurality of the first threshold variables, a plurality of the second threshold variables, and a plurality of quantization parameters.

In a possible implementation form of the method according to any preceding implementation of the first aspect or the first aspect as such, the first chroma block is a first chroma component (such as Cb component) of the first image block and the second chroma block is a first chroma component (such as Cb component) of the second image block, and/or wherein the first chroma block is a second chroma component (such as Cr component) of the first image block and the second chroma block is a second chroma component (such as Cr component) of the second image block.

In a possible implementation form of the method according to any preceding implementation of the first aspect or the first aspect as such, at least one of the first chroma component (such as Cb component) of the first image block and the first chroma component (such as Cb component) of the second image block are the joint Cb-Cr components or are coded using joint Cb-Cr residual (JCCR) mode, and/or wherein at least one of the second chroma component (such as Cr component) of the first image block and the second chroma component (such as Cr component) of the second image block are the joint Cb-Cr components or are coded using joint Cb-Cr residual (JCCR) mode, or wherein at least one of the first and second chroma blocks is Joint Cb-Cr residual (JCCR) coded block.

In a possible implementation form of the method according to any preceding implementation of the first aspect or the first aspect as such, wherein the first image block and the second image block are transform blocks; or the first image block and the second image block are coding blocks.

In a possible implementation form of the method according to any preceding implementation of the first aspect or the first aspect as such, wherein it is determined whether the at least one of the first chroma block and the second chroma block use Joint coding of chrominance residuals (JCCR) tools based on a transform unit TU-level flag (such as tu_joint_cbcr_residual_flag).

In a possible implementation form of the method according to any preceding implementation of the first aspect or the first aspect as such, wherein when the TU-level flag (such as tu_joint_cbcr_residual_flag) for the first image block is true, the first chroma block uses Joint coding of chrominance residuals (JCCR) tools (or the first chroma block is coded using joint Cb-Cr residual (JCCR) mode or the first chroma block is a Joint Cb-Cr residual (JCCR) coded block or Joint Cb-Cr component); or when the TU-level flag (such as tu_joint_cbcr_residual_flag) for the second image block is true, the second chroma block uses Joint coding of chrominance residuals (JCCR) tools (or the second chroma block is coded using joint Cb-Cr residual (JCCR) mode or the second chroma block is a Joint Cb-Cr residual (JCCR) coded block or Joint Cb-Cr component).

In a possible implementation form of the method according to any preceding implementation of the first aspect or the first aspect as such, wherein the chroma Qp mapping table is specifically designed for the Joint Cb-Cr residual (JCCR) coded block, or the chroma Qp mapping table is designed for the first chroma component (such as Cb component), the second chroma component (such as Cr component) and the joint Cb-Cr component.

In a possible implementation form of the method according to any preceding implementation of the first aspect or the first aspect as such, wherein
the chroma Qp mapping table (such as ChromaQPTable) comprises the corresponding between a plurality of the chroma quantization parameters $Qp_c$ and a plurality of the luma quantization parameters qPi, and the plurality of the chroma quantization parameters $Qp_c$ are associated with the first index value; or
the chroma Qp mapping table (such as ChromaQPTable) comprises:
a first set of the chroma quantization parameters $Qp_{JCCR}$, a second set of the chroma quantization parameters $Qp_{cb}$, and a third set of the chroma quantization parameters $Qp_{cr}$, each of the first set, the second set and the third set is corresponding to a plurality of the luma quantization parameters qPi, wherein the first set of the chroma quantization parameters $Qp_{JCCR}$ are associated with the first index value; the second set of the chroma quantization parameters $Qp_{cb}$, are associated with a second index value; and the third set of the chroma quantization parameters $Qp_{cr}$ are associated with a third index value.

In a possible implementation form of the method according to any preceding implementation of the first aspect or the first aspect as such, the first index value (such as 3) indicates the at least one of the first chroma block and the second chroma block (402, 502) being Joint Cb-Cr residual (JCCR) coded block.

In a possible implementation form of the method according to any preceding implementation of the first aspect or the first aspect as such, the first index value or the joint Cb-Cr component index (cIdx) is an integer value such as 3, 4, 5, . . . .

In a possible implementation form of the method according to any preceding implementation of the first aspect or the first aspect as such, wherein
in the case that the first chroma block is a first chroma component (such as Cb component) of the first image block and the second chroma block is a first chroma component (such as Cb component) of the second image block, the colour component index (cIdx) has a second value being 1; or
in the case that the first chroma block is a second chroma component (such as Cr component) of the first image block and the second chroma block is a second chroma component (such as Cr component) of the second image block, the colour component index (cIdx) has a third value being 2; or
in the case that the first chroma block is a first chroma component (such as Cb component) of the first image block and the second chroma block is a first chroma component (such as Cb component) of the second image block, and at least one of the first chroma components is Joint Cb-Cr residual (JCCR) component, the colour component index (cIdx) has the first value being 3; or
in the case that the first chroma block is a second chroma component (such as Cr component) of the first image block and the second chroma block is a second chroma component (such as Cr component) of the second image block, and at least one of the second chroma components is Joint Cb-Cr residual (JCCR) component, the colour component index (cIdx) has the first value being 3; or
in the case that at least one of the first and second chroma blocks is Joint Cb-Cr residual (JCCR) coded block, the colour component index (cIdx) has the first value being 3.

In a possible implementation form of the method according to any preceding implementation of the first aspect or the first aspect as such, wherein the chroma Qp mapping table (such as ChromaQPTable) comprises:
a first set of the chroma quantization parameters $Qp_{JCCR}$, a second set of the chroma quantization parameters $Qp_{cb}$, and a third set of the chroma quantization parameters $Qp_{cr}$, each of the first set, the second set and the third set is corresponding to a fourth set of the luma quantization parameters qPi, wherein the first set of the chroma quantization parameters $Qp_{JCCR}$ are associated with the colour component index (cIdx) having the first value; the second set of the chroma quantization parameters $Qp_{cb}$, are associated with the colour component index (cIdx) having the second value; and the third set of the chroma quantization parameters $Qp_{cr}$ are associated with the colour component index (cIdx) having the third value.

In a possible implementation form of the method according to any preceding implementation of the first aspect or the first aspect as such, wherein the chroma Qp mapping table (such as ChromaQPTable) comprises the corresponding between a plurality of the chroma quantization parameters $Qp_c$ and a plurality of the luma quantization parameters qPi, and the plurality of the chroma quantization parameters $Qp_c$ are associated with the first value of the component (joint Cb-Cr component) index (cIdx).

In a possible implementation form of the method according to any preceding implementation of the first aspect or the first aspect as such, the first chroma block (401, 501) has a block size being M*N or N*M, and M and N represent the width and height of the first chroma block respectively, or N and M represent the width and height of the first chroma block respectively;
wherein the second chroma block (402, 502) has a block size being L*T or T*L, and L and T represent the width and height of the second chroma block respectively, or T and L represent the width and height of the second chroma block respectively,
wherein N or T is an even integer $2^n$ larger than or equal to a threshold (such as 4, 8, 16, 32 . . . ) and n is a positive integer.

In a possible implementation form of the method according to any preceding implementation of the first aspect or the first aspect as such,
if the chroma block edge (903) is a horizontal chroma block edge (903), the direction along the height N of the first chroma block being perpendicular to the chroma block edge (903), and the direction along the height T of the second chroma block being perpendicular to the chroma block edge (903), wherein either or both of the heights of the first and second chroma blocks are an even integer $2^n$ larger than 4 (or larger than or equal to 8); or
if the chroma block edge (903) is a vertical chroma block edge (403, 504), the direction along the width N of the first chroma block being perpendicular to the block edge (903), and the direction along the width T of the second chroma block being perpendicular to the block edge (903), wherein either or both of the widths of the first and second chroma blocks are an even integer $2^n$ larger than 4 (or larger than or equal to 8).

In a possible implementation form of the method according to any preceding implementation of the first aspect or the first aspect as such, wherein the second image block is a current block and the first image block is a neighboring block of the current block.

Solution 1: a check is performed, if either block P or block Q or both of the blocks P and Q use Joint Cb-Cr residual (JCCR) tool. If none of the blocks P and Q use JCCR, then the Chroma QP mapping is performed the same way as it currently done for Cb and Cr blocks (refer to the equations 8-1132 and 8-1133). But if one of the blocks use JCCR tool, then the average Luma QP value of the two blocks P and Q is derived in the same way as it is currently designed in the VVC 6.0 (refer to the equation 8-1132). Further, when mapping the Luma Qp to Chroma QP, in an example way, the Chroma QP mapping table which is designed for the Joint Cb-Cr residual (JCCR) coded block or joint Cb-Cr component is used, in alternatively way, the Chroma QP mapping table which is designed for joint Cb-Cr component and Chroma components (Cb, Cr) may be used, as shown in an equation 8-1133';

Therefore an equation 8-1132 remains the same but the equation 8-1133' which is different from the equation 8-1133 is illustrated as follows:

$$qPi = \text{Clip3}(0, 63, ((Qp_Q + Qp_P + 1) >> 1) + cQpPicOffset) \quad (8\text{-}1132)$$

$$Qp_C = \text{ChromaQpTable}[2][qPi] \quad (8\text{-}1133')$$

The specification text changes for solution 1 are provided with respect to the section 8.8.3.6.3 of the document JVET-O2001 (version-vE), as follows.

8.8.3.6.3 Decision Process for Chroma Block Edges

The variables $Qp_Q$ and $Qp_P$ are set equal to the $Qp_Y$ values of the coding units which include the coding blocks containing the sample $q_{0,0}$ and $p_{0,0}$, respectively.

The variable $Qp_C$ is derived as follows:

$$qPi = \text{Clip3}(0, 63, ((Qp_Q + Qp_P + 1) >> 1) + cQpPicOffset) \quad (8\text{-}1132)$$

If the sample $p_{0,0}$ or $q_{0,0}$ is in a transform unit with tu_joint_cbcr_residual_flag equal to 1, then $$Qp_C = \text{ChromaQpTable}[2][qPi] \quad (8\text{-}1133)$$

Otherwise $$Qp_C = \text{ChromaQpTable}[cIdx-1][qPi] \quad (8\text{-}1133)$$

It can be noted that:

cIdx=0 if the blocks containing the sample $q_{0,0}$ and $p_{0,0}$ are luma blocks or luma components, cIdx=1 if the blocks containing the sample $q_{0,0}$ and $p_{0,0}$ are first Chroma components (Cb), cIdx=2 if the blocks containing the sample $q_{0,0}$ and $p_{0,0}$ are second Chroma components (Cr), and cIdx=3 if either or both of the blocks containing the sample $q_{0,0}$ and $p_{0,0}$ are Joint Cb-Cr residual (JCCR) coded blocks or joint Cb-Cr components.

The step of determining if either block P or block Q or both of the blocks P and Q use Joint Cb-Cr residual (JCCR) tool may include:

if the sample $p_{0,0}$ is in a transform unit with tu_joint_cbcr_residual_flag equal to 1, then it is determined that block P uses Joint Cb-Cr residual (JCCR) tool; and/or if the sample $q_{0,0}$ is in a transform unit with tu_joint_cbcr_residual_flag equal to 1, then it is determined that block Q uses Joint Cb-Cr residual (JCCR) tool.

The beneficial effects and advantages of solution 1 according to an embodiment of the present invention include that the ChromaQPTable mapping table indexing is modified based on the check that the current block uses JCCR or not without significant changes to the conversion mapping.

The Second Embodiment of the Present Application

According to a second aspect the invention relates to a deblocking method, for deblocking a chroma block edge 903, 913, 923 between a first chroma block 901, 911, 921 of a first image block 601, 601' and a second chroma block 902, 912, 922 of a second image block 602, 602', in an image encoding and/or an image decoding, wherein the deblocking method comprises:

performing a decision process for the chroma block edge, wherein the decision process comprises:

determining a chroma quantization parameter $Qp_{Cp}$ for the first chroma block 901, 911, 921 based on a first luma QP (such as $Qp_{YP}$) of a first luma block 801, 802 of the first image block 901, 911, 921 by using a chroma Qp mapping table (such as ChromaQpTable[0], ChromaQpTable[1], ChromaQpTable[2] of table 1200, 1200', 1301, 1302, 1303) or information entries of the chroma Qp mapping table which is indicated by an index (such as component index, cIdx or row index), and the index having a first index value (such as 3) when the first chroma block being Joint Cb-Cr residual (JCCR) coded block, or the index (cIdx) having a second index value (such as 1 or 2) when the first chroma block being the chroma component of the first image block;

determining a chroma quantization parameter $Qp_{Cq}$ for the second chroma block 902, 912, 922 based on a second luma QP (such as $Qp_{YQ}$) of a second luma block (401, 501) of the second image block by using a chroma Qp mapping table (such as ChromaQPTable) or information entries of the chroma Qp mapping table which is indicated by an index (such as component index, cIdx), and the index (cIdx) having a first value (such as 3) when the second chroma block being Joint Cb-Cr residual (JCCR) coded block, or the index (cIdx) having a second value (such as 1 or 2) when the second chroma block being the chroma component of the second image block; and determining an averaged and rounded chroma quantization parameter $Qp_C$ based on the chroma quantization parameter $Qp_{Cp}$ for the first chroma block and the chroma quantization parameter $Qp_{Cq}$ for the second chroma block;

performing a filtering process for the chroma block edge based on a decision result of the decision process.

It can be understood that the decision result indicates the block edge is to be filtered or not, and/or a long filtering is to be performed or not.

In a possible implementation form of the method according to the second aspect as such, different index value correspond to different information entries of a Chroma QP mapping table, or different index value correspond to different Chroma QP mapping tables.

In a possible implementation form of the method according to any preceding implementation of the second aspect or the second aspect as such, the step of determining an averaged and rounded chroma quantization parameter $Qp_C$ based on the chroma quantization parameter $Qp_{Cp}$ for the first chroma block and the chroma quantization parameter $Qp_{Cq}$ for the second chroma block, comprises:

determining an averaged first chroma component (such as Cb component) quantization parameter QpCb based on
- the first chroma component (such as Cb component) quantization parameter QpCbp for the first chroma component (such as Cb component) of the first image block and
- the first chroma component (such as Cb component) quantization parameter QpCbq for the first chroma component (such as Cb component) of the second image block.

In a possible implementation form of the method according to any preceding implementation of the second aspect or the second aspect as such, the step of determining an averaged and rounded chroma quantization parameter $Qp_C$ based on the chroma quantization parameter $Qp_{Cp}$ for the first chroma block and the chroma quantization parameter $Qp_{Cq}$ for the second chroma block, comprises:

determining an averaged second chroma component (such as Cr component) quantization parameter QpCr based on
- the second chroma component (such as Cr component) quantization parameter QpCrp for the second chroma component (such as Cr component) of the first image block and
- the second chroma component (such as Cr component) quantization parameter QpCrq for the second chroma component (such as Cr component) of the second image block.

In a possible implementation form of the method according to any preceding implementation of the second aspect or the second aspect as such, the averaged and rounded chroma quantization parameter $Qp_c$ is used for the decision process for the chroma block edge, or the averaged and rounded chroma quantization parameter $Qp_c$ is directly or indirectly used for determining whether the chroma block edge is to be filtered and/or whether a long filtering is to be performed.

In a possible implementation form of the method according to any preceding implementation of the second aspect or the second aspect as such, wherein
the value of a first threshold variable (such as β') is determined based on the averaged and rounded chroma quantization parameter Qpc or a first clipped Qpc using a mapping table; and
the value of a first variable (such as β) is derived based on the value of the first threshold variable (such as β');
wherein the value of the first variable (such as β) is used for the decision process for the chroma block edge or is used for determining whether the block edge is to be filtered and/or whether a long filtering is to be performed.

In a possible implementation form of the method according to any preceding implementation of the second aspect or the second aspect as such,
the value of a second threshold variable (such as $t_C$') is determined based on the averaged and rounded chroma quantization parameter Qpc or a second clipped Qpc using a mapping table;
the value of a second variable (such as $t_C$) is derived based on the value of the second threshold variable (such as $t_C$');
wherein the value of the second variable (such as $t_C$) is used for the decision process for the chroma block edge (or determining whether the block edge is to be filtered and/or whether a long filtering is to be performed) and the filtering process for the chroma block edge.

In a possible implementation form of the method according to any preceding implementation of the second aspect or the second aspect as such, the mapping table comprises the mapping between a plurality of the first threshold variables, a plurality of the second threshold variables, and a plurality of quantization parameters.

In a possible implementation form of the method according to any preceding implementation of the second aspect or the second aspect as such, the first chroma block is a first chroma component (such as Cb component) of the first image block and the second chroma block is a first chroma component (such as Cb component) of the second image block, or
wherein the first chroma block is a second chroma component (such as Cr component) of the first image block and the second chroma block is a second chroma component (such as Cr component) of the second image block.

In a possible implementation form of the method according to any preceding implementation of the second aspect or the second aspect as such, the first image block and the second image block are transform units or transform blocks.

In a possible implementation form of the method according to any preceding implementation of the second aspect or the second aspect as such, it is determined whether the at least one of the first chroma block and the second chroma block (402, 502) is coded using Joint Cb-Cr residual (JCCR) mode or the at least one of the first chroma block and the second chroma block (402, 502) being a Joint Cb-Cr residual (JCCR) coded block based on a transform unit TU-level flag (such as tujoint_cbcr_residual_flag).

In a possible implementation form of the method according to any preceding implementation of the second aspect or the second aspect as such, when the TU-level flag (such as tu_joint_cbcr_residual_flag) for the first image block is true, the first chroma block uses Joint coding of chrominance residuals (JCCR) tools or the first chroma block is coded using joint Cb-Cr residual (JCCR) mode; or
when the TU-level flag (such as tu_joint_cbcr_residual_flag) for the second image block is true, the second chroma block uses Joint coding of chrominance residuals (JCCR) tools or the second chroma block is coded using joint Cb-Cr residual (JCCR) mode.

In a possible implementation form of the method according to any preceding implementation of the second aspect or the second aspect as such, wherein the chroma Qp mapping table (such as ChromaQPTable) comprises the corresponding between a plurality of the chroma quantization parameters $Qp_c$ and a plurality of the luma quantization parameters $Qp_{luma}$, and the plurality of the chroma quantization parameters $Qp_c$ are associated with the first index value or the second index value.

In a possible implementation form of the method according to any preceding implementation of the second aspect or the second aspect as such, the first chroma block has a block size being M*N or N*M, and M and N represent the width and height of the first chroma block respectively, or N and M represent the width and height of the first chroma block respectively;
wherein the second chroma block has a block size being L*T or T*L, and L and T represent the width and height of the second chroma block respectively, or T and L represent the width and height of the second chroma block respectively,
wherein N or T is an even integer $2^n$ larger than or equal to a threshold (such as 4, 8, 16, 32 . . . ) and n is a positive integer.

In a possible implementation form of the method according to any preceding implementation of the second aspect or the second aspect as such, if the chroma block edge is a horizontal chroma block edge, the direction along the height N of the first chroma block being perpendicular to the chroma block edge, and the direction along the height T of the second chroma block being perpendicular to the chroma block edge, wherein either or both of the heights of the first and second chroma blocks are an even integer $2^n$ larger than 4 (or larger than or equal to 8) or if the chroma block edge is a vertical chroma block edge, the direction along the width N of the first chroma block being perpendicular to the block edge, and the direction along the width T of the second chroma block being perpendicular to the block edge, wherein either or both of the widths of the first and second chroma blocks are an even integer $2^n$ larger than 4 (or larger than or equal to 8).

In a possible implementation form of the method according to any preceding implementation of the second aspect or the second aspect as such, wherein the second image block is a current block and the first image block is a neighboring block of the current block.

Solution 2:

Based on the JCCR flag, the Luma QP is mapped to the Chroma QP for each of the blocks P and Q separately by using respective Chroma QP mapping tables and then the average of the Chroma QP values is set as the final QP value which is used for deblocking.

If block Q uses Joint Cb-Cr residual (JCCR) tool, then $Qpc_Q$=ChromaQpTable[2][$Qp_Q$+cQpPicOffset], otherwise $Qpc_Q$=ChromaQpTable[cIdx−1][$Qp_Q$+cQpPicOffset]

If block P uses JCCR, then $Qpc_p$=ChromaQpTable[2][$Qp_p$+cQpPicOffset], otherwise $Qpc_p$=ChromaQpTable[cIdx−1][$Qp_p$+cQpPicOffset]

$$Qp_C=\text{Clip3}(0,63,((Qpc_Q+Qpc_P+1)>>1)) \quad (8\text{-}1132')$$

It can be understood that ChromaQpTable[2] represents the chroma QP mapping table for a Joint Cb-Cr residual (JCCR) coded block.

The step of determining if either block P or block Q or both of the blocks P and Q use JCCR tool may include:

if the sample $p_{0,0}$ is in a transform unit with tu_joint_cbcr_residual_flag equal to 1, then it is determined that block P uses JCCR tool; and/or if the sample $q_{0,0}$ is in a transform unit with tu_joint_cbcr_residual_flag equal to 1, then it is determined that block Q uses JCCR tool.

The specification text changes for solution 2 are provided with respect to the section 8.8.3.6.3 of the document JVET-O2001 (version-vE).

8.8.3.6.3 Decision Process for Chroma Block Edges

The variables $Qp_Q$ and $Qp_P$ are set equal to the $Qp_Y$ values of the coding units which include the coding blocks containing the sample $q_{0,0}$ and $p_{0,0}$, respectively.

The variable $Qp_C$ is derived as follows:

If the sample $p_{0,0}$ or $q_{0,0}$ is in a transform unit with tu_joint_cbcr_residual_flag equal to 1, then If the sample $p_{0,0}$ is in a transform unit with tu_joint_cbcr_residual_flag equal to 1, then
$Qp_{Cp}$=ChromaQpTable[2][$Qp_P$+cQpPicOffset]
Otherwise
$Qp_{Cp}$=ChromaQpTable[cIdx−1][$Qp_P$+cQpPicOffset]

If the sample $q_{0,0}$ is in a transform unit with tu_joint_cbcr_residual_flag equal to 1, then
$Qp_{Cq}$=ChromaQpTable[2][$Qp_q$+cQpPicOffset]

Otherwise
$Qp_{Cq}$=ChromaQpTable[cIdx−1][$Qp_q$+cQpPicOffset]

$$Qp_C=\text{Clip3}(0,63,((Qp_{Cp}+Qp_{Cq}+1)>>1)) \quad (8\text{-}1132)$$

Otherwise $$qPi=\text{Clip3}(0,63,((Qp_Q+Qp_P+1)>>1)+cQpPicOffset) \quad (8\text{-}1132)$$

$$Qp_C=\text{ChromaQpTable}[cIdx−1][qPi] \quad (8\text{-}1133)$$

It can be understood that the variable $Qp_Q$ represents the $Qp_Y$ value for a corresponding luma block Q, and the variable $Qp_P$ represents the $Qp_Y$ value for a corresponding luma block P.

The beneficial effects and advantages of solution 2 according to an embodiment of the present invention is that the final derived QP for the JCCR blocks is more accurate when compared to solution 1 and therefore can results in better deblocking decisions there by resulting in better subjective quality.

The Third Embodiment of the Present Application

According to a third aspect the invention relates to a deblocking method, for deblocking a chroma block edge between a first chroma block of a first image block and a second chroma block of a second image block, in an image encoding and/or an image decoding, wherein the deblocking method comprises:

performing a decision process for the chroma block edge, wherein the decision process comprises:

determining a chroma quantization parameter $Qp_{Cp}$ for the first chroma block based on a first luma QP (such as $Qp_{YP}$) of a first luma block (801, 802) of the first image block by using a chroma Qp mapping table (such as ChromaQPTable) or information entries of the chroma Qp mapping table which is indicated by an index (such as component index, cIdx or row index), and the index (cIdx) having a first index value (such as 3) when the first chroma block being Joint Cb-Cr residual (JCCR) coded block, or the index (cIdx) having a second index value (such as 1 or 2) when the first chroma block being the chroma component of the first image block;

determining a chroma quantization parameter $Qp_{Cq}$ for the second chroma block based on a second luma QP (such as $Qp_{YQ}$) of a second luma block (802, 801) of the second image block by using a chroma Qp mapping table (such as ChromaQPTable) or information entries of the chroma Qp mapping table which is indicated by an index (such as component index, cIdx), and the index (cIdx) having a first value (such as 3) when the second chroma block being Joint Cb-Cr residual (JCCR) coded block, or the index (cIdx) having a second value (such as 1 or 2) when the second chroma block being the chroma component of the second image block; and determining an averaged and rounded chroma quantization parameter $Qp_C$ based on the chroma quantization parameter $Qp_{Cp}$ for the first chroma block and the chroma quantization parameter $Qp_{Cq}$ for the second chroma block;

performing a filtering process for the chroma block edge based on a decision result of the decision process.

It can be understood that the decision result indicates the block edge is to be filtered or not, and/or a long filtering is to be performed or not.

In a possible implementation form of the method according to the third aspect as such, different index value correspond to different information entries of a Chroma QP mapping table, or different index value correspond to different Chroma QP mapping tables.

In a possible implementation form of the method according to any preceding implementation of the third aspect or the third aspect as such, when in the case that the first chroma block is coded using JCCR mode and the JCCR mode is a first JCCR mode (such as 1), determining a first chroma component (such as Cb component) quantization parameter QpCbp for the first chroma component (such as Cb component) of the first image block based on a first luma QP (such as $Qp_{YP}$) of a first luma block of the first image block by using a chroma Qp mapping table whose index (such as component index, cIdx) being the first index value or by using a chroma Qp mapping table comprising information entries whose index (such as component index, cIdx) being the first index value; and determining a second chroma component (such as Cr component) quantization parameter QpCrp for the second chroma component (such as Cr component) of the first image block based on the first chroma component (such as Cb component) quantization parameter $Qp_{Cbp}$.

In a possible implementation form of the method according to any preceding implementation of the third aspect or the third aspect as such, when in the case that the second chroma block is coded using JCCR mode and the JCCR mode is a first JCCR mode (such as 1), determining a first chroma component (such as Cb component) quantization parameter QpCbq for the first chroma component (such as Cb component) of the second image block based on a second luma QP (such as $Qp_{YQ}$) of a second luma block of the second image block by using a chroma Qp mapping table whose index (such as component index, cIdx) being the first index value or by using a chroma Qp mapping table comprising information entries whose index (such as component index, cIdx) being the first index value; and determining a second chroma component (such as Cr component) quantization parameter QpCrq for the second chroma component (such as Cr component) of the second image block based on the first chroma component (such as Cb component) quantization parameter QpCbq.

In a possible implementation form of the method according to any preceding implementation of the third aspect or the third aspect as such, wherein when in the case that the first chroma block is coded using JCCR mode and the JCCR mode is a second JCCR mode (such as 2), determining a first chroma component (such as Cb component) quantization parameter QpCbp for the first chroma component (such as Cb component) of the first image block based on a first luma QP (such as $Qp_{YP}$) of a first luma block of the first image block by using a chroma Qp mapping table whose index (such as component index, cIdx) being the first index value or by using a chroma Qp mapping table comprising information entries whose index (such as component index, cIdx) being the first index value; and setting a second chroma component (such as Cr component) quantization parameter QpCrp for the second chroma component (such as Cr component) of the first image block as the first chroma component (such as Cb component) quantization parameter QpCbp.

In a possible implementation form of the method according to any preceding implementation of the third aspect or the third aspect as such, wherein when in the case that the second chroma block is coded using JCCR mode and the JCCR mode is a second JCCR mode (such as 2), determining a first chroma component (such as Cb component) quantization parameter QpCbq for the first chroma component (such as Cb component) of the second image block based on a second luma QP (such as $Qp_{YQ}$) of a second luma block of the second image block by using a chroma Qp mapping table whose index (such as component index, cIdx) being the first index value or by using a chroma Qp mapping table comprising information entries whose index (such as component index, cIdx) being the first index value; and setting a second chroma component (such as Cr component) quantization parameter QpCrq for the second chroma component (such as Cr component) of the second image block as the first chroma component (such as Cb component) quantization parameter QpCbq.

In a possible implementation form of the method according to any preceding implementation of the third aspect or the third aspect as such, when in the case that the first chroma block is coded using JCCR mode and the JCCR mode is a third JCCR mode (such as 3), determining a second chroma component (such as Cr component) quantization parameter QpCrp for the second chroma component (such as Cr component) of the first image block based on a first luma QP (such as $Qp_{YP}$) of a first luma block of the first image block by using a chroma Qp mapping table whose index (such as component index, cIdx) being the first index value or by using a chroma Qp mapping table comprising information entries whose index (such as component index, cIdx) being the first index value; and determining a first chroma component (such as Cb component) quantization parameter QpCbp for the first chroma component (such as Cb component) of the first image block based on the second chroma component (such as Cr component) quantization parameter QpCrp.

In a possible implementation form of the method according to any preceding implementation of the third aspect or the third aspect as such, wherein when in the case that the second chroma block is coded using JCCR mode and the JCCR mode is a third JCCR mode (such as 3), determining a second chroma component (such as Cr component) quantization parameter QpCrq for the second chroma component (such as Cr component) of the second image block based on a second luma QP (such as $Qp_{YQ}$) of a second luma block of the second image block by using a chroma Qp mapping table whose index (such as component index, cIdx) being the first index value or by using a chroma Qp mapping table comprising information entries whose index (such as component index, cIdx) being the first index value; and determining a first chroma component (such as Cb component) quantization parameter QpCbq for the first chroma component (such as Cb component) of the second image block based on the second chroma component (such as Cr component) quantization parameter QpCrq.

In a possible implementation form of the method according to any preceding implementation of the third aspect or the third aspect as such, wherein the step of determining an averaged and rounded chroma quantization parameter $Qp_C$ based on the chroma quantization parameter $Qp_{C_p}$ for the first chroma block and the chroma quantization parameter $Qp_{C_q}$ for the second chroma block, comprises:

determining an averaged first chroma component (such as Cb component) quantization parameter QpCb based on the first chroma component (such as Cb component) quantization parameter QpCbp for the first chroma component (such as Cb component) of the first image block and the first chroma component (such as Cb component) quantization parameter QpCbq for the first chroma component (such as Cb component) of the second image block.

In a possible implementation form of the method according to any preceding implementation of the third aspect or the third aspect as such, wherein the step of determining an averaged and rounded chroma quantization parameter $Qp_C$ based on the chroma quantization parameter $Qp_{Cp}$ for the first chroma block and the chroma quantization parameter $Qp_{Cq}$ for the second chroma block, comprises:

determining an averaged second chroma component (such as Cr component) quantization parameter QpCr based on the second chroma component (such as Cr component) quantization parameter QpCrp for the second chroma component (such as Cr component) of the first image block and the second chroma component (such as Cr component) quantization parameter QpCrq for the second chroma component (such as Cr component) of the second image block.

In a possible implementation form of the method according to any preceding implementation of the third aspect or the third aspect as such, the averaged and rounded chroma quantization parameter $Qp_c$ is used for the decision process for the chroma block edge, or the averaged and rounded chroma quantization parameter $Qp_c$ is directly or indirectly used for determining whether the chroma block edge is to be filtered and/or whether a long filtering is to be performed.

In a possible implementation form of the method according to any preceding implementation of the third aspect or the third aspect as such, the value of a first threshold variable (such as β') is determined based on the averaged and rounded chroma quantization parameter Qpc or a first clipped Qpc using a mapping table; and the value of a first variable (such as β) is derived based on the value of the first threshold variable (such as β');

wherein the value of the first variable (such as β) is used for the decision process for the chroma block edge or is used for determining whether the block edge is to be filtered and/or whether a long filtering is to be performed.

In a possible implementation form of the method according to any preceding implementation of the third aspect or the third aspect as such, the value of a second threshold variable (such as $t_C'$) is determined based on the averaged and rounded chroma quantization parameter Qpc or a second clipped Qpc using a mapping table;

the value of a second variable (such as $t_C$) is derived based on the value of the second threshold variable (such as $t_C'$);

wherein the value of the second variable (such as $t_C$) is used for the decision process for the chroma block edge (or determining whether the block edge is to be filtered and/or whether a long filtering is to be performed) and the filtering process for the chroma block edge.

In a possible implementation form of the method according to any preceding implementation of the third aspect or the third aspect as such, wherein the mapping table comprises the mapping between a plurality of the first threshold variables, a plurality of the second threshold variables, and a plurality of quantization parameters.

In a possible implementation form of the method according to any preceding implementation of the third aspect or the third aspect as such, wherein the first chroma block is a first chroma component (such as Cb component) of the first image block and the second chroma block is a first chroma component (such as Cb component) of the second image block, or wherein the first chroma block is a second chroma component (such as Cr component) of the first image block and the second chroma block is a second chroma component (such as Cr component) of the second image block.

In a possible implementation form of the method according to any preceding implementation of the third aspect or the third aspect as such, the first image block and the second image block are transform units or transform blocks.

In a possible implementation form of the method according to any preceding implementation of the third aspect or the third aspect as such, wherein it is determined whether the at least one of the first chroma block and the second chroma block (402, 502) is coded using Joint Cb-Cr residual (JCCR) mode or the at least one of the first chroma block and the second chroma block (402, 502) being a Joint Cb-Cr residual (JCCR) coded block based on a transform unit TU-level flag (such as tujoint_cbcr_residual_flag).

In a possible implementation form of the method according to any preceding implementation of the third aspect or the third aspect as such, wherein when the TU-level flag (such as tu_joint_cbcr_residual_flag) for the first image block is true, the first chroma block uses Joint coding of chrominance residuals (JCCR) tools or the first chroma block is coded using joint Cb-Cr residual (JCCR) mode; or when the TU-level flag (such as tu_joint_cbcr_residual_flag) for the second image block is true, the second chroma block uses Joint coding of chrominance residuals (JCCR) tools or the second chroma block is coded using joint Cb-Cr residual (JCCR) mode.

In a possible implementation form of the method according to any preceding implementation of the third aspect or the third aspect as such, wherein the chroma Qp mapping table (such as ChromaQPTable) comprises the corresponding between a plurality of the chroma quantization parameters $Qp_c$ and a plurality of the luma quantization parameters $Qp_{luma}$, and the plurality of the chroma quantization parameters $Qp_c$ are associated with the first index value or the second index value.

In a possible implementation form of the method according to any preceding implementation of the third aspect or the third aspect as such, wherein the first chroma block has a block size being M*N or N*M, and M and N represent the width and height of the first chroma block respectively, or N and M represent the width and height of the first chroma block respectively;

wherein the second chroma block has a block size being L*T or T*L, and L and T represent the width and height of the second chroma block respectively, or T and L represent the width and height of the second chroma block respectively, wherein N or T is an even integer $2^n$ larger than or equal to a threshold (such as 4, 8, 16, 32 . . . ) and n is a positive integer.

In a possible implementation form of the method according to any preceding implementation of the third aspect or the third aspect as such, if the chroma block edge is a horizontal chroma block edge, the direction along the height N of the first chroma block being perpendicular to the chroma block edge, and the direction along the height T of the second chroma block being perpendicular to the chroma block edge, wherein either or both of the heights of the first and second chroma blocks are an even integer $2^n$ larger than 4 (or larger than or equal to 8) or if the chroma block edge is a vertical chroma block edge, the direction along the width N of the first chroma block being perpendicular to the block edge, and the direction along the width T of the second chroma block being perpendicular to the block edge, wherein either or both of the widths of the first and second chroma blocks are an even integer $2^n$ larger than 4 (or larger than or equal to 8).

In a possible implementation form of the method according to any preceding implementation of the third aspect or the third aspect as such, the second image block is a current block and the first image block is a neighboring block of the current block.

Solution 3:

Input Chroma QP value are dependent on the JCCR mode. Based on the mode of JCCR, the input Chroma QP values are determined.

If JCCR mode==1, then QpCb=ChromaQpTable[2][Qpx] And QpCr=(QpCb+1)>>1

If JCCR mode==2, then QpCb=ChromaQpTable[2][Qpx] And QpCr=QpCb

If JCCR mode==3, then QpCr=ChromaQpTable[2][Qpx] And QpCb=(QpCr+1)>>1

\* x in Qpx can be the QP value of either P or Q block.

$$Qp_{Cr}=\text{Clip3}(0,63,((Qpcr_Q+Qpcr_P+1)>>1)) \quad (8\text{-}1132a)$$

$$Qp_{Cb}=\text{Clip3}(0,63,((Qpcb_Q+Qpcb_P+1)>>1)) \quad (8\text{-}1132b)$$

Based on the TuCResMode, the derivation of the input Chroma QP values for each of the blocks P and Q is determined.

If TuCResMode==1, then the variable QPcb is derived as QPcb=ChromaQpTable[2][QPx] and the value QPCr is derived as QPCr=(QpCb+1)>>1 else if TuCResMode==2, then the variable QPcb is derived as QPcb=ChromaQpTable[2][QPx] and the value QPCr is derived as QPCr=QpCb else if TuCResMode==3, then the variable QPcr is derived as QPcr=ChromaQpTable[2][QPx] and the value QPCr is derived as QPCb=(QpCr+1)>>1 please note that x in QPx can be replaced by P or Q for the respective blocks.

The values QPcr and QPcb can then further be derived as follows:

$$Qp_{Cr}=\text{Clip3}(0,63,((Qpcr_Q+Qpcr_P+1)>>1)) \quad (8\text{-}1132a)$$

$$Qp_{Cb}=\text{Clip3}(0,63,((Qpcb_Q+Qpcb_P+1)>>1)) \quad (8\text{-}1132b)$$

The beneficial effects and advantages of solution 3 according to an embodiment of the present invention, is that the QP value used by a Chroma block (Cb or Cr) is also adjusted based on the JCCR mode (TuCResMode) and therefore more accurate QP can be derived for each of the Cb and Cr component when JCCR is used to jointly signal the Cb-Cr components.

The Fourth Embodiment of the Present Application

According to a fourth aspect the invention relates to a deblocking method, for deblocking a chroma block edge (903, 913, 923) between a first chroma block (901, 911, 921, 931, 941, 951, 961, 971) of a first image block (601, 601') and a second chroma block (902, 912, 922, 932, 942, 952, 962, 972) of a second image block (602, 602'), in an image encoding and/or an image decoding, wherein the deblocking method comprises:

performing a decision process for the chroma block edge, wherein the decision process comprises:

determining a chroma quantization parameter $Qp_{Cp}$ for the first chroma block (901, 911, 921, 931, 941, 951, 961, 971) based on a first luma QP (such as $Qp_{YP}$) for a first luma block (801) of the first image block (601, 601') and a conversion rule, wherein the conversion rule is a first conversion rule when the first chroma block (901, 911, 921, 931, 941, 951, 961, 971) is a Joint Cb-Cr residual (JCCR) coded block, or the conversion rule is a second conversion rule when the first chroma block (901, 911, 921, 931, 941, 951, 961, 971) is the chroma component of the first image block (601, 601');

determining a chroma quantization parameter $Qp_{Cq}$ for the second chroma block (902, 912, 922, 932, 942, 952, 962, 972) based on a second luma QP (such as $Qp_{YQ}$) of a second luma block (802) of the second image block (602, 602') and a conversion rule, wherein the conversion rule is a first conversion rule when the second chroma block is a Joint Cb-Cr residual (JCCR) coded block, or the conversion rule is a second conversion rule when the second chroma block is the chroma component of the second image block (602, 602'); and determining an averaged and rounded chroma quantization parameter $Qp_C$ based on the chroma quantization parameter $Qp_{Cp}$ for the first chroma block (901, 911, 921, 931, 941, 951, 961, 971) and the chroma quantization parameter $Qp_{Cq}$ for the second chroma block (902, 912, 922, 932, 942, 952, 962, 972);

performing a filtering process for the chroma block edge (903, 913, 923) based on a decision result of the decision process.

In a possible implementation form of the method according to the fourth aspect as such, the first conversion rule is designed for a Joint Cb-Cr residual (JCCR) coded block.

In a possible implementation form of the method according to any preceding implementation of the fourth aspect or the fourth aspect as such, the second conversion rule comprises a second conversion rule R21 and/or a second conversion rule R22, wherein the second conversion rule R21 and the second conversion rule R22 are designed for a first chroma component (such as a Cb component) and a second chroma components (such as a Cr component) respectively.

In a possible implementation form, the first conversion rule is different from a second conversion rule R21 and a second conversion rule R22.

In a possible implementation form of the method according to any preceding implementation of the fourth aspect or the fourth aspect as such, the conversion rule is a second conversion rule R21 when the first chroma block is a first chroma component (911) of the first image block (601, 601'), and/or the conversion rule is a second conversion rule R22 when the first chroma block is a second chroma component (921) of the first image block (601, 601'); or the conversion rule is a second conversion rule R21 when the second chroma block is a first chroma component (912) of the second image block (602, 602'), and/or the conversion rule is a second conversion rule R22 when the second chroma block is a second chroma component (922) of the second image block (602, 602').

In a possible implementation form of the method according to any preceding implementation of the fourth aspect or the fourth aspect as such, the first conversion rule, the second conversion rule R21 and the second conversion rule R22 corresponds to (or are represented by) the respective information entries of a chroma Qp mapping table (such as ChromaQPTable), or the first conversion rule, the second conversion rule R21 and the second conversion rule R22 correspond to (or are represented by) a first chroma Qp mapping table (such as ChromaQPTable), a second chroma Qp mapping table and a third chroma Qp mapping table respectively.

In a possible implementation form of the method according to any preceding implementation of the fourth aspect or the fourth aspect as such, the first conversion rule, the second conversion rule R21 and the second conversion rule R22 correspond to a first formula, a second formula and a third formula respectively;
or, the first conversion rule, the second conversion rule R21 and the second conversion rule R22 are a first formula, a second formula and a third formula respectively.

In a possible implementation form of the method according to any preceding implementation of the fourth aspect or the fourth aspect as such, the first conversion rule is represented in terms of a chroma Qp mapping table (such as ChromaQPTable) and a first formula;

the second conversion rule R21 is represented in terms of a chroma Qp mapping table (such as ChromaQPTable) and a second formula;

the second conversion rule R22 is represented in terms of a chroma Qp mapping table (such as ChromaQPTable) and a third formula.

In a possible implementation form of the method according to any preceding implementation of the fourth aspect or the fourth aspect as such, the first conversion rule is represented in terms of a chroma Qp mapping table (such as ChromaQPTable) and a first set of formulas;

the second conversion rule R21 is represented in terms of a chroma Qp mapping table (such as ChromaQPTable) and a second set of formulas;

the second conversion rule R22 is represented in terms of a chroma Qp mapping table (such as ChromaQPTable) and a third set of formulas.

In a possible implementation form of the method according to any preceding implementation of the fourth aspect or the fourth aspect as such, the first conversion rule, the second conversion rule R21 and the second conversion rule R22 are indicated by a first index value, a second index value and a third index value respectively, or the first conversion rule, the second conversion rule R21 and the second conversion rule R22 correspond to a first index value, a second index value and a third index value respectively. In a possible implementation form, the first index value, the second index value and the third index value are different with each other.

In a possible implementation form of the method according to any preceding implementation of the fourth aspect or the fourth aspect as such, the first index value, the second index value and the third index value are different integer values.

In a possible implementation form of the method according to any preceding implementation of the fourth aspect or the fourth aspect as such, the first index value, the second index value and the third index value are component indexes (such as cIdx) having different value specifying Joint Cb-Cr coded block, Cb component and Cr component respectively.

In a possible implementation form of the method according to any preceding implementation of the fourth aspect or the fourth aspect as such, the first index value is 3 or 4 or 5, the second index value is 1 and the third index value is 2.

In a possible implementation form of the method according to any preceding implementation of the fourth aspect or the fourth aspect as such, the averaged and rounded chroma quantization parameter $Qp_c$ is used for the decision process for the chroma block edge or the averaged and rounded chroma quantization parameter $Qp_c$ is directly or indirectly used for determining whether the chroma block edge (903, 913, 923) is to be filtered and/or whether a long filtering is to be performed.

In a possible implementation form of the method according to any preceding implementation of the fourth aspect or the fourth aspect as such, the value of a first threshold variable (such as $\beta'$) is determined based on the averaged and rounded chroma quantization parameter $Qp_c$ or a first clipped $Qp_c$ using a look-up table; and the value of a first variable (such as $\beta$) is derived based on the value of the first threshold variable (such as $\beta'$);

wherein the value of the first variable (such as $\beta$) is used for the decision process for the chroma block edge or the value of the first variable (such as $\beta$) is used for determining whether the chroma block edge (903, 913, 923) is to be filtered and/or whether a long filtering is to be performed.

In a possible implementation form of the method according to any preceding implementation of the fourth aspect or the fourth aspect as such, the value of a second threshold variable (such as $t_C'$) is determined based on the averaged and rounded chroma quantization parameter $Qp_c$ or a second clipped $Qp_c$ using a look-up table;

the value of a second variable (such as $t_C$) is derived based on the value of the second threshold variable (such as $t_C'$);

wherein the value of the second variable (such as $t_C$) is used for the decision process for the chroma block edge (or the value of the second variable (such as $t_C$) is used for determining whether the chroma block edge (903, 913, 923) is to be filtered and/or whether a long filtering is to be performed) and the filtering process for the chroma block edge.

In a possible implementation form of the method according to any preceding implementation of the fourth aspect or the fourth aspect as such, the look-up table comprises the mapping between a plurality of the first threshold variables, a plurality of the second threshold variables, and a plurality of quantization parameters.

In a possible implementation form of the method according to any preceding implementation of the fourth aspect or the fourth aspect as such, the first chroma block is a first chroma component (such as Cb component) of the first image block and the second chroma block is a first chroma component (such as Cb component) of the second image block, and/or wherein the first chroma block is a second chroma component (such as Cr component) of the first image block and the second chroma block is a second chroma component (such as Cr component) of the second image block.

In a possible implementation form of the method according to any preceding implementation of the fourth aspect or the fourth aspect as such, at least one of the first chroma component (such as Cb component) of the first image block and the first chroma component (such as Cb component) of the second image block are coded using joint Cb-Cr residual (JCCR) mode, or wherein at least one of the second chroma component (such as Cr component) of the first image block and the second chroma component (such as Cr component) of the second image block are coded using joint Cb-Cr residual (JCCR) mode.

In a possible implementation form of the method according to any preceding implementation of the fourth aspect or the fourth aspect as such, the first image block and the second image block are transform blocks; or the first image block and the second image block are coding blocks.

In a possible implementation form of the method according to any preceding implementation of the fourth aspect or the fourth aspect as such, it is determined whether the at least one of the first chroma block (901, 911, 921, 931, 941, 951, 961, 971) and the second chroma block (902, 912, 922, 932, 942, 952, 962, 972) is coded using Joint Cb-Cr residual (JCCR) mode or the at least one of the first chroma block (901, 911, 921, 931, 941, 951, 961, 971) and the second chroma block (902, 912, 922, 932, 942, 952, 962, 972) is a Joint Cb-Cr residual (JCCR) coded block based on a transform unit TU-level flag (such as tu_joint_cbcr_residual_flag).

In a possible implementation form of the method according to any preceding implementation of the fourth aspect or the fourth aspect as such, when the TU-level flag (such as tu_joint_cbcr_residual_flag) for the first image block is true, the first chroma block is Joint Cb-Cr residual (JCCR) coded block or the first chroma block is coded using joint Cb-Cr residual (JCCR) mode; or when the TU-level flag (such as tu_joint_cbcr_residual_flag) for the second image block is true, the second chroma block is Joint Cb-Cr residual (JCCR) coded block or the second chroma block is coded using joint Cb-Cr residual (JCCR) mode.

In a possible implementation form of the method according to any preceding implementation of the fourth aspect or the fourth aspect as such, wherein the first chroma block (901, 911, 921, 931, 941, 951, 961, 971) has a block size being M*N or N*M, and M and N represent the width and height of the first chroma block respectively, or N and M represent the width and height of the first chroma block respectively;

wherein the second chroma block (902, 912, 922, 932, 942, 952, 962, 972) has a block size being L*T or T*L, and L and T represent the width and height of the second chroma block respectively, or T and L represent the width and height of the second chroma block respectively, wherein N or T is an even integer 2n (such as 4 or 8 or 16 or 32) and n is a positive integer. In a possible implementation form, if the chroma block edge (903, 913, 923) is a horizontal chroma block edge, the direction along the height N of the first chroma block being perpendicular to the chroma block edge, and the direction along the height T of the second chroma block being perpendicular to the chroma block edge; or if the chroma block edge (903, 913, 923) is a vertical chroma block edge (903, 913, 923), the direction along the width N of the first chroma block being perpendicular to the block edge (903, 913, 923), and the direction along the width T of the second chroma block being perpendicular to the block edge (903, 913, 923).

In a possible implementation form of the method according to any preceding implementation of the fourth aspect or the fourth aspect as such, the second image block is a current block and the first image block is a neighboring block of the current block.

In a possible implementation form of the method according to any preceding implementation of the fourth aspect or the fourth aspect as such, when in the case that the first chroma block is coded using JCCR mode and the JCCR mode is a first JCCR mode (such as 1), determining a first chroma component (such as Cb component) quantization parameter QpCbp for the first chroma component (such as Cb component) of the first image block based on a first luma QP (such as $Qp_{YP}$) of a first luma block (801) of the first image block and the first conversion rule; and determining a second chroma component (such as Cr component) quantization parameter QpCrp for the second chroma component (such as Cr component) of the first image block based on the first chroma component (such as Cb component) quantization parameter QpCbp.

In a possible implementation form of the method according to any preceding implementation of the fourth aspect or the fourth aspect as such, when in the case that the second chroma block is coded using JCCR mode and the JCCR mode is a first JCCR mode (such as 1), determining a first chroma component (such as Cb component) quantization parameter QpCbq for the first chroma component (such as Cb component) of the second image block based on a second luma QP (such as $Qp_{YQ}$) of a second luma block (802) of the second image block and the first conversion rule; and determining a second chroma component (such as Cr component) quantization parameter QpCrq for the second chroma component (such as Cr component) of the second image block based on the first chroma component (such as Cb component) quantization parameter QpCbq.

In a possible implementation form of the method according to any preceding implementation of the fourth aspect or the fourth aspect as such, if JCCR mode==1, then QpCb=ChromaQpTable[2][Qpx], or if JCCR mode==1, then QpCb=ChromaQpTable[cIdx−1][Qpx], cIdx=3;

and QpCr=(QpCb+1)>>1, wherein Qpx represents a first luma QP (such as $Qp_{YP}$) of the first luma block of the first image block, or a second luma QP (such as $Qp_{YQ}$) of the second luma block of the second image block; wherein ChromaQpTable represents a Chroma QP mapping table whose index is 2 or a Chroma QP mapping table comprising information entries whose index is 2; or wherein ChromaQpTable represents a Chroma QP mapping table whose index is 3 or a Chroma QP mapping table comprising information entries whose index is 3.

In a possible implementation form of the method according to any preceding implementation of the fourth aspect or the fourth aspect as such, when in the case that the first chroma block is coded using JCCR mode and the JCCR mode is a second JCCR mode (such as 2), determining a first chroma component (such as Cb component) quantization parameter QpCbp for the first chroma component (such as Cb component) of the first image block based on a first luma QP (such as $Qp_{YP}$) of a first luma block (801) of the first image block and the first conversion rule; and setting a second chroma component (such as Cr component) quantization parameter QpCrp for the second chroma component (such as Cr component) of the first image block as the first chroma component (such as Cb component) quantization parameter QpCbp.

In a possible implementation form of the method according to any preceding implementation of the fourth aspect or the fourth aspect as such, when in the case that the second chroma block is coded using JCCR mode and the JCCR mode is a second JCCR mode (such as 2), determining a first chroma component (such as Cb component) quantization parameter QpCbq for the first chroma component (such as Cb component) of the second image block based on a second luma QP of a second luma block (802) of the second image block and the first conversion rule; and setting a second chroma component (such as Cr component) quantization parameter QpCrq for the second chroma component (such as Cr component) of the second image block as the first chroma component (such as Cb component) quantization parameter QpCbq.

In a possible implementation form of the method according to any preceding implementation of the fourth aspect or the fourth aspect as such, if JCCR mode==2, then QpCb=ChromaQpTable[2][Qpx], or if JCCR mode==2, then QpCb=ChromaQpTable[cIdx−1][Qpx], cIdx=3; and QpCr=QpCb, wherein Qpx represents a first luma QP of the first luma block of the first image block, or a second luma QP of the second luma block of the second image block;

wherein ChromaQpTable represents a Chroma QP mapping table whose index is 2 or a Chroma QP mapping table comprising information entries whose index is 2; or wherein ChromaQpTable represents a Chroma QP mapping table whose index is 3 or a Chroma QP mapping table comprising information entries whose index is 3.

In a possible implementation form of the method according to any preceding implementation of the fourth aspect or the fourth aspect as such, when in the case that the first chroma block is coded using JCCR mode and the JCCR mode is a third JCCR mode (such as 3), determining a second chroma component (such as Cr component) quantization parameter QpCrp for the second chroma component (such as Cr component) of the first image block based on a first luma QP of a first luma block (801) of the first image block and the first conversion rule; and determining a first chroma component (such as Cb component) quantization parameter QpCbp for the first chroma component (such as Cb component) of the first image block based on the second chroma component (such as Cr component) quantization parameter QpCrp.

In a possible implementation form of the method according to any preceding implementation of the fourth aspect or the fourth aspect as such, when in the case that the second chroma block is coded using JCCR mode and the JCCR mode is a third JCCR mode (such as 3), determining a second chroma component (such as Cr component) quantization parameter QpCrq for the second chroma component (such as Cr component) of the second image block based on a second luma QP of a second luma block (802) of the second image block and the first conversion rule; and determining a first chroma component (such as Cb component) quantization parameter QpCbq for the first chroma component (such as Cb component) of the second image block based on the second chroma component (such as Cr component) quantization parameter QpCrq.

In a possible implementation form of the method according to any preceding implementation of the fourth aspect or the fourth aspect as such, if JCCR mode==3, then QpCr=ChromaQpTable[2][Qpx] or if JCCR mode==3, then QpCr=ChromaQpTable[cIdx−1][Qpx], cIdx=3; and QpCb=(QpCr+1)>>1, wherein Qpx represents a first luma QP of the first luma block of the first image block, or a second luma QP of the second luma block of the second image block;

wherein ChromaQpTable represents a Chroma QP mapping table whose index is 2 or a Chroma QP mapping table comprising information entries whose index is 2; or wherein ChromaQpTable represents a Chroma QP mapping table whose index is 3 or a Chroma QP mapping table comprising information entries whose index is 3.

In a possible implementation form of the method according to any preceding implementation of the fourth aspect or the fourth aspect as such, the step of determining an averaged and rounded chroma quantization parameter $Qp_C$ based on the chroma quantization parameter $Qp_{C_p}$ for the first chroma block and the chroma quantization parameter $Qp_{C_q}$ for the second chroma block, comprises: determining an averaged and rounded first chroma component (such as Cb component) quantization parameter QpCb based on the first chroma component (such as Cb component) quantization parameter QpCbp for the first chroma component (such as Cb component) of the first image block and the first chroma component (such as Cb component) quantization parameter QpCbq for the first chroma component (such as Cb component) of the second image block.

In a possible implementation form of the method according to any preceding implementation of the fourth aspect or the fourth aspect as such, the step of determining an averaged and rounded chroma quantization parameter $Qp_C$ based on the chroma quantization parameter $Qp_{C_p}$ for the first chroma block and the chroma quantization parameter $Qp_{C_q}$ for the second chroma block, comprises: determining an averaged and rounded second chroma component (such as Cr component) quantization parameter QpCr based on the second chroma component (such as Cr component) quantization parameter QpCrp for the second chroma component (such as Cr component) of the first image block and the second chroma component (such as Cr component) quantization parameter QpCrq for the second chroma component (such as Cr component) of the second image block.

Solution 4:

Based on the Chroma block type i.e. Cb, Cr, or Cb-Cr (Cb component, Cr component or joint Cb-Cr coded block), and the joint Cb-Cr mode for Cb-Cr block type is equal to 2, i.e. if the TuCResMode[xCb][yCb] of the given block is equal to 2, as shown in equation 8-952 below, the Luma QP is mapped to the Chroma QP for each of the blocks P and Q separately by using a respective conversion rule (e.g. a combination of a Chroma QP mapping table and respective formulas) and then the average of the Chroma QP values of blocks P and Q is set as the final QP value which is then used for further operations of deblocking.

One example for the conversion rules are as follows:

The conversion rule for the Cb component is given blow in the section 8.7.1, using the formula 8-935, 8-936 and 8-939; in other words, the equations 8-935, 8-936 and 8-939 is an example of the second conversion rule R21 which is designed for a first chroma component (such as a Cb component). The equation 8-936 is represented in terms of a Chroma QP mapping table.

The conversion rule for the Cr component is given blow in the section 8.7.1, using the formula 8-935, 8-937 and 8-940; in other words, the equations 8-935, 8-937 and 8-940 is an example of the second conversion rule R22 which is designed for a second chroma components (such as a Cr component). The equation 8-937 is represented in terms of a Chroma QP mapping table.

The conversion rule for the CbCr component (namely joint Cb-Cr component) is given blow in the section 8.7.1, using the formula 8-935, 8-938 and 8-941; in other words, the equations 8-935, 8-938 and 8-941 is an example of first conversion rule which is designed for a joint Cb-Cr component. The equation 8-938 is represented in terms of a Chroma QP mapping table.

Please note that the present disclosure proposes to use different conversion rules for different chroma components, but is not limited to the particular rules or particular formulas mentioned in the section 8.7.1.

The exact specification text changes for solution 4 are as given below.

8.8.3.6.3 Decision Process for Chroma Block Edges

This process is only invoked when ChromaArrayType is not equal to 0.
Inputs to this process are:
a chroma picture sample array recPicture,
a chroma location (xCb, yCb) specifying the top-left sample of the current chroma coding block relative to the top-left chroma sample of the current picture,
a chroma location (xBl, yBl) specifying the top-left sample of the current chroma block relative to the top-left sample of the current chroma coding block,
a variable edgeType specifying whether a vertical (EDGE_VER) or a horizontal (EDGE_HOR) edge is filtered,
a variable cIdx specifying the colour component index,
a variable cQpPicOffset specifying the picture-level chroma quantization parameter offset,
a variable bS specifying the boundary filtering strength,
a variable maxFilterLengthCbCr.
Outputs of this process are
the modified variable maxFilterLengthCbCr,
the variable $t_C$.
The variable maxK is derived as follows:
If edgeType is equal to EDGE_VER, the following applies:

$$maxK=(SubHeightC==1)?3:1 \qquad (8\text{-}1124)$$

Otherwise (edgeType is equal to EDGE_HOR), the following applies:

$$maxK=(SubWidthC==1)?3:1 \qquad (8\text{-}1125)$$

The values $p_i$ and $q_i$ with i=0 . . . maxFilterLengthCbCr and k=0 . . . maxK are derived as follows:
If edgeType is equal to EDGE_VER, the following applies:

$$q_{i,k}=recPicture[xCb+xBl+i][yCb+yBl+k] \qquad (8\text{-}1126)$$

$$p_{i,k}=recPicture[xCb+xBl-i-1][yCb+yBl+k] \qquad (8\text{-}1127)$$

$$subSampleC=SubHeightC \qquad (8\text{-}1128)$$

variable $Qp_Q$ is derived by invoking the chroma QP derivation process as specified in clause 8.8.3.6.10 with chroma location (xCb+xBl+i, yCb+yBl+k) and cIdx as inputs//Here, $Qp_Q$ is the chroma QP value, in order to distinguish luma QP value and chroma QP value, it will be represented by $Qp_Q$ in claim part//
variable $Qp_P$ is derived by invoking the chroma QP derivation process as specified in clause 8.8.3.6.10 with chroma location (xCb+xBl-i-1, yCb+yBl+k) and cIdx as inputs//Here, $Qp_P$ is the chroma QP value, in order to distinguish luma QP value and chroma QP value, it will be represented by $Qp_{CP}$ in claim part//

Otherwise (edgeType is equal to EDGE_HOR), the following applies:

$$q_{i,k}=recPicture[xCb+xBl+k][yCb+yBl+i] \qquad (8\text{-}1129)$$

$$p_{i,k}=recPicture[xCb+xBl+k][yCb+yBl-i-1] \qquad (8\text{-}1130)$$

$$subSampleC=SubWidthC \qquad (8\text{-}1131)$$

variable $Qp_Q$ is derived by invoking the chroma QP derivation process as specified in clause 8.8.3.6.10 with chroma location (xCb+xBl+k, yCb+yBl+i) and cIdx as inputs// $Qp_Q$ is the chroma QP value, it will be represented by $Qp_{Cq}$ in claim part//
variable $Qp_P$ is derived by invoking the chroma QP derivation process as specified in clause 8.8.3.6.10 with chroma location (xCb+xBl+k, yCb+yBl-i-1) and cIdx as inputs// $Qp_P$ is the chroma QP value, it will be represented by $Qp_{Cp}$ in claim part//

The value of the variable β' is determined as specified in Table 8-18 based on the quantization parameter Q derived as follows:

$$Q=Clip3(0,63,Qp_C+(slice\_beta\_offset\_div2<<1)) \qquad (8\text{-}1134)$$

where slice_beta_offset_div2 is the value of the syntax element slice_beta_offset_div2 for the slice that contains sample $q_{0,0}$.
The variable β is derived as follows:

$$\beta=\beta'*(1<<(BitDepth_C-8)) \qquad (8\text{-}1135)$$

The value of the variable $t_C'$ is determined as specified in Table 8-18 based on the chroma quantization parameter Q derived as follows:

$$Q=Clip3(0,65,Qp_C+2*(bS-1)+(slice\_tc\_offset\_div2<<1)) \qquad (8\text{-}1136)$$

where slice_tc_offset_div2 is the value of the syntax element slice_tc_offset_div2 for the slice that contains sample $q_{0,0}$.
The variable $t_C$ is derived as follows:

$$t_C=(BitDepth_C<10)?(t_C'+2)>>(10-BitDepth_C):t_C'*(1<<(BitDepth_C-8)) \qquad (8\text{-}1137)$$

8.8.3.6.10 Quntization Parameter Derivation Process for Chroma Coding Blocks

This process is only invoked when ChromaArrayType is not equal to 0.
Inputs to this process are:
A chroma coding block containing a given chroma sample location (xCb, yCb)
a variable cIdx specifying the colour component index of the given chroma coding block,
Output of this process is a quanization parmater qP of the coding block containing the sample (xCb, yCb)
if TuCResMode[xCb][yCb] is equal to 2, the following applies:

$$qP=Qp'_{CbCr}-QpBdOffset_C \qquad (8\text{-}952)$$

Otherwise, if cIdx is equal to 1, the following applies:

$$qP=Qp'_{Cb}-QpBdOffset_C \qquad (8\text{-}953)$$

Otherwise (cIdx is equal to 2), the following applies:

$$qP=Qp'_{Cr}-QpBdOffset_C \qquad (8\text{-}954)$$

Please note that the variables $Qp'_{CbCr}, Qp'_{Cb}, Qp'_{Cr}$ are derived in the clause "8.7.1 Derivation process for quantization parameters".

In an example implementation, the QPBdoffset is subtracted from the Chroma QP value (as shown in 8-952, 8-953, 8-954) and the averaging is applied (as shown in the revised section 8.8.3.6.3 presented below). In an alternative design, the QPBdoffset may be subtracted from the Chroma QP value during the averaging step. The effects of these two alternative designs are identical.

The details of a derivation process for quantization parameters (as shown in S1611 or S1621 of FIG. 17) according to some embodiments of the present disclosure is described in the section 8.7.1 as follow:

8.7.1 Derivation Process for Quantization Parameters

Inputs to this process are:
a luma location (xCb, yCb) specifying the top-left luma sample of the current coding block relative to the top-left luma sample of the current picture,
a variable cbWidth specifying the width of the current coding block in luma samples,
a variable cbHeight specifying the height of the current coding block in luma samples,
a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed.

In this process, the luma quantization parameter $Qp'_Y$ and the chroma quantization parameters $Qp'_{Cb}$ and $Qp'_{Cr}$ are derived.

The luma location (xQg, yQg), specifies the top-left luma sample of the current quantization group relative to the top left luma sample of the current picture. The horizontal and vertical positions xQg and yQg are set equal to CuQgTopLeftX and CuQgTopLeftY, respectively.

NOTE —: The current quantization group is a rectangluar region inside a coding tree block that shares the same $qP_{Y\_PRED}$. Its width and height are equal to the width and height of the coding tree node of which the top-left luma sample position is assigned to the variables CuQgTopLeftX and CuQgTopLeftY.

When treeType is equal to SINGLE_TREE or DUAL_TREE_LUMA, the predicted luma quantization parameter $qP_{Y\_PRED}$ is derived by the following ordered steps:

1. The variable $qP_{Y\_PREV}$ is derived as follows:
   If one or more of the following conditions are true, $qP_{Y\_PREV}$ is set equal to $SliceQp_Y$:
   The current quantization group is the first quantization group in a slice.
   The current quantization group is the first quantization group in a brick.
   The current quantization group is the first quantization group in a CTB row of a brick and entropy_coding_sync_enabled_flag is equal to 1.
   Otherwise, $qP_{Y\_PREV}$ is set equal to the luma quantization parameter $Qp_Y$ of the last luma coding unit in the previous quantization group in decoding order.

2. The derivation process for neighbouring block availability as specified in clause 6.4.4 is invoked with the location (xCurr, yCurr) set equal to (xCb, yCb), the neighbouring location (xNbY, yNbY) set equal to (xQg-1, yQg), checkPredModeY set equal to FALSE, and cIdx set equal to 0 as inputs, and the output is assigned to availableA. The variable $qP_{Y\_A}$ is derived as follows:
   If one or more of the following conditions are true, $qP_{Y\_A}$ is set equal to $qP_{Y\_PREV}$:
   availableA is equal to FALSE.
   The CTB containing the luma coding block covering the luma location (xQg-1, yQg) is not equal to the CTB containing the current luma coding block at (xCb, yCb), i.e. all of the following conditions are true:
   (xQg-1)>>CtbLog2SizeY is not equal to (xCb)>>CtbLog2SizeY
   (yQg)>>CtbLog2SizeY is not equal to (yCb)>>CtbLog2SizeY
   Otherwise, $qP_{Y\_A}$ is set equal to the luma quantization parameter $Qp_Y$ of the coding unit containing the luma coding block covering (xQg-1, yQg).

3. The derivation process for neighbouring block availability as specified in clause 6.4.4 is invoked with the location (xCurr, yCurr) set equal to (xCb, yCb), the neighbouring location (xNbY, yNbY) set equal to (xQg, yQg-1), checkPredModeY set equal to FALSE, and cIdx set equal to 0 as inputs, and the output is assigned to availableB. The variable $qP_{Y\_B}$ is derived as follows:
   If one or more of the following conditions are true, $qP_{Y\_B}$ is set equal to qPy_pREv:
   availableB is equal to FALSE.
   The CTB containing the luma coding block covering the luma location (xQg, yQg-1) is not equal to the CTB containing the current luma coding block at (xCb, yCb), i.e. all of the following conditions are true:
   (xQg)>>CtbLog2SizeY is not equal to (xCb)>>CtbLog2SizeY
   (yQg-1)>>CtbLog2SizeY is not equal to (yCb)>>CtbLog2SizeY
   Otherwise, $qP_{Y\_B}$ is set equal to the luma quantization parameter $Qp_Y$ of the coding unit containing the luma coding block covering (xQg, yQg-1).

4. The predicted luma quantization parameter $qP_{Y\_PRED}$ is derived as follows:
   If all the following conditions are true, then $qP_{Y\_PRED}$ is set equal to the luma quantization parameter $Qp_Y$ of the coding unit containing the luma coding block covering (xQg, yQg-1):
   availableB is equal to TRUE.
   the current quantization group is the first quantization group in a CTB row within a brick
   Otherwise, $qP_{Y\_PRED}$ is derived as follows:

$$qP_{Y\_PRED}=(qP_{Y\_A}+qP_{Y\_B}+1)>>1 \quad (8\text{-}932)$$

The variable $Qp_Y$ is derived as follows:

$$Qp_Y=((qP_{Y\_PRED}+CuQpDeltaVal+64+2*QpBdOffset_Y)\%(64+QpBdOffset_Y))-QpBdOffset_Y \quad (8\text{-}933)$$

The luma quantization parameter $Qp'_Y$ is derived as follows:

$$Qp'_Y=Qp_Y+QpBdOffset_Y \quad (8\text{-}934)$$

When ChromaArrayType is not equal to 0 and treeType is equal to SINGLE_TREE or DUAL_TREE_CHROMA, the following applies:

When treeType is equal to DUAL_TREE_CHROMA, the variable $Qp_Y$ is set equal to the luma quantization parameter $Qp_Y$ of the luma coding unit that covers the luma location (xCb+cbWidth/2, yCb+cbHeight/2).

The variables $qP_{Cb}$, $qP_{Cr}$ and $qP_{CbCr}$ are derived as follows:

$$qPi_{Chroma}=Clip3(-QpBdOffset_C,63,Qp_Y) \quad (8\text{-}935)$$

$$qPi_{Cb}=ChromaQpTable[0][qPi_{Chroma}] \quad (8\text{-}936)$$

$$qPi_{Cr}=ChromaQpTable[1][qPi_{Chroma}] \quad (8\text{-}937)$$

$$qPi_{CbCr}=ChromaQpTable[2][qPi_{Chroma}] \quad (8\text{-}938)$$

The chroma quantization parameters for the Cb and Cr components, $Qp'_{Cb}$ and $Qp'_{cr}$, and joint Cb-Cr coding $Qp'_{CbCr}$ are derived as follows:

$$Qp'_{Cb}=Clip3(-QpBdOffset_C,63,qP_{Cb}+pps\_cb\_qp\_offset+slice\_cb\_qp\_offset+CuQpOffset_{Cb})+QpBdOffset_C \quad (8\text{-}939)$$

$$QP'_{Cr}=\text{Clip3}(-\text{Qp}Bd\text{Offset}_C,63,\text{qP}_{Cr}+pps\_cr\_qp\_offset+\text{slice\_cr\_qp\_offset}+Cu\text{QpOffset}_{Cr})+\text{Qp}Bd\text{Offset}_C \quad (8\text{-}940)$$

$$Qp'_{CbCr}=\text{Clip3}(-\text{Qp}Bd\text{Offset}_C,63,\text{qP}_{CbCr}+pps\_cbcr\_qp\_offset+\text{slice\_cbcr\_qp\_offset}+Cu\text{QpOffset}_{CbCr})+\text{Qp}Bd\text{Offset}_C \quad (8\text{-}941)$$

It is noted that as illustrated in 8-935, the luma QP (e.g. $Qp_Y$) is not directly used to derive the Chroma QP (e.g. $qPi_{Cb}$, $qPi_{Cr}$ or $qPi_{CbCr}$). In an example, A further step such as clipping can be applied to the luma QP ($Qp_Y$).

The decision process for the chroma block edges (as shown in S1601 of FIG. 16) according to solution 4 of the present disclosure is described in the revised section 8.8.3.6.3 as follows:

8.8.3.6.3 Decision Process for Chroma Block Edges

The variables $Qp_Q$ and $Qp_P$ are set equal to $Qp'_{CbCr}-\text{QpBdOffset}_C$ when TuCResMode[xCb][yCb] is equal to 2, $Qp'_{Cb}-\text{QpBdOffset}_C$ when cIdx is equal to 1; $Qp'_{Cr}-\text{QpBdOffset}_C$ when cIdx is equal to 2 of the coding units which include the coding blocks containing the sample $q_{0,0}$ and $p_{0,0}$, respectively.

The variable $Qp_C$ is derived as follows:

$$Qp_C=(Qp_Q+Qp_P+1)>>1$$

Figure 17:
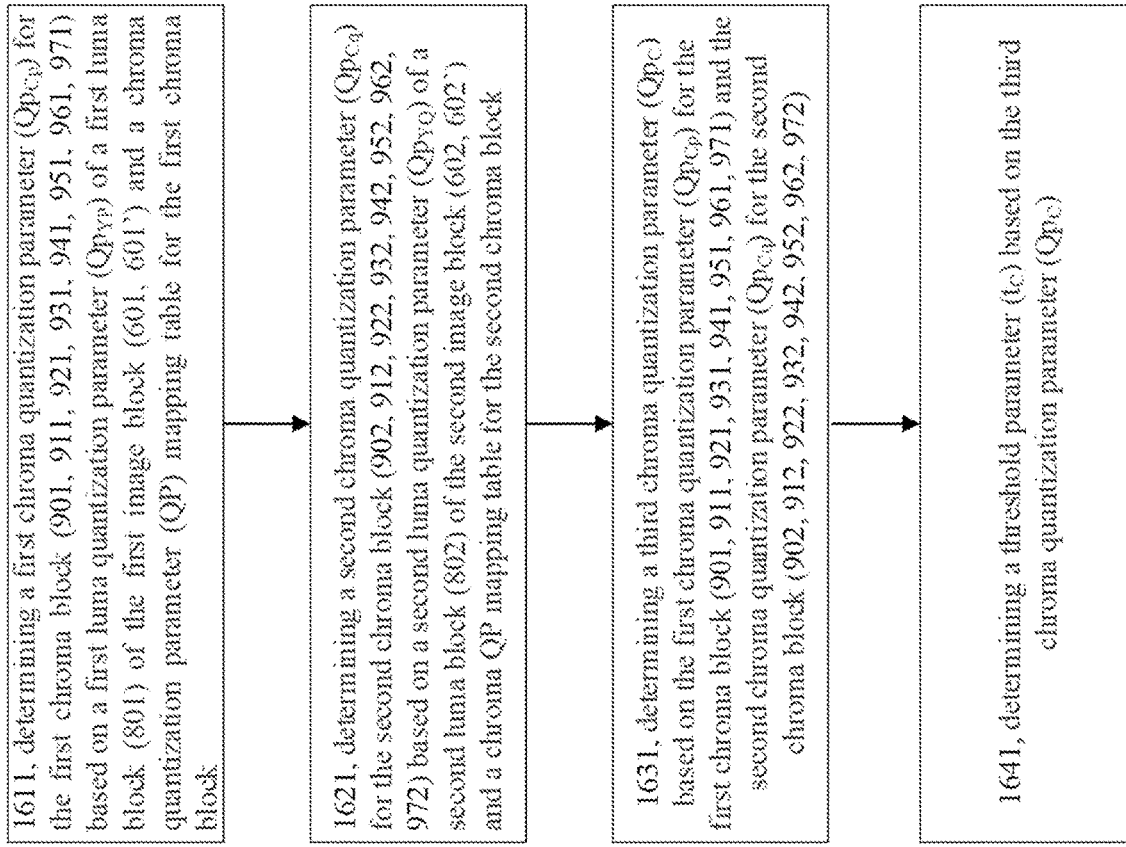
FIG. 17 is a flowchart of a decision process according to some aspects of the present disclosure.

Refer to section 8.8.3.6.3, in an example implementation, the QPBdoffset is subtracted from the Chroma QP value (as illustrated in 8-952, 8-953, 8-954) and then the averaging is applied directly (as illustrated in section 8.8.3.6.3). It can be understood that it is substantially same with the way in which the QPBdoffset is subtracted during the averaging step. The example details of the step 1631 (as shown in FIG. 17) is described in the above section 8.8.3.6.3 of the VVC specification, and will not be repeated in the following.

Solution 5:

Solution 5 is basically similar to solution 4 except that the conversion rules are slightly different. The specification text is attached below.

8.8.3.6.3 Decision Process for Chroma Block Edges

This process is only invoked when ChromaArrayType is not equal to 0.

Inputs to this process are:
  a chroma picture sample array recPicture,
  a chroma location (xCb, yCb) specifying the top-left sample of the current chroma coding block relative to the top-left chroma sample of the current picture,
  a chroma location (xBl, yBl) specifying the top-left sample of the current chroma block relative to the top-left sample of the current chroma coding block,
  a variable edgeType specifying whether a vertical (EDGE_VER) or a horizontal (EDGE_HOR) edge is filtered,
  a variable cIdx specifying the colour component index,
  a variable cQpPicOffset specifying the picture-level chroma quantization parameter offset,
  a variable bS specifying the boundary filtering strength,
  a variable maxFilterLengthCbCr.

Outputs of this process are
  the modified variable maxFilterLengthCbCr,
  the variable tc.

The variable maxK is derived as follows:
  If edgeType is equal to EDGE_VER, the following applies:

$$\text{max}K=(\text{SubHeight}C==1)?3:1 \quad (8\text{-}1124)$$

Otherwise (edgeType is equal to EDGE_HOR), the following applies:

$$\text{max}K=(\text{SubWidth}C==1)?3:1 \quad (8\text{-}1125)$$

The values $p_i$ and $q_i$ with i=0 . . . maxFilterLengthCbCr and k=0 . . . maxK are derived as follows:
  If edgeType is equal to EDGE_VER, the following applies:

$$q_{i,k}=\text{recPicture}[x\text{Cb}+x\text{Bl}+i][y\text{Cb}+y\text{Bl}+k] \quad (8\text{-}1126)$$

$$p_{i,k}=\text{recPicture}[x\text{Cb}+x\text{Bl}-i-1][y\text{Cb}+y\text{Bl}+k] \quad (8\text{-}1127)$$

$$\text{subSample}C=\text{SubHeight}C \quad (8\text{-}1128)$$

variable $Qp_Q$ is derived by invoking the chroma QP derivation process as specified in clause 8.8.3.6.10 with chroma location (xCb+xBl+i, yCb+yBl+k) and cIdx as inputs
  variable $Qp_P$ is derived by invoking the chroma QP derivation process as specified in clause 8.8.3.6.10 with chroma location (xCb+xBl-i-1, yCb+yBl+k) and cIdx as inputs
    Otherwise (edgeType is equal to EDGE_HOR), the following applies:

$$q_{i,k}=\text{recPicture}[x\text{Cb}+x\text{Bl}+k][y\text{Cb}+y\text{Bl}+i] \quad (8\text{-}1129)$$

$$p_{i,k}=\text{recPicture}[x\text{Cb}+x\text{Bl}+k][y\text{Cb}+y\text{Bl}-i-1] \quad (8\text{-}1130)$$

$$\text{subSample}C=\text{SubWidth}C \quad (8\text{-}1131)$$

variable $Qp_Q$ is derived by invoking the chroma QP derivation process as specified in clause 8.8.3.6.10 with chroma location (xCb+xBl+k, yCb+yBl+i) and cIdx as inputs
  variable $Qp_P$ is derived by invoking the chroma QP derivation process as specified in clause 8.8.3.6.10 with chroma location (xCb+xBl+k, yCb+yBl-i-1) and cIdx as inputs 8.8.3.6.10 Quantization Parameter Derivation Process for Chroma Coding Blocks This process is only invoked when ChromaArrayType is not equal to 0.

Inputs to this process are:
  A chroma coding block containing a given chroma sample location (xCb, yCb)
  a variable cIdx specifying the colour component index of the given chroma coding block, Output of this process is a quanization parmater qP of the coding block containing the sample (xCb, yCb)
if TuCResMode[xCb][yCb] is equal to 2, the following applies:

$$qP=Qp_{CbCr} \quad (8\text{-}952)$$

cQpPicOffset is set equal to pps_joint_cbcr_qp_offset
Otherwise, if cIdx is equal to 1, the following applies:

$$qP=Qp_{Cb} \quad (8\text{-}953)$$

Otherwise (cIdx is equal to 2), the following applies:

$$qP=Qp_{Cr} \quad (8\text{-}954)$$

qP=Clip3(0,63, qP+cQpPicOffset)

NOTE—The variable cQpPicOffset provides an adjustment for the value of pps_cb_qp_offset or pps_cr_qp_offset, according to whether the filtered chroma component is the Cb or Cr component. However, to avoid the need to vary the amount of the adjustment within the picture, the filtering process does not include an adjustment for the value of slice_cb_qp_offset or slice_cr_qp_offset nor (when cu_chroma_qp_offset_enabled_flag is equal to 1) for the value of $Cu\text{QpOffset}_{Cb}$, $Cu\text{QpOffset}_{Cr}$, or $Cu\text{QpOffset}_{CbCr}$.

NOTE—The variables $Qp_{CbCr}$, $Qp_{Cb}$, $Qp_{Cr}$ are derived as in section 8.7.1 (Derivation process for quantization parameters)

In the equation 8-935, $Qp_Y$ represents a first luma QP (such as $Qp_{YP}$) of a first luma block (801) of the first image block (601, 601'), or a second luma QP (such as $Qp_{YQ}$) of a second luma block (802) of the second image block (602, 602').

In the equations 8-936, 8-937, 8-938, ChromaQpTable represents a chroma Qp mapping table (such as ChromaQPTable).

$QpBdOffset_C$ represents the value of the Chroma quantization parameter range offset. The value of the $QpBdOffset_C$ is derived as follows: $QpBdOffset_C$=6*bit_depth_chroma_minus8 where "bit_depth_chroma_minus8" is a parameter signalled in the sequence parameter set (SPS).

pps_cb_qp_offset and pps_cr_qp_offset specify the offsets to the luma quantization parameter $Qp'_Y$ used for deriving $Qp'_{Cb}$ and $Qp'_{Cr}$, respectively. The values of pps_cb_qp_offset and pps_cr_qp_offset shall be in the range of −12 to +12, inclusive. When ChromaArrayType is equal to 0, pps_cb_qp_offset and pps_cr_qp_offset are not used in the decoding process and decoders shall ignore their value.

pps_joint_cbcr_qp_offset specifies the offset to the luma quantization parameter $Qp'_Y$ used for deriving $Qp'_{CbCr}$. The value of pps_joint_cbcr_qp_offset shall be in the range of −12 to +12, inclusive. When ChromaArrayType is equal to 0 or sps_joint_cbcr_enabled_flag is equal to 0, pps_joint_cbcr_qp_offset is not used in the decoding process and decoders shall ignore its value.

slice_cb_qp_offset specifies a difference to be added to the value of pps_cb_qp_offset when determining the value of the $Qp'_{Cb}$ quantization parameter. The value of slice_cb_qp_offset shall be in the range of −12 to +12, inclusive. When slice_cb_qp_offset is not present, it is inferred to be equal to 0. The value of pps_cb_qp_offset+slice_cb_qp_offset shall be in the range of −12 to +12, inclusive.

slice_cr_qp_offset specifies a difference to be added to the value of pps_cr_qp_offset when determining the value of the $Qp'_{Cr}$ quantization parameter. The value of slice_cr_qp_offset shall be in the range of −12 to +12, inclusive. When slice_cr_qp_offset is not present, it is inferred to be equal to 0. The value of pps_cr_qp_offset+slice_cr_qp_offset shall be in the range of −12 to +12, inclusive.

slice_joint_cbcr_qp_offset specifies a difference to be added to the value of pps_joint_cbcr_qp_offset when determining the value of the $Qp'_{CbCr}$. The value of slice_joint_cbcr_qp_offset shall be in the range of −12 to +12, inclusive. When slice_joint_cbcr_qp_offset is not present, it is inferred to be equal to 0. The value of pps_joint_cbcr_qp_offset+slice_joint_cbcr_qp_offset shall be in the range of −12 to +12, inclusive.

cu_chroma_qp_offset_flag when present and equal to 1, specifies that an entry in the cb_qp_offset_list[ ] is used to determine the value of $CuQpOffset_{Cb}$, a corresponding entry in the cr_qp_offset_list[ ] is used to determine the value of $CuQpOffset_{Cr}$, and a corresponding entry in the joint_cbcr_qp_offset_list[ ] is used to determine the value of $CuQpOffset_{CbCr}$. cu_chroma_qp_offset_flag equal to 0 specifies that these lists are not used to determine the values of $CuQpOffset_{Cb}$, $CuQpOffset_{Cr}$, and $CuQpOffset_{CbCr}$.

cu_chroma_qp_offset_idx, when present, specifies the index into the cb_qp_offset_list[ ], cr_qp_offset_list[ ], and joint_cbcr_qp_offset_list[ ] that is used to determine the value of $CuQpOffset_{Cb}$, $CuQpOffset_{Cr}$, and $CuQpOffset_{CbCr}$. When present, the value of cu_chroma_qp_offset_idx shall be in the range of 0 to chroma_qp_offset_list_len_minus1, inclusive. When not present, the value of cu_chroma_qp_offset_idx is inferred to be equal to 0. When cu_chroma_qp_offset_flag is present, the following applies:

The variable IsCuChromaQpOffsetCoded is set equal to 1.
The variables $CuQpOffset_{Cb}$, $CuQpOffset_{Cr}$, and $CuQpOffset_{CbCr}$ are derived as follows:
If cu_chroma_qp_offset_flag is equal to 1, the following applies:

$$CuQpOffset_{Cb} = cb\_qp\_offset\_list[cu\_chroma\_qp\_offset\_idx] \quad (7\text{-}166)$$

$$CuQpOffset_{Cr} = cr\_qp\_offset\_list[cu\_chroma\_qp\_offset\_idx] \quad (7\text{-}167)$$

$$CuQpOffset_{CbCr} = joint\_cbcr\_qp\_offset\_list[cu\_chroma\_qp\_offset\_idx] \quad (7\text{-}168)$$

Otherwise (cu_chroma_qp_offset_flag is equal to 0), $CuQpOffset_{Cb}$, $CuQpOffset_{Cr}$, and $CuQpOffset_{CbCr}$ are all set equal to 0.

cb_qp_offset_list[i], cr_qp_offset_list[i], and joint_cbcr_qp_offset_list[i], specify offsets used in the derivation of $Qp'_{Cb}$, $Qp'_{Cr}$, and $Qp'_{CbCr}$, respectively. The values of cb_qp_offset_list[i], cr_qp_offset_list[i], and joint_cbcr_qp_offset_list[i] shall be in the range of −12 to +12, inclusive.

Especially, a device embodiment is basically similar to a method embodiment, and therefore is described briefly; for execution processes of specific functions of each unit, reference may be made to partial descriptions in the method embodiment.

Figure 10:
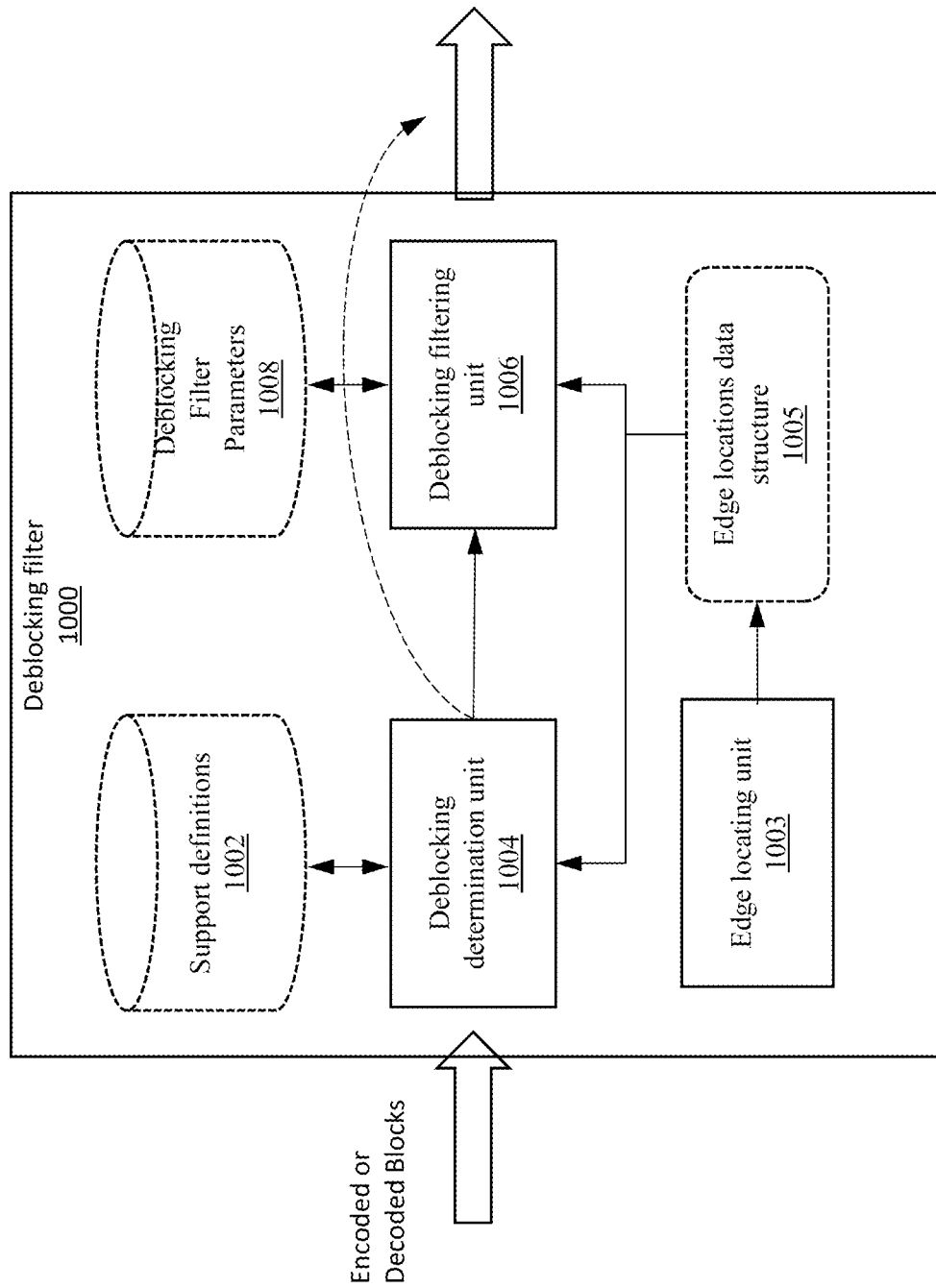
FIG. 10 shows an embodiment of the deblocking filter device according to embodiments of the invention.

FIG. 10 is a block diagram illustrating an exemplary deblocking filter apparatus 1000 according to the techniques described in this disclosure (further details will be described below, e.g., based on FIGS. 9A-9H or FIG. 11-13 or FIG. 16-17). The deblocking filter apparatus 1000 may be configured to perform deblocking techniques in accordance with various examples described in the present disclosure. In general, either or both of loop filter unit 220 from FIG. 2 and loop filter unit 320 from FIG. 3 may include components substantially similar to those of deblocking filter apparatus 1000. Other video coding devices, such as video encoders, video decoders, video encoder/decoders (CODECs), and the like may also include components substantially similar to deblocking filter 1000. Deblocking filter apparatus 1000 may be implemented in hardware, software, or firmware, or any combination thereof. When implemented in software or firmware, corresponding hardware (such as one or more processors or processing units and memory for storing instructions for the software or firmware) may also be provided.

In the example of FIG. 10, deblocking filter apparatus 1000 includes deblocking determination unit 1004, support definitions 1002 stored in memory, deblocking filtering unit 1006, deblocking filter parameters 1008 stored in memory, edge locating unit 1003, and edge locations data structure 1005. Any or all of the components of deblocking filter 1000 may be functionally integrated. The components of deblocking filter 1000 are illustrated separately only for purposes of illustration. In general, deblocking filter 1000 receives data for decoded blocks, e.g., from a summation component 114, 214 that combines prediction data with residual data for the blocks. The data may further include an indication of how the blocks were predicted. In the example described below, deblocking filter apparatus 1000 is configured to receive data including a decoded video block associated with a CTB (or an CTU) and a CU quadtree for the CTB, where the CU quadtree describes how the CTB is partitioned into CUs or CBs and TUs or TBs.

Deblocking filter apparatus 1000 may maintain edge locations data structure 1005 in a memory of deblocking filter apparatus 1000, or in an external memory provided by a corresponding video coding device. In some examples, edge locating unit 1003 may receive a quadtree corresponding to a CTB that indicates how the CTB is partitioned into CUs or CBs and TUs or TBs. Edge locating unit 1003 may then analyze the CU quadtree to determine edges between decoded video blocks associated with TUs or CUs in the CTB that are candidates for deblocking.

Edge locations data structure 1005 may comprise an array having a horizontal dimension, a vertical dimension, and a dimension representative of horizontal edges and vertical edges. In general, edges between video blocks may occur between two video blocks associated with smallest-sized CUs of the CTB, or TUs or CUs. Assuming that the CTB has a size of N×N, and assuming that the smallest-sized CU of the CTB is of size M×M, the array may comprise a size of [N/M]×[N/M]×2, where "2" represents the two possible directions of edges between CUs (horizontal and vertical). For example, assuming that an CTB has 64×64 pixels and a 8×8 smallest-sized CU or TU, the array may comprise [8]×[8]×[2] entries.

Each entry may generally correspond to a possible edge between two video blocks. Edges might not in fact exist at each of the positions within the LCU corresponding to each of the entries of edge locations data structure 1005. Accordingly, values of the data structure may be initialized to false. In general, edge locating unit 1003 may analyze the CU quadtree to determine locations of edges between two video blocks associated with TUs or CUs of the CTB and set corresponding values in edge locations data structure 1005 to true.

In general, the entries of the array may describe whether a corresponding edge exists in the CTB as a candidate for deblocking. That is, when edge locating unit 1003 determines that an edge between two neighboring video blocks associated with TUs or CUs of the CTB exists, edge locating unit 1003 may set a value of the corresponding entry in edge locations data structure 1005 to indicate that the edge exists (e.g., to a value of "true").

Deblocking determination unit 1004 generally determines whether, for two neighboring blocks, an edge between the two blocks should be de-blocked. Deblocking determination unit 1004 may determine locations of edges using edge locations data structure 1005. When a value of edge locations data structure 1005 has a Boolean value, deblocking determination unit 1004 may determine that a "true" value indicates the presence of an edge, and a "false" value indicates that no edge is present, in some examples.

In general, deblocking determination unit 1004 is configured with one or more deblocking determination functions. The functions may include a plurality of coefficients applied to lines of pixels that cross the edge between the blocks. For example, the functions may be applied to a line of pixels that is perpendicular to the edge, where some pixels are in one of the two blocks and some pixels are in the other of the two blocks. Support definitions 1002 define support for the functions. In general, the "support" corresponds to the pixels to which the functions are applied.

Deblocking determination unit 1004 may be configured to apply one or more deblocking determination functions to one or more sets of support, as defined by support definitions 1002, to determine whether a particular edge between two blocks of video data should be deblocked. The dashed line originating from deblocking determination unit 1004 represents data for blocks being output without being filtered. In cases where deblocking determination unit 1004 determines that an edge between two blocks should not be filtered, deblocking filter 1000 may output the data for the blocks without altering the data. That is, the data may bypass deblocking filtering unit 1006. On the other hand, when deblocking determination unit 1004 determines that an edge should be deblocked, deblocking determination unit 1004 may cause deblocking filtering unit 1006 to filter values for pixels near the edge in order to deblock the edge.

Deblocking filtering unit 1006 retrieves definitions of deblocking filters from deblocking filter parameters 1008 for edges to be deblocked, as indicated by deblocking determination unit 1004. In general, filtering of an edge uses values of pixels from the neighborhood of a current edge to be deblocked. Therefore, both deblocking decision functions and deblocking filters may have a certain support region on both sides of an edge. By applying a deblocking filter to pixels in the neighborhood of an edge, deblocking filtering unit 1006 may smooth the values of the pixels such that high frequency transitions near the edge are dampened. In this manner, application of deblocking filters to pixels near an edge may reduce blockiness artifacts near the edge.

FIG. 16 is a block diagram illustrating another exemplary deblocking method according to the techniques described in this disclosure (further details will be described below, e.g., based on FIGS. 9A-9H, 10, 12, 13 and 17). The deblocking method 1600, for deblocking a chroma block edge (903, 913, 923, 933, 943, 953, 963, 973) between a first chroma block (901, 911, 921, 931, 941, 951, 961, 971) of a first image block (601, 601') and a second chroma block (902, 912, 922, 932, 942, 952, 962, 972) of a second image block (602, 602'), in an image encoding and/or an image decoding, wherein the deblocking method 1600 comprises:

performing 1601 a decision process for the chroma block edge, wherein as shown in FIG. 17, the decision process comprises:

determining 1611 a chroma quantization parameter $Qp_{Cp}$ for the first chroma block (901, 911, 921, 931, 941, 951, 961, 971) based on a first luma QP (such as $Qp_{YP}$) for a first luma block (801) of the first image block (601, 601') and one or more chroma quantization parameter (QP) mapping tables;

determining 1621 a chroma quantization parameter $Qp_{Cq}$ for the second chroma block (902, 912, 922, 932, 942, 952, 962, 972) based on a second luma QP (such as $Qp_{YQ}$) for a second luma block (802) of the second image block (602, 602') and the one or more chroma QP mapping tables; and determining 1631 an averaged and rounded chroma quantization parameter $Qp_C$ based on the chroma quantization parameter $Qp_{Cp}$ for the first chroma block (901, 911, 921, 931, 941, 951, 961, 971) and the chroma quantization parameter $Qp_{Cq}$ for the second chroma block (902, 912, 922, 932, 942, 952, 962, 972);

determining 1641 a threshold parameter ($t_C$) based on the averaged and rounded chroma quantization parameter ($Qp_C$)

performing 1603 a filtering process for the chroma block edge (903, 913, 923) at least based on the threshold parameter ($t_C$).

FIG. 11 is a block diagram illustrating another exemplary deblocking method according to the techniques described in this disclosure (further details will be described below, e.g., based on FIGS. 9, 10, 12, and 13).

As illustrated in FIG. 11, in step 1101, it is determined if the size of both the blocks perpendicular to and adjacent to a given edge in the direction of deblocking is >=8 samples. If yes, then a decision process for the chroma block edge is performed. The decision process may include step 1103 and step 1107. The details of step 1103 will be provided later. In step 1107, it is determined if a long filter (such as a longer tap filter) should be applied or not, the Chroma longer tap filter may be applied based on further Chroma longer tap filter decisions. If the block size is <=8 samples at least for one of the blocks then the normal weak filter which modifies a maximum of (1+1) samples is invoked based on the boundary strength value of the respective edge (in step 1105). i.e. if the boundary strength (bS) of the edge is >=1 then (1+1) weak filter is applied. If the bS value is 0, then deblocking filter is not applied at all for the given edge.

If block size is >=8 samples for both blocks P and Q, then the average QP which is used to determine or derive the $t_C$ and Beta values is computed. $t_C$ and Beta are two threshold values which are derived from their respective tables and are indexed by the average QP value of both the blocks P and Q.

The $t_C$ and Beta values are further used in the deblocking decisions which are described above in the section 8.8.3.6.3 and also in section 8.8.3.6.9 of JVET-O2001. If all the decisions are evaluated to be true, then the Chroma longer tap filter (3+3) is invoked. The $t_C$ is further used in filtering process for a chroma sample which are described above in the section 8.8.3.6.9 of JVET-O2001.

Since the deblocking decisions depend on the thresholds $t_C$ and Beta values and the filtering process for a chroma sample depend on the thresholds $t_C$, by using the method, the Chroma QP value which is used for the blocks which are coded using Joint Cb-Cr residual (JCCR) mode can be mapped correctly from its corresponding Luma QP value to achieve correct deblocking decisions and thereby achieving better visual quality.

The person skilled in the art will understand that the "blocks" ("units") of the various figures (method and apparatus) represent or describe functionalities of embodiments of the invention (rather than necessarily individual "units" in hardware or software) and thus describe equally functions or features of apparatus embodiments as well as method embodiments (unit=step).

Following is an explanation of the applications of the encoding method as well as the decoding method as shown in the above-mentioned embodiments, and a system using them.

Figure 14:
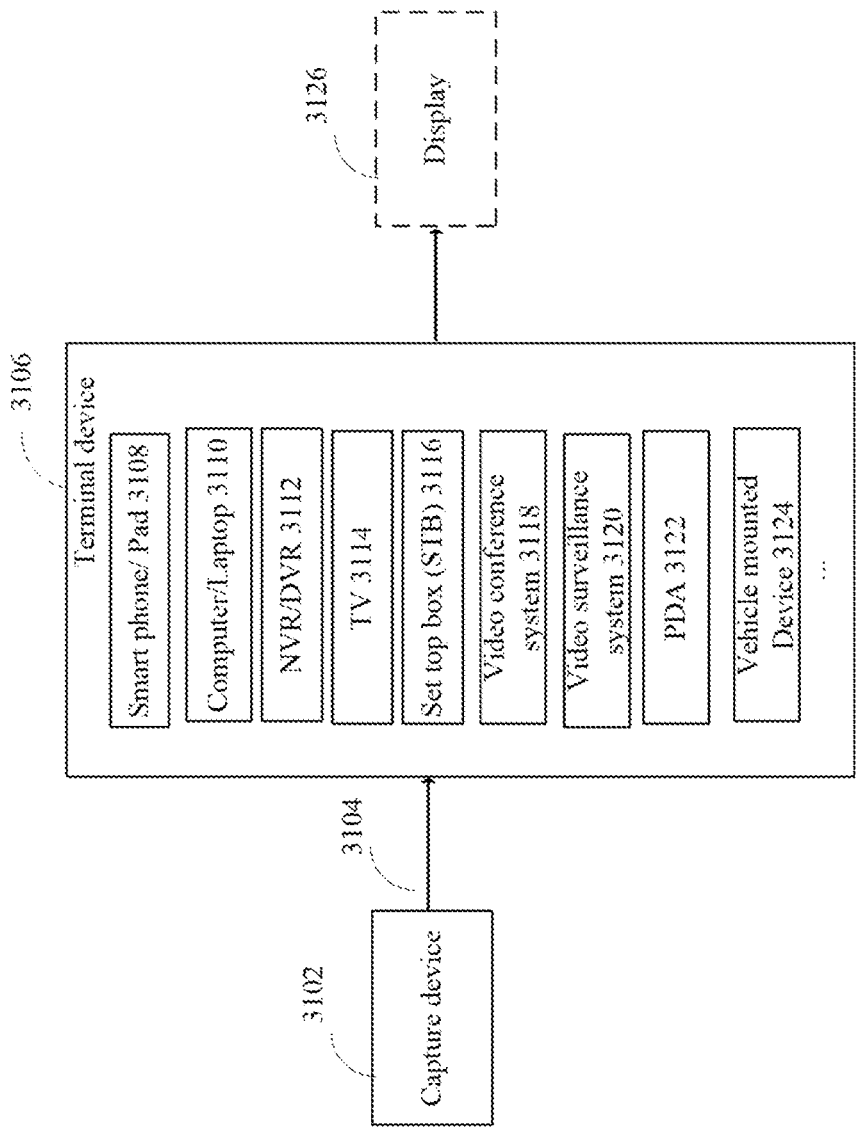
FIG. 14 is a block diagram showing an example structure of a content supply system 3100 which realizes a content delivery service.

FIG. 14 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 15:
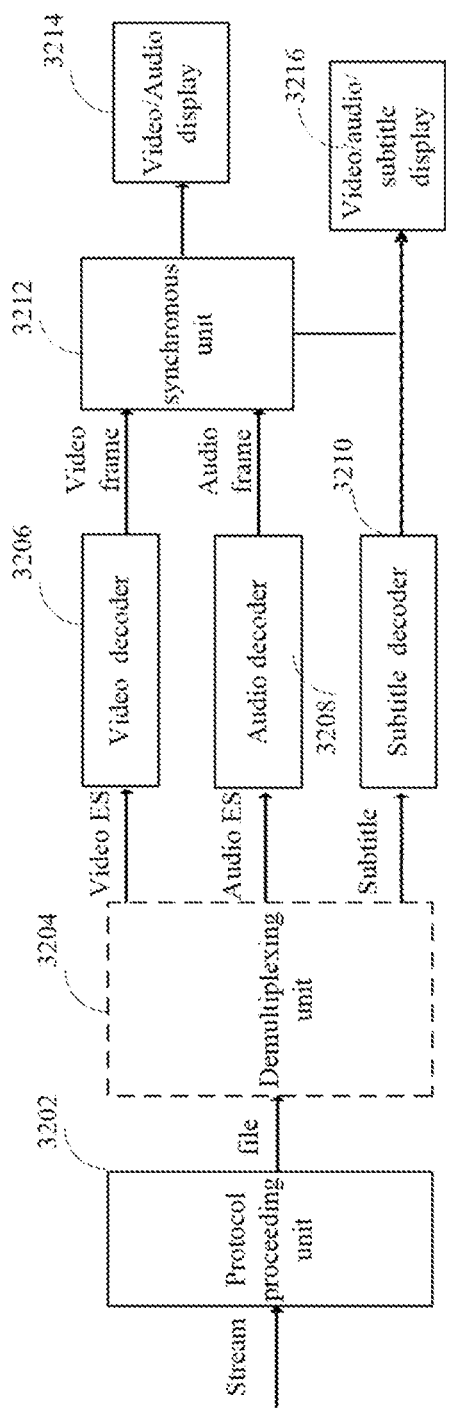
FIG. 15 is a block diagram showing a structure of an example of a terminal device.

FIG. 15 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like. After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. Y) before feeding it to the synchronous unit 3212. Similarly, the audio frame may store in a buffer (not shown in FIG. Y) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present invention is not limited to the above-mentioned system, and either the picture encoding device or the picture decoding device in the above-mentioned embodiments can be incorporated into other system, for example, a car system.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:
+ Addition
− Subtraction (as a two-argument operator) or negation (as a unary prefix operator)
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.

$$\frac{x}{y}$$

Used to denote division in mathematical equations where no truncation or rounding is intended.

$$\sum_{i=x}^{y} f(i)$$

The summation of f(i) with i taking all integer values from x up to and including y. Modulus. Remainder of x divided by y, defined only for integers x and y with x>=0 x % y and y>0.

Logical Operators

The following logical operators are defined as follows:
x && y Boolean logical "and" of x and y
x||y Boolean logical "or" of x and y
! Boolean logical "not"
x ? y:z If x is TRUE or not equal to 0, evaluates to the value of y; otherwise, evaluates to the value of z.

Relational Operators

The following relational operators are defined as follows:
> Greater than
>= Greater than or equal to
< Less than
<= Less than or equal to
== Equal to
!= Not equal to When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:
& Bit-wise "and". When operating on integer arguments, operates on a two's complement representation of the integer value. When operating on a binary argument that contains fewer bits than another argument, the shorter argument is extended by adding more significant bits equal to 0.
| Bit-wise "or". When operating on integer arguments, operates on a two's complement representation of the integer value. When operating on a binary argument that contains fewer bits than another argument, the shorter argument is extended by adding more significant bits equal to 0.
^ Bit-wise "exclusive or". When operating on integer arguments, operates on a two's complement representation of the integer value. When operating on a binary argument that contains fewer bits than another argument, the shorter argument is extended by adding more significant bits equal to 0.
x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.
x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:
= Assignment operator
++ Increment, i.e., x++ is equivalent to x=x+1; when used in an array index, evaluates to the value of the variable prior to the increment operation.
-- Decrement, i.e., x-- is equivalent to x=x−1; when used in an array index, evaluates to the value of the variable prior to the decrement operation.
+= Increment by amount specified, i.e., x+=3 is equivalent to x=x+3, and x+=(−3) is equivalent to x=x+(−3).

–= Decrement by amount specified, i.e., x–=3 is equivalent to x=x–3, and x–=(–3) is equivalent to x=x–(–3).

Range Notation

The following notation is used to specify a range of values:
x=y . . . z  x takes on integer values starting from y to z, inclusive, with x, y, and z being integer numbers and z being greater than y.

Mathematical Functions

The following mathematical functions are defined:

$$\text{Abs}(x) = \begin{cases} x; & x >= 0 \\ -x; & x < 0 \end{cases}$$

Asin(x) the trigonometric inverse sine function, operating on an argument x that is in the range of –1.0 to 1.0, inclusive, with an output value in the range of –Σ÷2 to π÷2, inclusive, in units of radians Atan(x) the trigonometric inverse tangent function, operating on an argument x, with an output value in the range of –π÷2 to π÷2, inclusive, in units of radians $$\text{Atan2}(y, x) = \begin{cases} \text{Atan}\left(\frac{y}{x}\right); & x > 0 \\ \text{Atan}\left(\frac{y}{x}\right) + \pi; & x < 0 \,\&\&\, y >= 0 \\ \text{Atan}\left(\frac{y}{x}\right) - \pi; & x < 0 \,\&\&\, y < 0 \\ +\frac{\pi}{2}; & x == 0 \,\&\&\, y >= 0 \\ -\frac{\pi}{2}; & \text{otherwise} \end{cases}$$

Ceil(x) the smallest integer greater than or equal to x.
Clip1$_Y$(x)=Clip3(0, (1<<BitDepth$_Y$)–1, x)
Clip1$_C$(x)=Clip3(0, (1<<BitDepth$_C$)–1, x)

$$\text{Clip3}(x, y, z) = \begin{cases} x; & z < x \\ y; & z > y \\ z; & \text{otherwise} \end{cases}$$

Cos(x) the trigonometric cosine function operating on an argument x in units of radians.
Floor(x) the largest integer less than or equal to x.

$$\text{GetCurrMsb}(a, b, c, d) = \begin{cases} c + d; & b - a >= d/2 \\ c - d; & a - b > d/2 \\ c; & \text{otherwise} \end{cases}$$

Ln(x) the natural logarithm of x (the base-e logarithm, where e is the natural logarithm base constant 2.718 281 828 . . . ).
Log 2(x) the base-2 logarithm of x.
Log 10(x) the base-10 logarithm of x.

$$\text{Min}(x, y) = \begin{cases} x; & x <= y \\ y; & x > y \end{cases}$$

$$\text{Max}(x, y) = \begin{cases} x; & x >= y \\ y; & x < y \end{cases}$$

Round(x)=Sign(x)*Floor(Abs(x)+0.5)

$$\text{Sign}(x) = \begin{cases} 1; & x > 0 \\ 0; & x == 0 \\ -1; & x < 0 \end{cases}$$

Sin(x) the trigonometric sine function operating on an argument x in units of radians
Sqrt(x)=$\sqrt{x}$
Swap(x, y)=(y, x)
Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

| Operation precedence from highest (at top of table) to lowest (at bottom of table) |
| --- |
| operations (with operands x, y, and z) |
| "x++", "x– –" |
| "!x", "–x" (as a unary prefix operator) <br> x$^y$ |
| "x * y", "x / y", "x ÷ y", "$\frac{x}{y}$", "x % y" |
| "x + y", "x – y" (as a two-argument operator), "$\sum_{i=x}^{y} f(i)$" |
| "x << y", "x >> y" |
| "x < y", "x <= y", "x > y", "x >= y" |
| "x = = y", "x != y" |
| "x & y" |
| "x \| y" |
| "x && y" |
| "x \|\| y" |
| "x ? y : z" |
| "x . . . y" |
| "x = y", "x += y", "x –= y" |

Text Description of Logical Operations

In the text, a statement of logical operations as would be described mathematically in the following form:

```
if( condition 0 )
    statement 0
else if( condition 1 )
    statement 1
...
else /* informative remark on remaining condition */
    statement n
``` may be described in the following manner
 . . . as follows/ . . . the following applies:
 If condition 0, statement 0
 Otherwise, if condition 1, statement 1
 . . .
 Otherwise (informative remark on remaining condition), statement n
Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching " . . . as follows" or " . . . the following applies" with the ending "Otherwise, . . . ".
In the text, a statement of logical operations as would be described mathematically in the following form:

```
if( condition 0a  &&  condition 0b )
    statement 0
else if( condition 1a  | |  condition 1b )
    statement 1
...
else
    statement n
``` may be described in the following manner
 . . . as follows/ . . . the following applies:
 If all of the following conditions are true, statement 0:
  condition 0a
  condition 0b
 Otherwise, if one or more of the following conditions are true, statement 1:
  condition 1a
  condition 1b
 . . .
 Otherwise, statement n
In the text, a statement of logical operations as would be described mathematically in the following form:
 if(condition 0)
  statement 0
 if(condition 1)
  statement 1
may be described in the following manner
 When condition 0, statement 0
 When condition 1, statement 1

Although embodiments of the invention have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A deblocking method for deblocking a chroma block edge between a first chroma block of a first image block and a second chroma block of a second image block in an image encoding or an image decoding, comprising:
   performing a decision process for the chroma block edge; and
   performing a filtering process for the chroma block edge at least based on a maximum chroma filter length determined in the decision process, wherein the decision process comprises:
      determining a first chroma quantization parameter ($Qp_{Cp}$) for the first chroma block, wherein the first chroma quantization parameter ($Qp_{Cp}$) is determined based on a first luma quantization parameter ($Qp_{YP}$) of a first luma block of the first image block and a chroma quantization parameter (QP) mapping table for the first chroma block;
      determining a second chroma quantization parameter ($Qp_{Cq}$) for the second chroma block, wherein the second chroma quantization parameter ($Qp_{Cq}$) is determined based on a second luma quantization parameter ($Qp_{YQ}$) of a second luma block of the second image block and a chroma QP mapping table for the second chroma block;
      determining a third chroma quantization parameter (Qpc) based on the first chroma quantization parameter ($Qp_{Cp}$) for the first chroma block and the second chroma quantization parameter ($Qp_{Cq}$) for the second chroma block;
      determining one or more threshold parameters based on the third chroma quantization parameter ($Qp_C$); and
      determining the maximum chroma filter length based on the one or more threshold parameters.

2. The deblocking method of claim 1, wherein at least one of the first chroma block or the second chroma block is a Joint Cb-Cr residual (JCCR) coded block.

3. The deblocking method of claim 1,
   wherein the first chroma block is a Joint Cb-Cr residual (JCCR) coded block of the first image block, and the second chroma block is a Joint Cb-Cr residual (JCCR) coded block of the second image block;
   wherein the first chroma block is a Joint Cb-Cr residual (JCCR) coded block of the first image block, and the second chroma block is a first chroma component of the second image block;
   wherein the first chroma block is a Joint Cb-Cr residual (JCCR) coded block of the first image block, and the second chroma block is a second chroma component of the second image block;
   wherein the first chroma block is a first chroma component of the first image block, and the second chroma block is a Joint Cb-Cr residual (JCCR) coded block of the second image block; or
   wherein the first chroma block is a second chroma component of the first image block, and the second chroma block is a Joint Cb-Cr residual (JCCR) coded block of the second image block.

4. The deblocking method of claim 1, wherein the chroma quantization parameter (QP) mapping table for the first chroma block or the second chroma block comprises at least one of:
   a first chroma QP mapping table for a joint Cb-Cr coded block,
   a second chroma QP mapping table for a first chroma component, or
   a third chroma QP mapping table for a second chroma component.

5. The deblocking method of claim 4, wherein the first chroma QP mapping table, the second chroma QP mapping table and the third chroma QP mapping table are indicated or indexed by a first index value, a second index value and a third index value, respectively.

6. The deblocking method of claim 5, wherein the first index value is 3, the second index value is 1 and the third index value is 2; or wherein the first index value is 2, the second index value is 0 and the third index value is 1.

7. The deblocking method of claim 4, wherein
   if the first chroma block is a Joint Cb-Cr residual (JCCR) coded block of the first image block, the first chroma quantization parameter ($Qpc_p$) is derived based on a chroma QP value that corresponds to a clipped value of the first luma quantization parameter ($Qp_{YP}$) in the first chroma QP mapping table;
   if the first chroma block is a first chroma component of the first image block, the first chroma quantization parameter ($Qp_{Cp}$) is derived based on a chroma QP value that corresponds to a clipped value of the first luma quantization parameter ($Qp_{YP}$) in the second chroma QP mapping table; or
   if the first chroma block is a second chroma component of the first image block, the first chroma quantization parameter ($Qp_{Cp}$) is derived based on a chroma QP value that corresponds to a clipped value of the first luma quantization parameter ($Qp_{YP}$) in the third chroma QP mapping table.

8. The deblocking method of claim 4, wherein
   if the second chroma block is a Joint Cb-Cr residual (JCCR) coded block of the second image block, the second chroma quantization parameter ($Qp_{Cq}$) is derived based on a chroma QP value that corresponds to a clipped value of the second luma quantization parameter ($Qp_{YQ}$) in the first chroma QP mapping table;
   if the second chroma block is a first chroma component of the second image block, the second chroma quantization parameter ($Qp_{Cq}$) is derived based on a chroma QP value that corresponds to a clipped value of the second luma quantization parameter ($Qp_{YQ}$) in the second chroma QP mapping table; or
   if the second chroma block is a second chroma component of the second image block, the second chroma quantization parameter ($Qp_{Cq}$) is derived based on a chroma QP value that corresponds to a clipped value of the second luma quantization parameter ($Qp_{YQ}$) in the third chroma QP mapping table.

9. The deblocking method of claim 1, wherein the determining a first chroma quantization parameter ($Qp_{Cp}$) for the first chroma block based on a first luma quantization parameter ($Qp_{YP}$) of a first luma block of the first image block and a chroma quantization parameter (QP) mapping table for the first chroma block comprises:
   obtaining a clipped QP value ($qPi_{Chroma}$) based on the first luma quantization parameter ($Qp_{YP}$) of the first luma block;
   determining a chroma QP value ($qPi_{Cb}$, $qPi_{Cr}$, $qPi_{CbCr}$) for the first chroma block based on the clipped QP value ($qPi_{Chroma}$) by using the chroma QP mapping table for the first chroma block; and
   determining the first chroma quantization parameter ($Qp_{Cp}$) for the first chroma block based on a clipped value of the chroma QP value ($qPi_{Cb}$, $qPi_{Cr}$, $qPi_{CbCr}$).

10. The deblocking method of claim 1, wherein the determining a second chroma quantization parameter ($Qp_{C_q}$) for the second chroma block based on a second luma quantization parameter ($Qp_{YQ}$) of a second luma block of the second image block and the chroma QP mapping table for the second chroma block comprises:
- obtaining a clipped QP value ($qPi_{Chroma}$) based on the second luma quantization parameter ($Qp_{YQ}$) of the second luma block;
- determining a chroma QP value ($qPi_{Cb}$, $qPi_{Cr}$, $qPi_{CbCr}$) for the second chroma block based on the clipped QP value ($qPi_{Chroma}$) by using the chroma QP mapping table for the second chroma block; and
- determining the second chroma quantization parameter ($Qp_{C_q}$) for the second chroma block based on a clipped value of the chroma QP value ($qPi_{Cb}$, $qPi_{Cr}$, $qPi_{CbCr}$).

11. The deblocking method of claim 1, wherein determining the third chroma quantization parameter ($Qp_C$) based on the first chroma quantization parameter ($Qp_{C_p}$) for the first chroma block and the second chroma quantization parameter ($Qp_{C_q}$) for the second chroma block, comprises:
- determining the third chroma quantization parameter ($Qp_C$) according to the following equation:

$$Qp_C = (Qp_Q + Qp_P + 1) >> 1$$

wherein $Qp_P$ is based on the first chroma quantization parameter ($Qp_{C_p}$) for the first chroma block and $Qp_Q$ is based on the second chroma quantization parameter ($Qp_{C_q}$) for the second chroma block.

12. The deblocking method of claim 11,
- wherein $Qp_P$ is obtained by subtracting an offset value (QpBdOffset) from the first chroma quantization parameter ($Qp_{C_p}$) for the first chroma block; and
- wherein $Qp_Q$ is obtained by subtracting the offset value (QpBdOffset) from the second chroma quantization parameter ($Qp_{C_q}$) for the second chroma block.

13. The deblocking method of claim 2,
- wherein the joint Cb-Cr coded block is coded using a JCCR mode and the JCCR mode is a second mode of a set of available JCCR modes.

14. The deblocking method of claim 1, wherein the first image block and the second image block are transform blocks or the first image block and the second image block are coding blocks.

15. The deblocking method of claim 1, wherein
- the one or more threshold parameters comprise a first variable ($\beta$);
- a value of a first threshold variable ($\beta'$) is determined based on the third chroma quantization parameter ($Qp_C$) or a first clipped QpC using a mapping table, and the first clipped Qpc is a first clipped value of the third chroma quantization parameter ($Qp_C$); and
- a value of the first variable ($\beta$) is derived based on the value of the first threshold variable ($\beta'$).

16. The deblocking method of claim 15, wherein
- the one or more threshold parameters further comprise a second variable ($t_C$);
- a value of a second threshold variable ($t_C'$) is determined based on the third chroma quantization parameter ($Qp_C$) or a second clipped Qpc using the mapping table;
- the second clipped Qpc is a second clipped value of the third chroma quantization parameter ($Qp_C$); and
- a value of the second variable ($t_C$) is derived based on the value of the second threshold variable ($t_C'$).

17. An apparatus for use in an image encoder or an image decoder, for deblocking a chroma block edge between a first chroma block of a first image block and a second chroma block of a second image block, comprising:
- a memory storing instructions; and
- a processor in communication with the memory, and upon execution of the instructions, is configured to:
  perform a decision process for the chroma block edge, and
  perform a filtering process for the chroma block edge at least based on a maximum chroma filter length determined in the decision process;
- wherein the decision process comprises:
  determining a first chroma quantization parameter ($Qp_{C_p}$) for the first chroma block, wherein the first chroma quantization parameter ($Qp_{C_p}$) is determined based on a first luma quantization parameter ($Qp_{YP}$) of a first luma block of the first image block and a chroma quantization parameter (QP) mapping table for the first chroma block;
  determining a second chroma quantization parameter ($Qp_{C_q}$) for the second chroma block, wherein the second chroma quantization parameter ($Qp_{C_q}$) is determined based on a second luma quantization parameter ($Qp_{YQ}$) of a second luma block of the second image block and a chroma QP mapping table for the second chroma block;
  determining a third chroma quantization parameter ($Qp_C$) based on the first chroma quantization parameter ($Qp_{C_p}$) for the first chroma block and the second chroma quantization parameter ($Qp_{C_q}$) for the second chroma block;
  determining one or more threshold parameters based on the third chroma quantization parameter ($Qp_C$); and
  determining the maximum chroma filter length based on the one or more threshold parameters.

18. The apparatus of claim 17, wherein at least one of the first chroma block and the second chroma block is a Joint Cb-Cr residual (JCCR) coded block.

19. The apparatus of claim 17,
- wherein the first chroma block is a Joint Cb-Cr residual (JCCR) coded block of the first image block, and the second chroma block is a Joint Cb-Cr residual (JCCR) coded block of the second image block;
- wherein the first chroma block is a Joint Cb-Cr residual (JCCR) coded block of the first image block, and the second chroma block is a first chroma component of the second image block;
- wherein the first chroma block is a Joint Cb-Cr residual (JCCR) coded block of the first image block, and the second chroma block is a second chroma component of the second image block;
- wherein the first chroma block is a first chroma component of the first image block, and the second chroma block is a Joint Cb-Cr residual (JCCR) coded block of the second image block; or
- wherein the first chroma block is a second chroma component of the first image block, and the second chroma block is a Joint Cb-Cr residual (JCCR) coded block of the second image block.

20. The apparatus of claim 17, wherein the chroma quantization parameter (QP) mapping table for the first chroma block or the second chroma block comprises at least one of:
- a first chroma QP mapping table for a joint Cb-Cr coded block,
- a second chroma QP mapping table for a first chroma component, or
- a third chroma QP mapping table for a second chroma component.

21. The apparatus of claim 20, wherein the first chroma QP mapping table, the second chroma QP mapping table and the third chroma QP mapping table are indicated or indexed by a first index value, a second index value and a third index value, respectively.

22. The apparatus of claim 21, wherein the first index value is 3, the second index value is 1 and the third index value is 2; or wherein the first index value is 2, the second index value is 0 and the third index value is 1.

23. The apparatus of claim 20, wherein
if the first chroma block is a Joint Cb-Cr residual (JCCR) coded block of the first image block, the first chroma quantization parameter ($Qp_{Cp}$) is derived based on a chroma QP value that corresponds to a clipped value of the first luma quantization parameter ($Qp_{YP}$) in the first chroma QP mapping table;
if the first chroma block is a first chroma component of the first image block, the first chroma quantization parameter ($Qp_{Cp}$) is derived based on a chroma QP value that corresponds to a clipped value of the first luma quantization parameter ($Qp_{YP}$) in the second chroma QP mapping table; or
if the first chroma block is a second chroma component of the first image block, the first chroma quantization parameter ($Qp_{Cp}$) is derived based on a chroma QP value that corresponds to a clipped value of the first luma quantization parameter ($Qp_{YP}$) in the third chroma QP mapping table.

24. The apparatus of claim 20, wherein
if the second chroma block is a Joint Cb-Cr residual (JCCR) coded block of the second image block, the second chroma quantization parameter ($Qp_{Cq}$) is derived based on a chroma QP value that corresponds to a clipped value of the second luma quantization parameter ($Qp_{YQ}$) in the first chroma QP mapping table;
if the second chroma block is a first chroma component of the second image block, the second chroma quantization parameter ($Qp_{Cq}$) is derived based on a chroma QP value that corresponds to a clipped value of the second luma quantization parameter ($Qp_{YQ}$) in the second chroma QP mapping table; or
if the second chroma block is a second chroma component of the second image block, the second chroma quantization parameter ($Qp_{Cq}$) is derived based on a chroma QP value that corresponds to a clipped value of the second luma quantization parameter ($Qp_{YQ}$) in the third chroma QP mapping table.

25. The apparatus of claim 17, wherein the determining a first chroma quantization parameter ($Qp_{Cp}$) for the first chroma block based on a first luma quantization parameter ($Qp_{YP}$) of a first luma block of the first image block and a chroma quantization parameter (QP) mapping table for the first chroma block, comprises:
obtaining a clipped QP value ($qPi_{Chroma}$) based on the first luma quantization parameter ($Qp_{YP}$) of the first luma block;
determining a chroma QP value ($qPi_{Cb}$, $qPi_{Cr}$, $qPi_{CbCr}$) for the first chroma block based on the clipped QP value ($qPi_{Chroma}$) by using the chroma QP mapping table for the first chroma block; and
determining the first chroma quantization parameter ($Qp_{Cp}$) for the first chroma block based on a clipped value of the chroma QP value ($qPi_{Cb}$, $qPi_{Cr}$, $qPi_{CbCr}$).

26. The apparatus of claim 17, wherein the determining a second chroma quantization parameter ($Qp_{Cq}$) for the second chroma block based on a second luma quantization parameter ($Qp_{YQ}$) of a second luma block of the second image block and the chroma QP mapping table for the second chroma block, comprises:
obtaining a clipped QP value ($qPi_{Chroma}$) based on the second luma quantization parameter ($Qp_{YQ}$) of the second luma block;
determining a chroma QP value ($qPi_{Cb}$, $qPi_{Cr}$, $qPi_{CbCr}$) for the second chroma block based on the clipped QP value ($qPi_{Chroma}$) by using the chroma QP mapping table for the second chroma block; and
determining the second chroma quantization parameter ($Qp_{Cq}$) for the second chroma block based on a clipped value of the chroma QP value ($qPi_{Cb}$, $qPi_{Cr}$, $qPi_{CbCr}$).

27. The apparatus of claim 17, wherein determining the third chroma quantization parameter ($Qp_C$) based on the first chroma quantization parameter ($Qp_{Cp}$) for the first chroma block and the second chroma quantization parameter ($Qp_{Cq}$) for the second chroma block, comprises:
determining the third chroma quantization parameter ($Qp_C$) according to the following equation:

$$Qp_C = (Qp_Q + Qp_P + 1) >> 1$$

wherein $Qp_P$ is based on the first chroma quantization parameter ($Qp_{Cp}$) for the first chroma block and $Qp_Q$ is based on the second chroma quantization parameter ($Qp_{Cq}$) for the second chroma block.

28. The apparatus of claim 27,
wherein $Qp_P$ is obtained by subtracting an offset value (QpBdOffset) from the first chroma quantization parameter ($Qp_{Cp}$) for the first chroma block; and
wherein $Qp_Q$ is obtained by subtracting the offset value (QpBdOffset) from the second chroma quantization parameter ($Qp_{Cq}$) for the second chroma block.

29. The apparatus of claim 18, wherein the joint Cb-Cr coded block is coded using a JCCR mode and the JCCR mode is a second mode of a set of available JCCR modes.

30. The apparatus of claim 17, wherein the first image block and the second image block are transform blocks or the first image block and the second image block are coding blocks.

31. The apparatus of claim 17, wherein the one or more threshold parameters comprise a first variable ($\beta$);
a value of a first threshold variable ($\beta'$) is determined based on the third chroma quantization parameter ($Qp_C$) or a first clipped Qpc using a mapping table;
the first clipped Qpc is a first clipped value of the third chroma quantization parameter ($Qp_C$); and
a value of the first variable ($\beta$) is derived based on the value of the first threshold variable ($\beta'$).

32. The apparatus of claim 31, wherein the one or more threshold parameters further comprise a second variable ($t_C$);
a value of a second threshold variable ($t_C'$) is determined based on the third chroma quantization parameter ($Qp_C$) or a second clipped Qpc using the mapping table;
the second clipped Qpc is a second clipped value of the third chroma quantization parameter ($Qp_C$); and
a value of the second variable ($t_C$) is derived based on the value of the second threshold variable ($t_C'$).

33. A non-transitory computer-readable medium storing computer instructions that, when executed by one or more processors, cause the one or more processors to perform operations for deblocking a chroma block edge between a first chroma block of a first image block and a second chroma block of a second image block in an image encoding or an image decoding, wherein the operations comprise:

performing a decision process for the chroma block edge; and performing a filtering process for the chroma block edge at least based on a maximum chroma filter length determined in the decision process, wherein the decision process comprises:

determining a first chroma quantization parameter ($Qp_{C_p}$) for the first chroma block, wherein the first chroma quantization parameter ($Qp_{C_p}$) is determined based on a first luma quantization parameter ($Qp_{Y_P}$) of a first luma block of the first image block and a chroma quantization parameter (QP) mapping table for the first chroma block;

determining a second chroma quantization parameter ($Qp_{C_q}$) for the second chroma block, wherein the second chroma quantization parameter ($Qp_{C_q}$) is determined based on a second luma quantization parameter ($Qp_{Y_Q}$) of a second luma block of the second image block and a chroma QP mapping table for the second chroma block;

determining a third chroma quantization parameter ($Qp_C$) based on the first chroma quantization parameter ($Qp_{C_p}$) for the first chroma block and the second chroma quantization parameter ($Qp_{C_q}$) for the second chroma block;

determining one or more threshold parameters based on the third chroma quantization parameter ($Qp_C$); and determining the maximum chroma filter length based on the one or more threshold parameters.

* * * * *